United States Patent
Suzuki et al.

(10) Patent No.: US 11,914,125 B2
(45) Date of Patent: *Feb. 27, 2024

(54) ZOOM LENS, OPTICAL APPARATUS AND METHOD FOR MANUFACTURING THE ZOOM LENS

(71) Applicant: Nikon Corporation, Tokyo (JP)

(72) Inventors: Atsushi Suzuki, Tokyo (JP); Kenji Ishida, Mitaka (JP); Saburo Masugi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 650 days.

This patent is subject to a terminal disclaimer.

(21) Appl. No.: 17/067,898

(22) Filed: Oct. 12, 2020

(65) Prior Publication Data
US 2021/0026119 A1    Jan. 28, 2021

Related U.S. Application Data

(60) Division of application No. 15/462,811, filed on Mar. 18, 2017, now Pat. No. 10,816,781, which is a
(Continued)

(30) Foreign Application Priority Data

Sep. 24, 2014 (JP) .................................. 2014-193360
Feb. 24, 2015 (JP) .................................. 2015-033647
(Continued)

(51) Int. Cl.
*G02B 15/16* (2006.01)
*G02B 15/20* (2006.01)
(Continued)

(52) U.S. Cl.
CPC ............. *G02B 15/16* (2013.01); *G02B 5/208* (2013.01); *G02B 15/1461* (2019.08);
(Continued)

(58) Field of Classification Search
CPC ............................ G02B 15/16; G02B 5/208; G02B 15/145121; G02B 15/1461; G02B 15/20

See application file for complete search history.

(56) References Cited

U.S. PATENT DOCUMENTS 10,816,781 B2 * 10/2020 Suzuki ................... G02B 15/16
2006/0285224 A1 12/2006 Endo et al.
(Continued)

FOREIGN PATENT DOCUMENTS

CN    101546027 A    9/2009
CN    101900871 A    12/2010
(Continued)

OTHER PUBLICATIONS

Office Action dated Jan. 24, 2022, in Chinese Patent Application No. 202011137881.3.
(Continued)

*Primary Examiner* — Alicia M Harrington
(74) *Attorney, Agent, or Firm* — Potomac Law Group, PLLC

(57) ABSTRACT

A first lens group (G1) having positive refractive power, a second lens group (G2) having negative refractive power, a third lens group (G3) having positive refractive power, a fourth lens group (G4) having negative refractive power, and a fifth lens group (G5) having positive refractive power are arranged in order from an object, and zooming is performed by changing distances between each lens group, and the first lens group (G1) is composed of three or more lenses, the fourth lens group (G4) is composed of two or less lenses, and the fifth lens group (G5) is composed of two or less lenses and moves to an image surface side upon zooming from a wide angle end state to a telephoto end state, and the following conditional expression (1) is satisfied.

$$8.40 < f1/(-f2) \qquad (1)$$

(Continued)

where, f1 denotes a focal length of the first lens group (G1), and
f2 denotes a focal length of the second lens group (G2).

26 Claims, 57 Drawing Sheets

Related U.S. Application Data continuation of application No. PCT/JP2015/004803, filed on Sep. 18, 2015.

(30) Foreign Application Priority Data

Feb. 24, 2015 (JP) .................................. 2015-033648
Feb. 24, 2015 (JP) .................................. 2015-033649

(51) Int. Cl.
 *G02B 15/14* (2006.01)
 *G02B 5/20* (2006.01)
(52) U.S. Cl.
 CPC ............. *G02B 15/145105* (2019.08); *G02B 15/145117* (2019.08); *G02B 15/145121* (2019.08); *G02B 15/145129* (2019.08); *G02B 15/20* (2013.01)

(56) References Cited

U.S. PATENT DOCUMENTS

| | | |
|---|---|---|
| 2008/0285150 A1 | 11/2008 | Souma |
| 2009/0147375 A1 | 6/2009 | Sudoh et al. |
| 2009/0251795 A1 | 10/2009 | Adachi et al. |
| 2010/0302650 A1 | 12/2010 | Fujisaki |
| 2011/0019033 A1 | 1/2011 | Ori et al. |
| 2011/0080653 A1 | 4/2011 | Kimura |
| 2011/0085248 A1 | 4/2011 | Ohtake et al. |
| 2011/0299177 A1 | 12/2011 | Mizuma |
| 2012/0087016 A1 | 4/2012 | Ito |
| 2013/0208364 A1 | 8/2013 | Ito |
| 2013/0242169 A1 | 9/2013 | Okubo |
| 2013/0308043 A1 | 11/2013 | Ito et al. |
| 2014/0022417 A1 | 1/2014 | Yokoyama et al. |
| 2014/0218800 A1 | 8/2014 | Li et al. |
| 2014/0313592 A1 | 10/2014 | Ito |
| 2014/0368699 A1 | 12/2014 | Morooka et al. |
| 2015/0138400 A1 | 5/2015 | Ito |
| 2015/0146045 A1 | 5/2015 | Ito |
| 2016/0033748 A1 | 2/2016 | Fujisaki et al. |

FOREIGN PATENT DOCUMENTS

| | | |
|---|---|---|
| JP | 2000-180722 A | 6/2000 |
| JP | 2003-287681 A | 10/2003 |
| JP | 2008-281927 A | 11/2008 |
| JP | 2011-075985 A | 4/2011 |
| JP | 2011-081113 A | 4/2011 |
| JP | 2011-186417 A | 9/2011 |
| JP | 2012-098699 A | 5/2012 |
| JP | 2013-164455 A | 8/2013 |
| JP | 2013-178298 A | 9/2013 |
| JP | 2013-190741 A | 9/2013 |
| JP | 2013-242430 A | 12/2013 |
| JP | 2013-242431 A | 12/2013 |
| JP | 2014-021312 A | 2/2014 |
| JP | 2014-085487 A | 5/2014 |
| JP | 2014-153436 A | 8/2014 |
| JP | 2015-001550 A | 1/2015 |
| JP | 2015-004989 A | 1/2015 |
| JP | 2015-099213 A | 5/2015 |
| JP | 2015-102803 A | 6/2015 |
| JP | 2016-035538 A | 3/2016 |
| WO | WO 2010/098407 A1 | 9/2010 |

OTHER PUBLICATIONS

English Translation of International Search Report from International Patent Application No. PCT/JP2015/004803, dated Dec. 15, 2015.
English Translation of Written Opinion of the International Searching Authority from International Patent Application No. PCT/JP2015/004803, dated Dec. 15, 2015.
Office Action dated Nov. 21, 2017, in Australian Patent Application No. 2015323139.
Extended European search report for European Patent Application No. 15844052.9, dated Mar. 20, 2018.
Office Action dated Jan. 22, 2019, in Japanese Patent Application No. 2015-033647.
Office Action dated Jan. 29, 2019, in Japanese Patent Application No. 2015-033648.
Office Action dated Jan. 22, 2019, in Japanese Patent Application No. 2015-033649.
Decision of Rejection dated Jun. 25, 2019, in Japanese Patent Application No. 2015-033647.
Office Action dated Jun. 25, 2019, in Japanese Patent Application No. 2015-033648.
Office Action dated Jun. 25, 2019, in Japanese Patent Application No. 2015-033649.
Office Action dated Mar. 10, 2020, in Chinese Patent Application No. 201580057686.0.
Office Action dated Aug. 7, 2020, in Chinese Patent Application No. 201580057686.0.
Office Action dated Mar. 19, 2019, in Chinese Patent Application No. 201580057686.0.

* cited by examiner

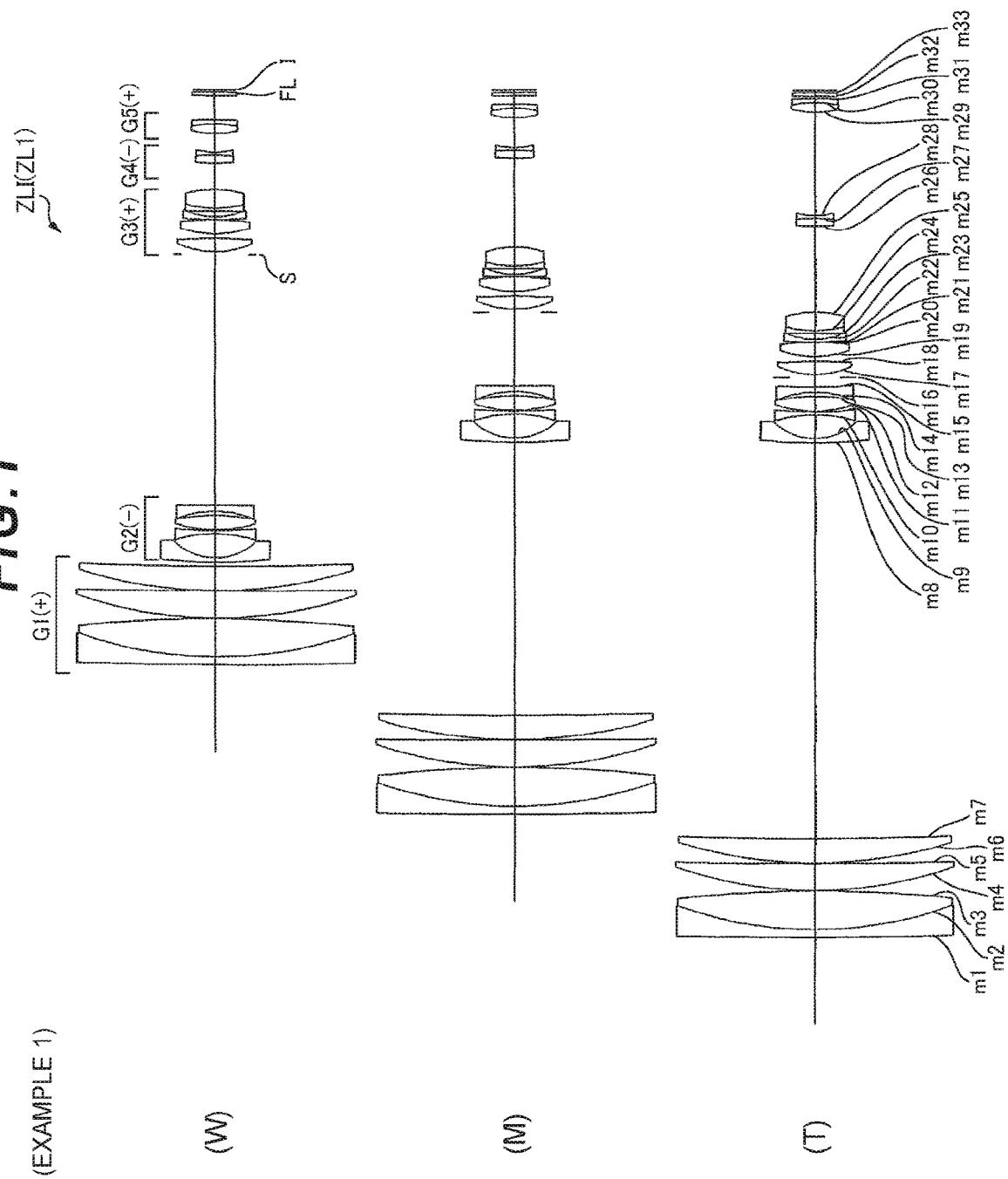

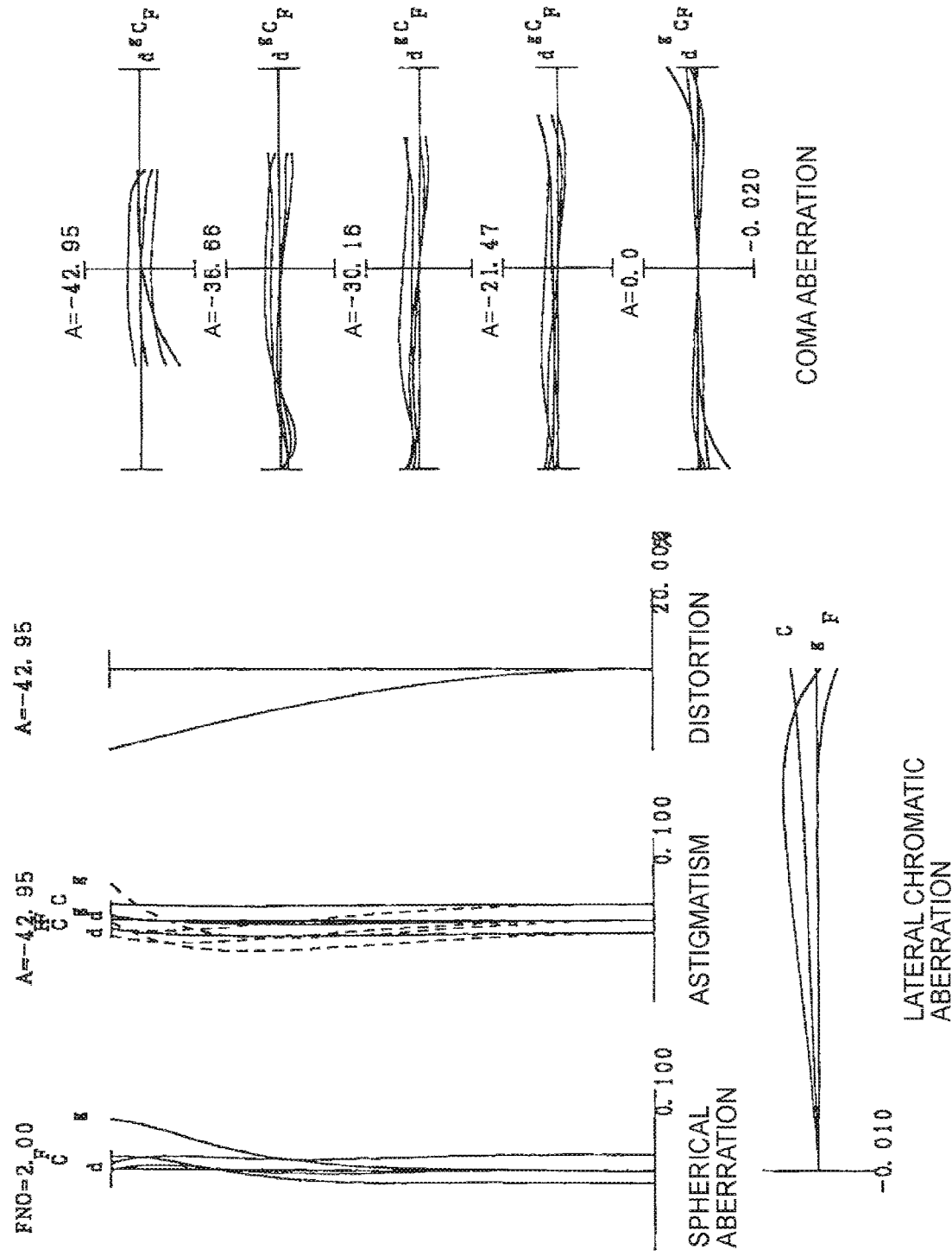

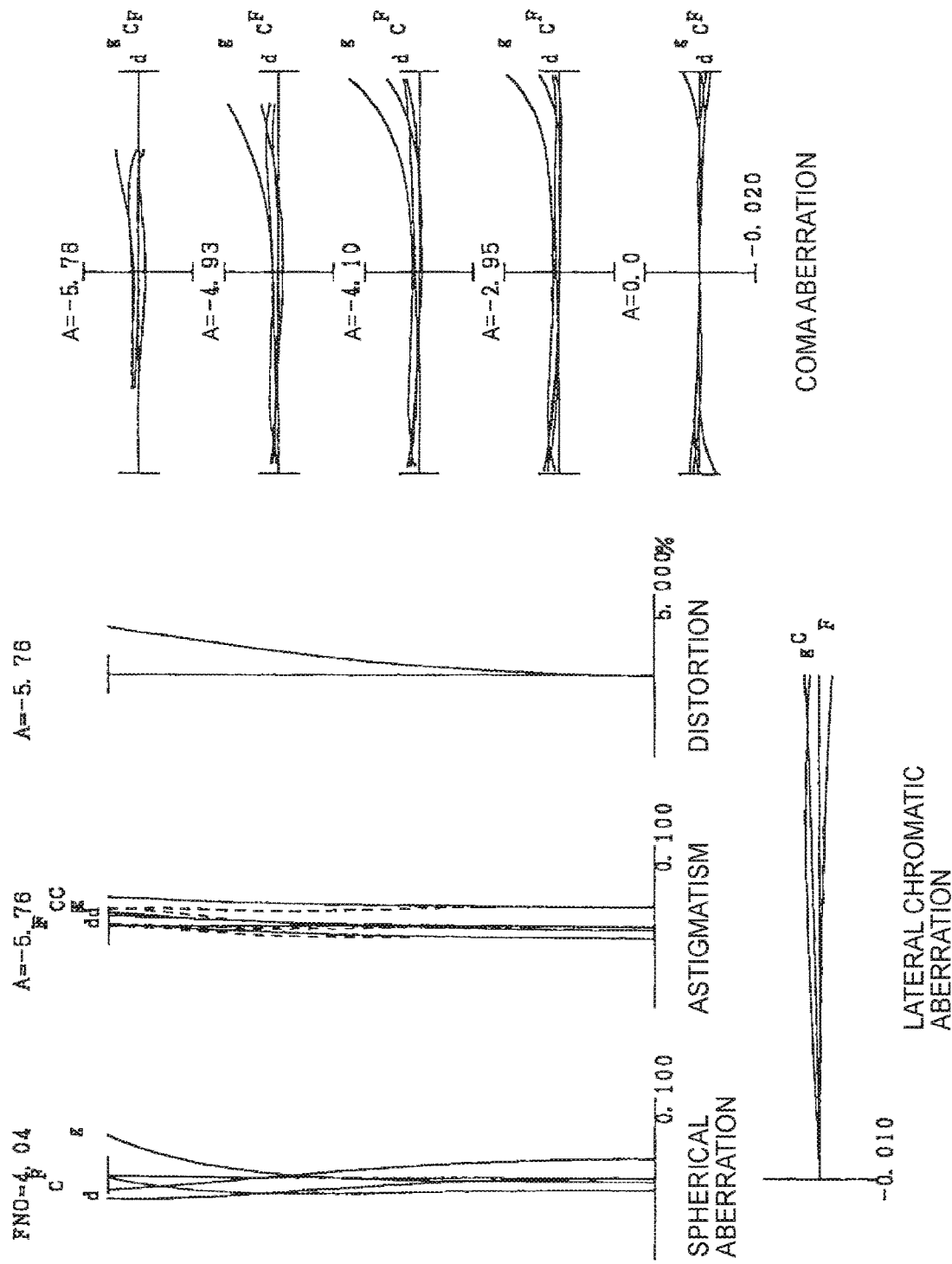

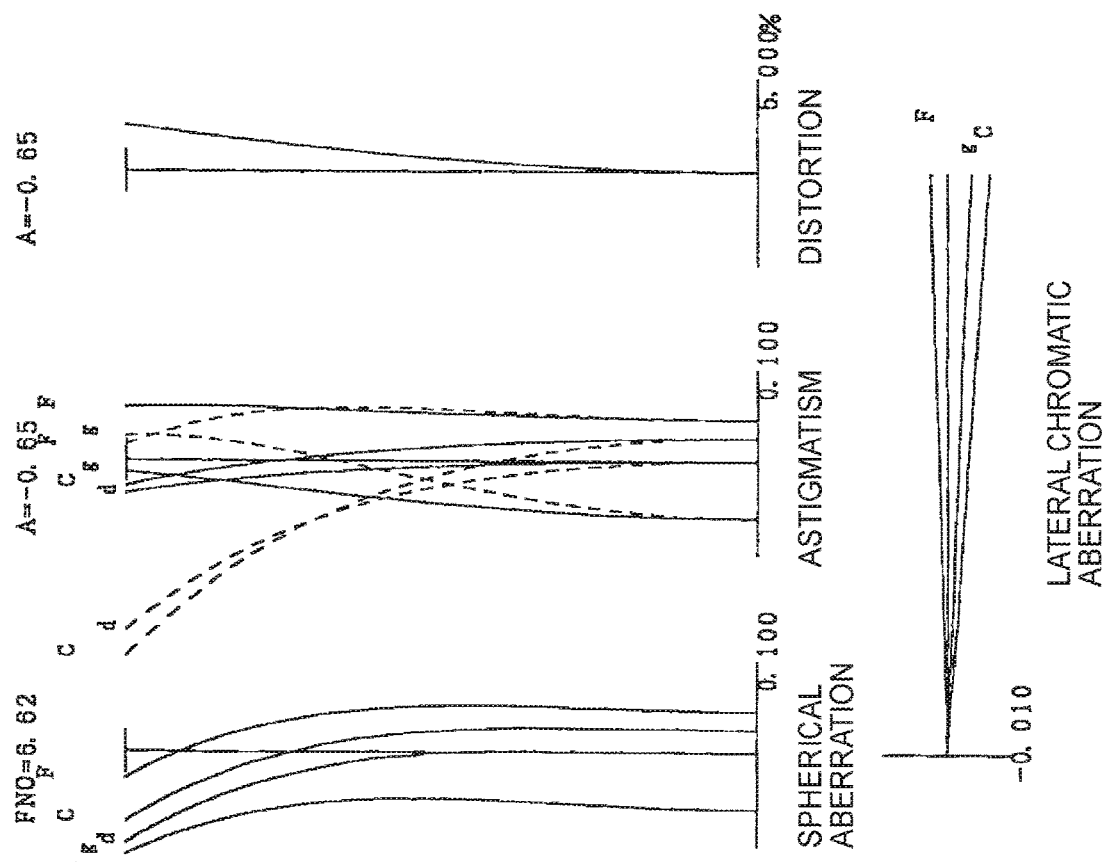

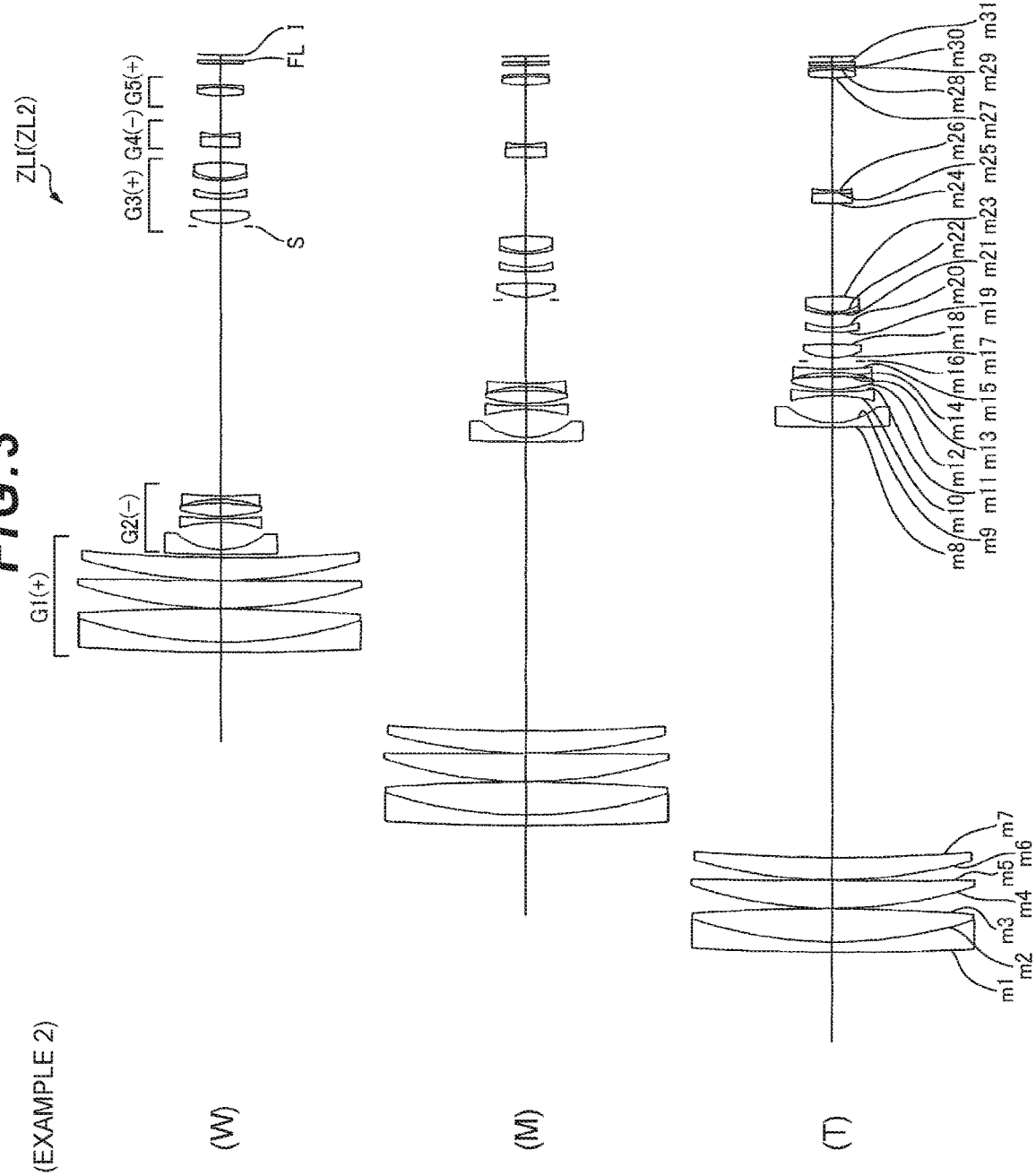

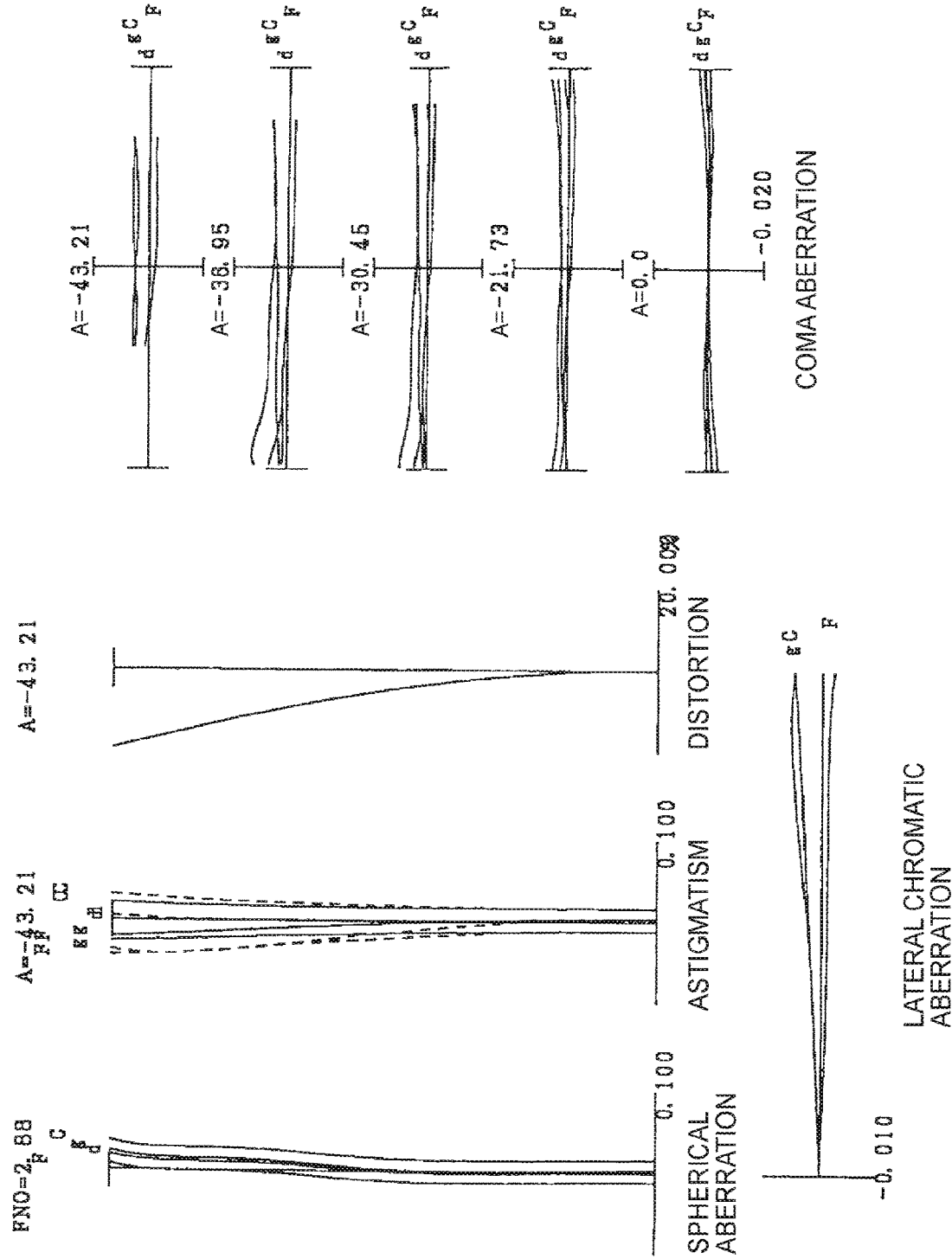

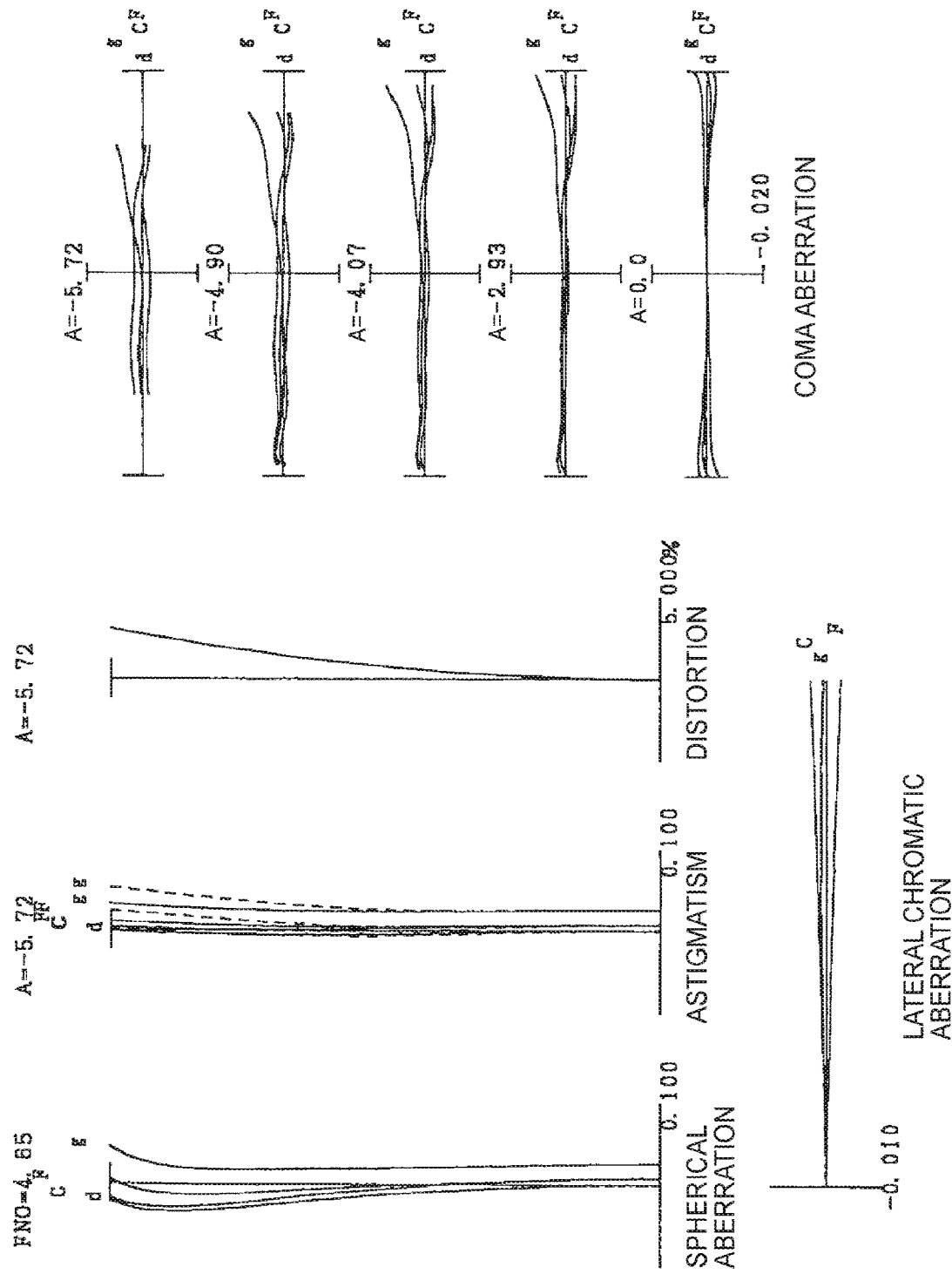

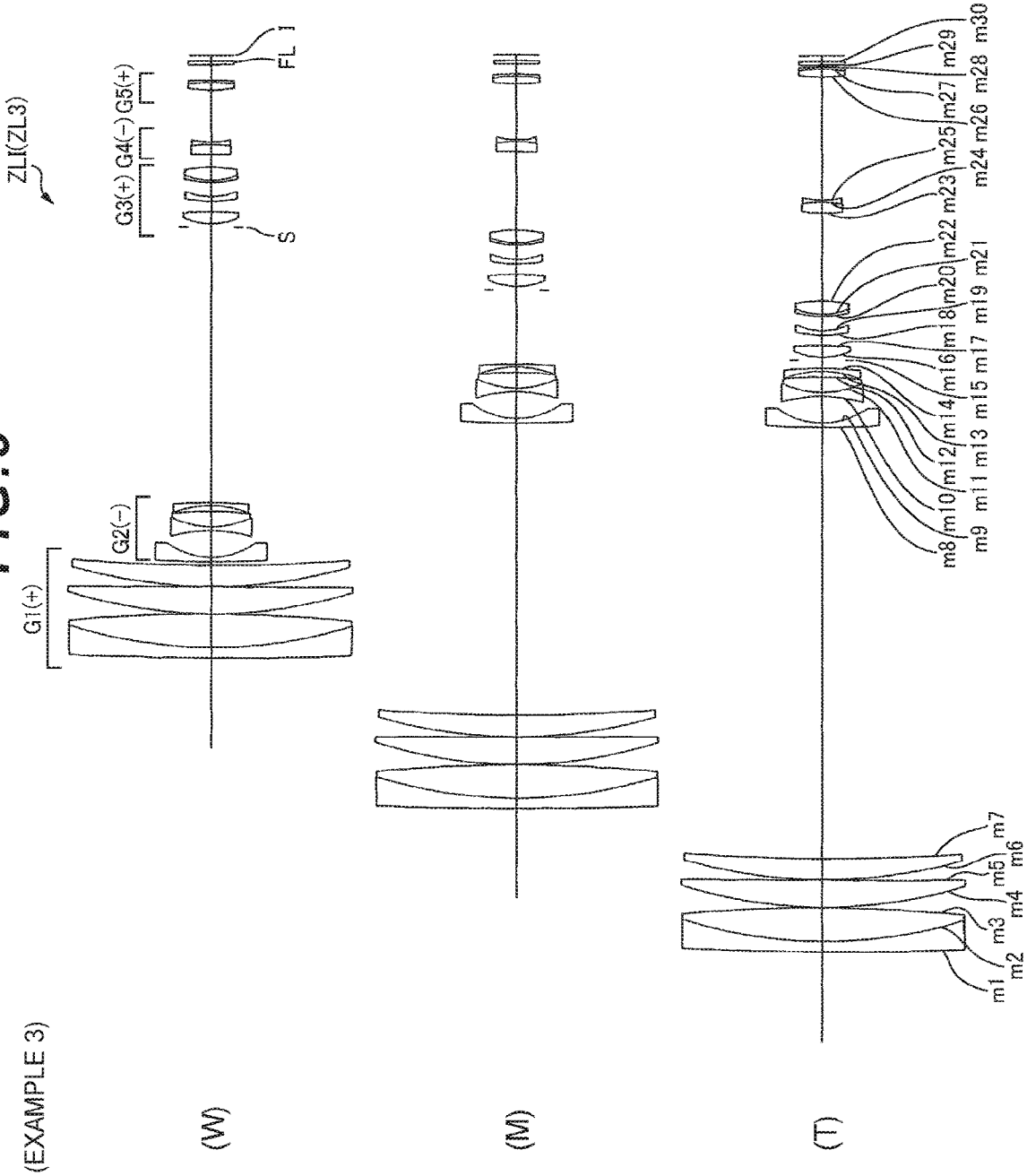

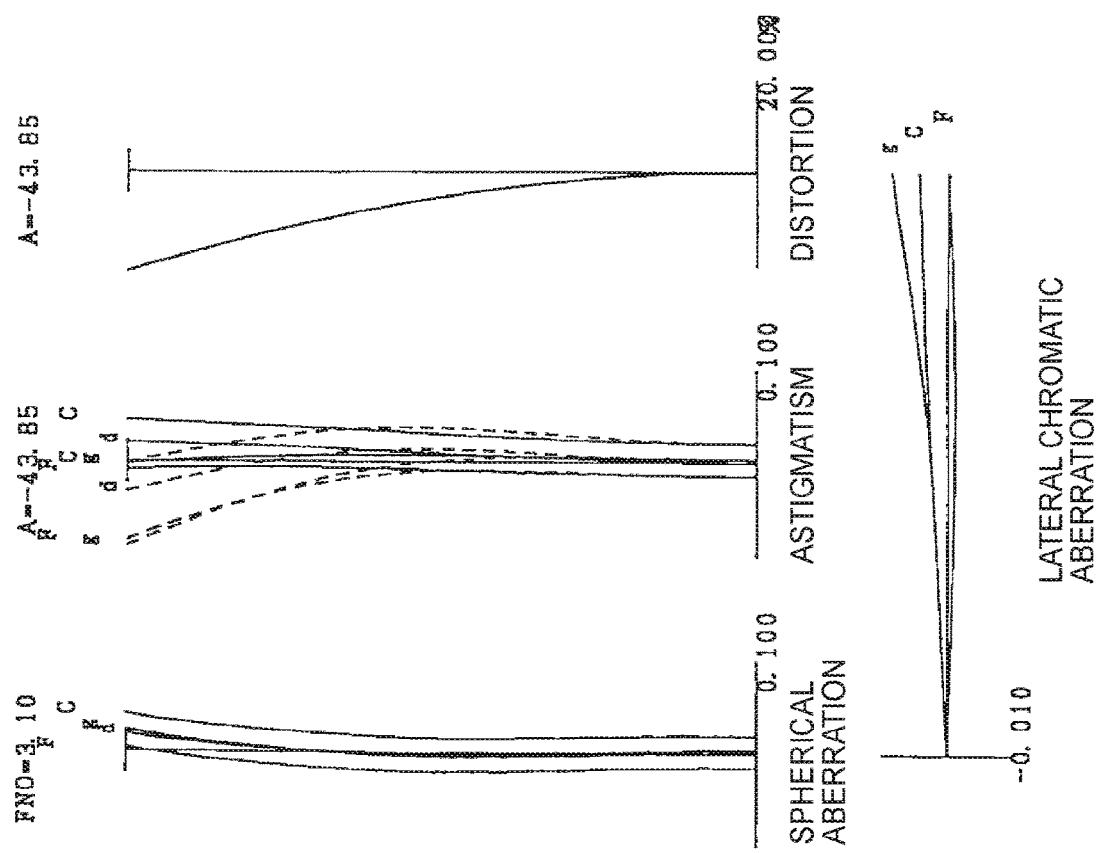

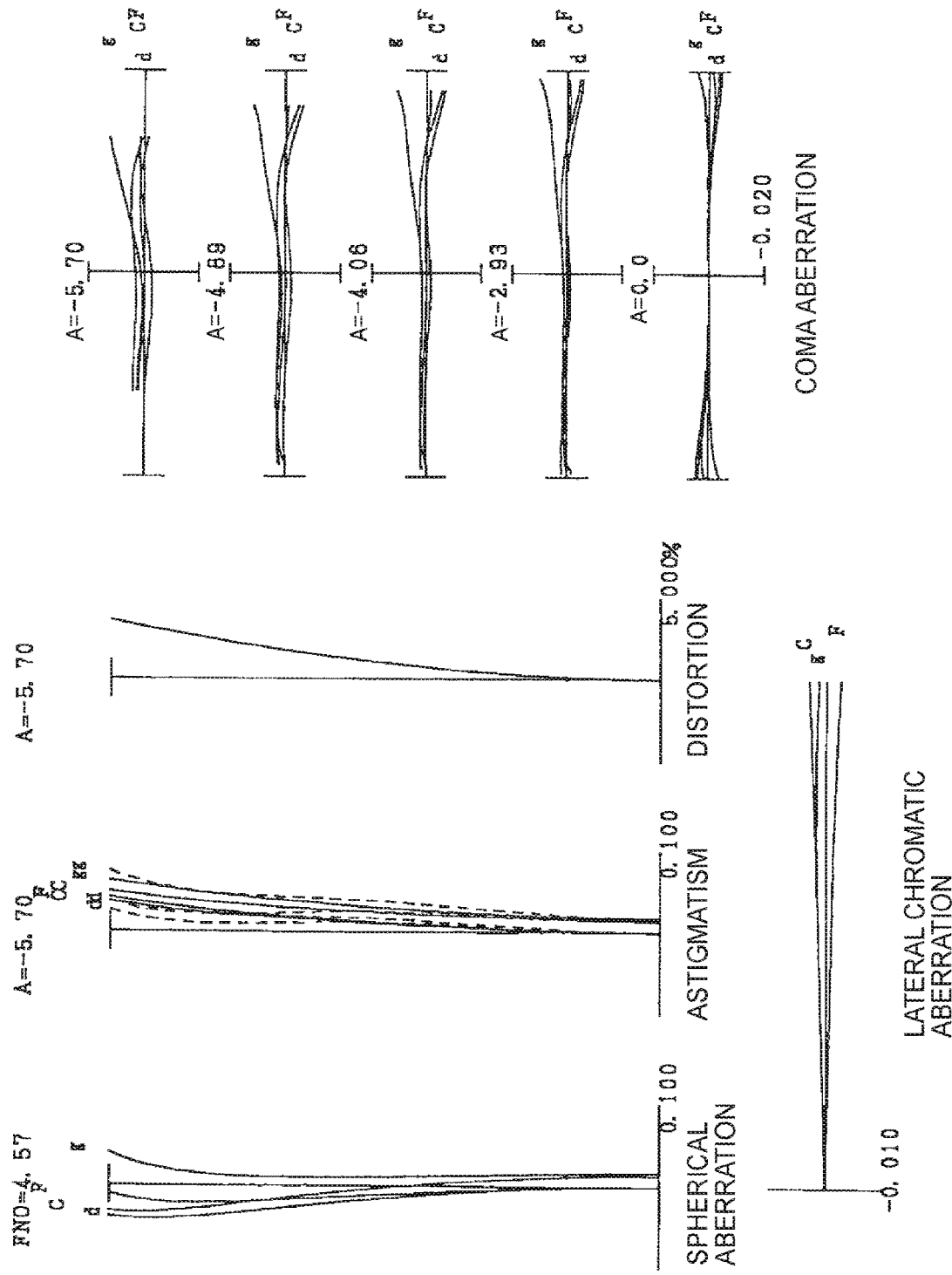

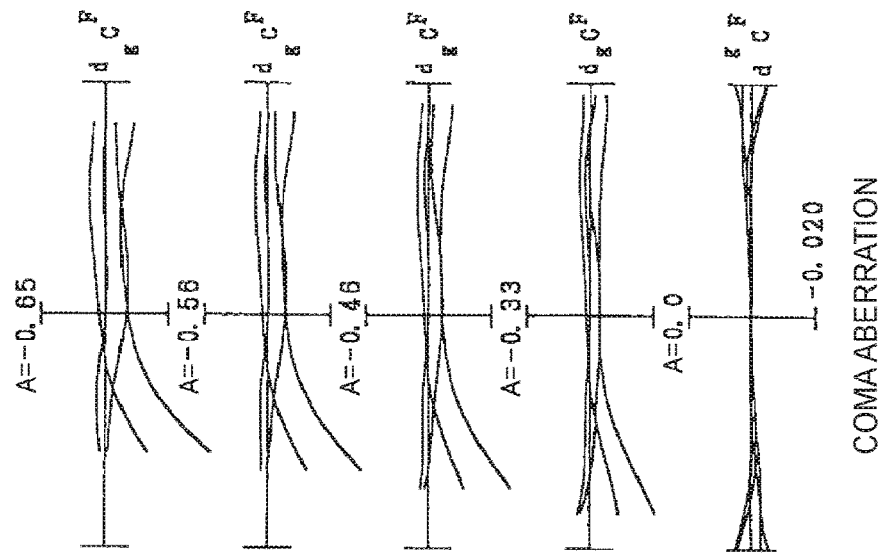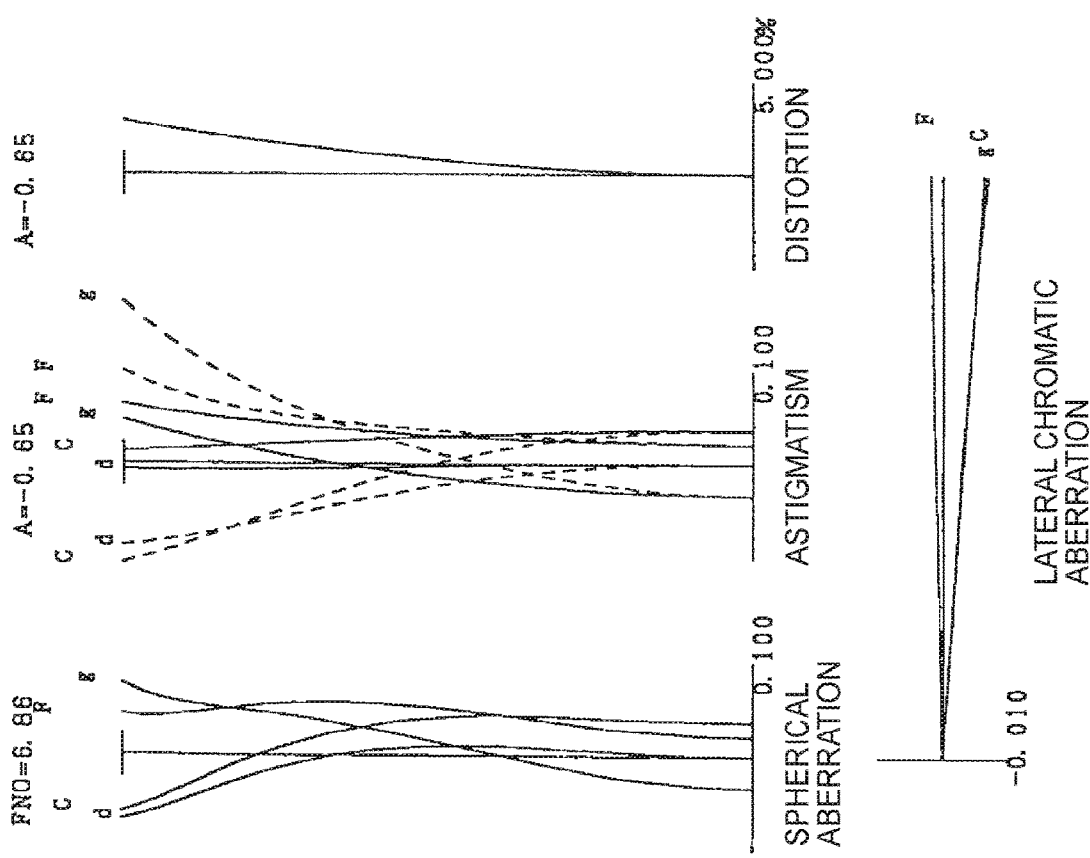
FIG.6C

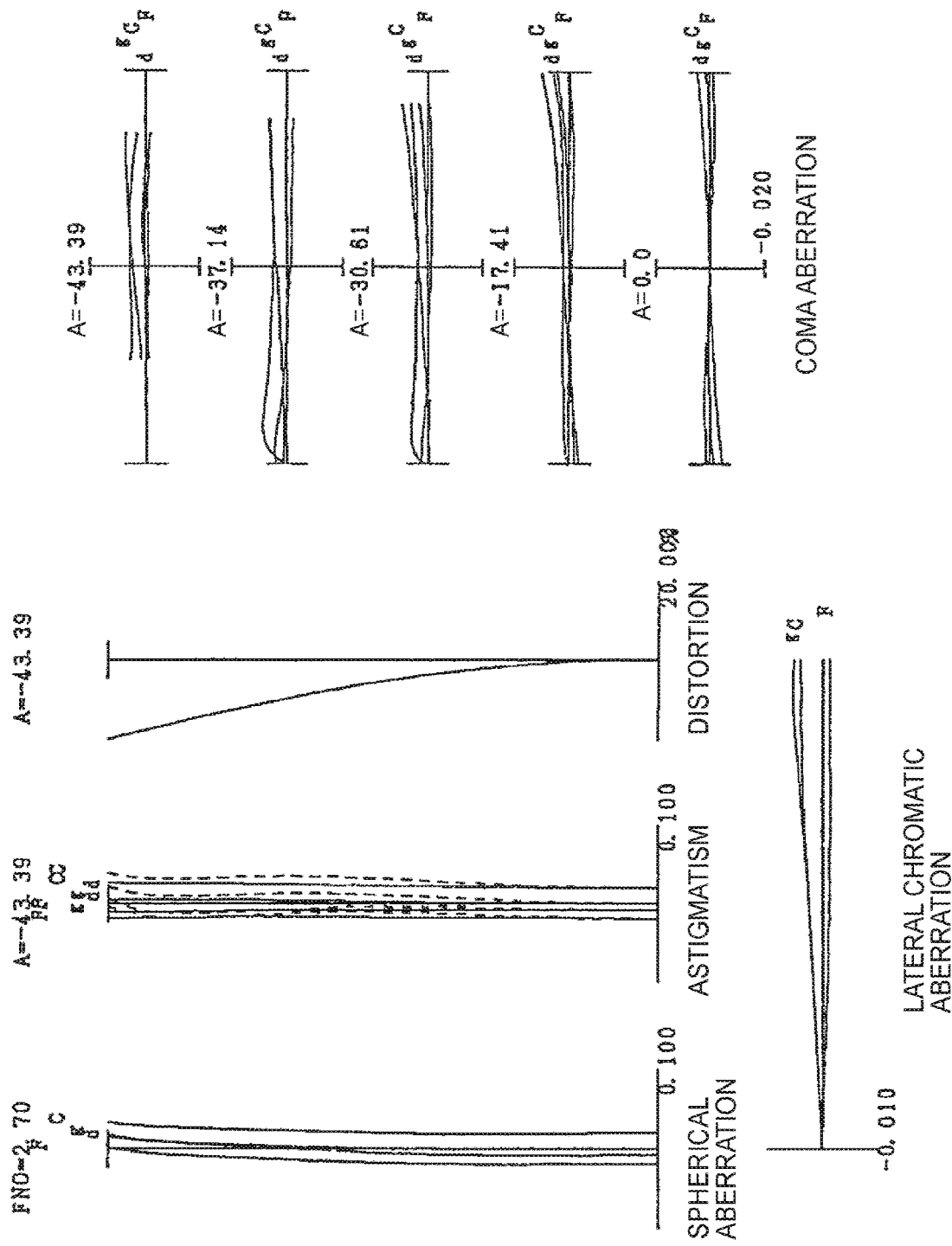

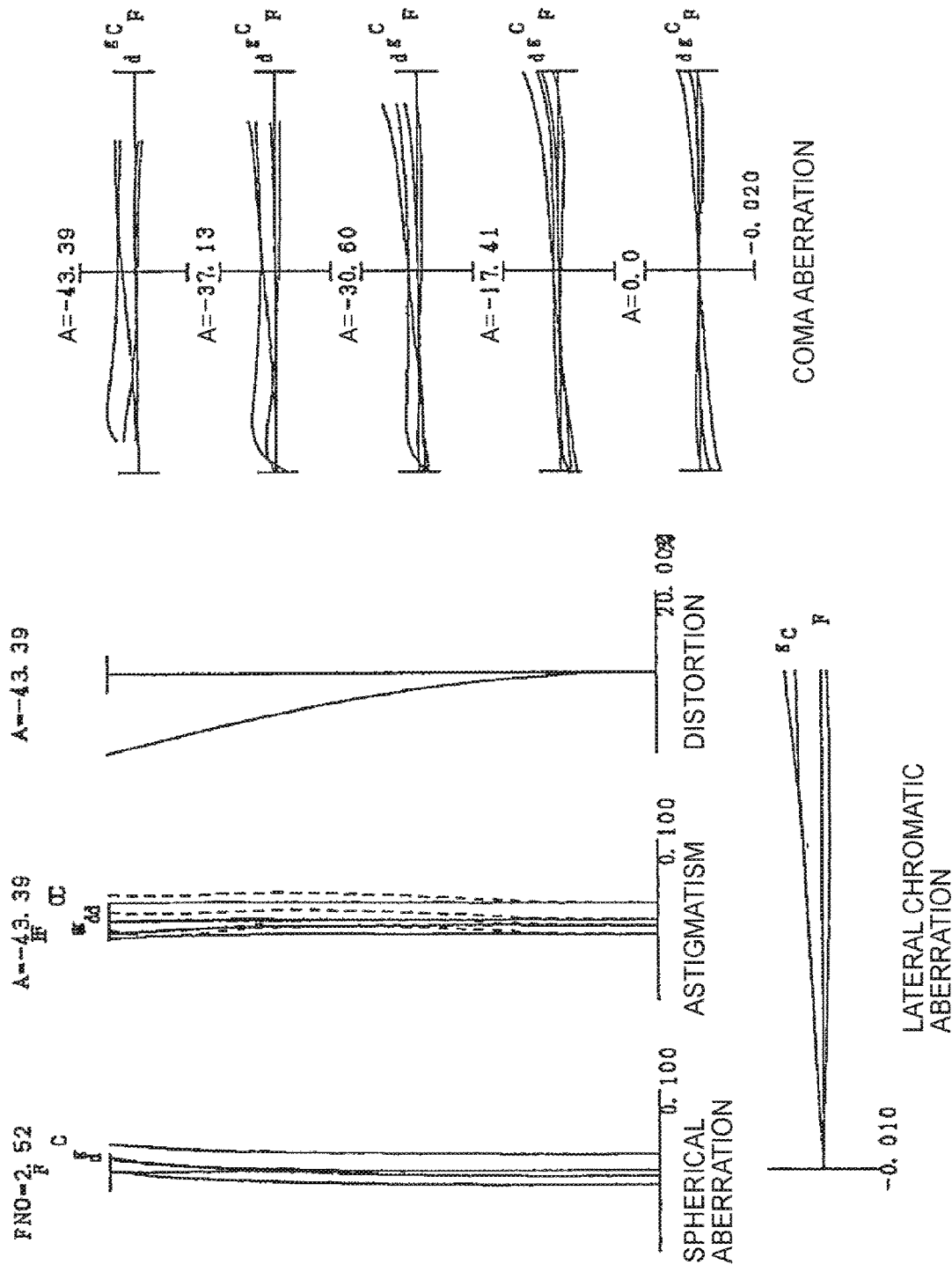

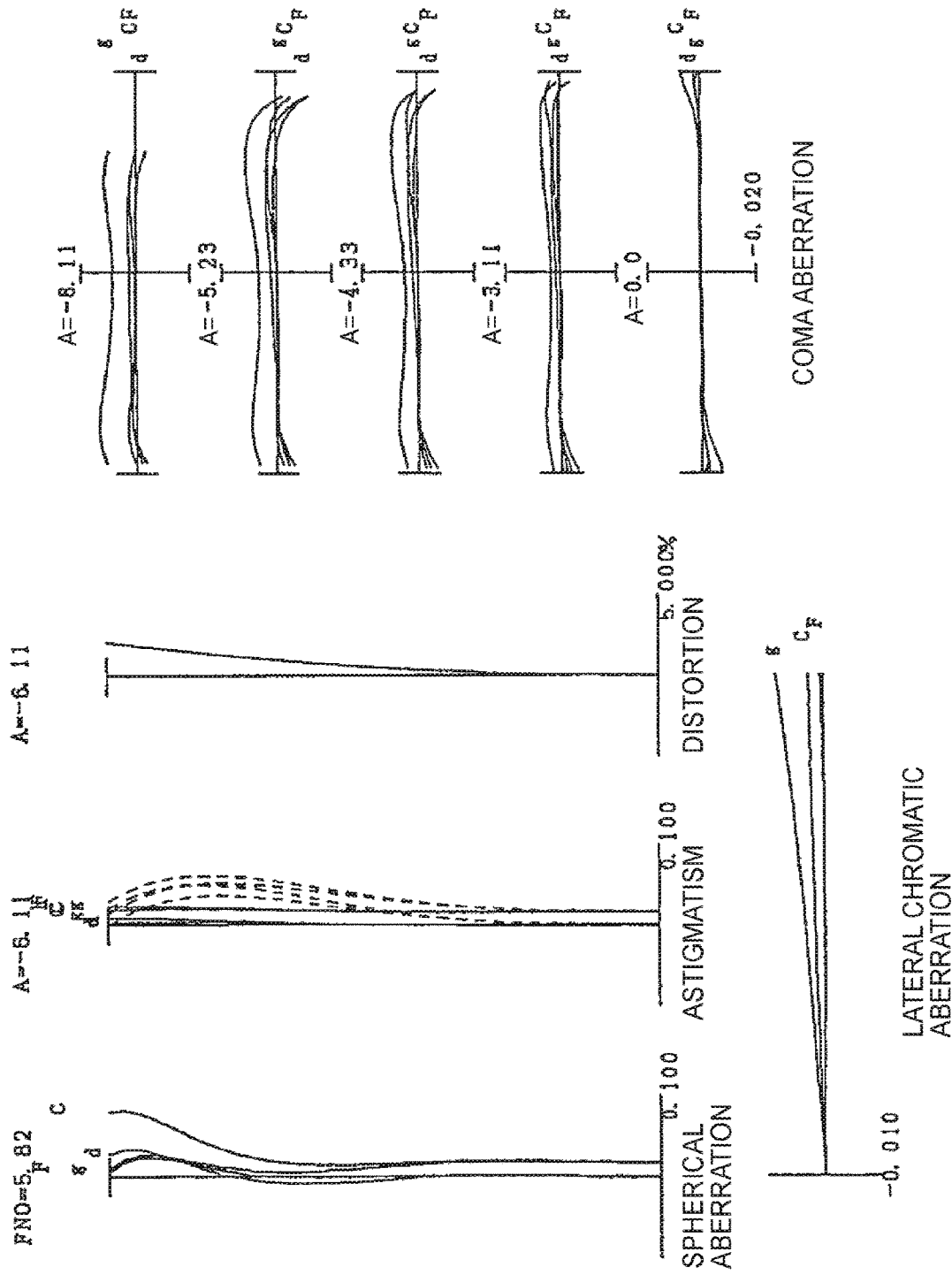

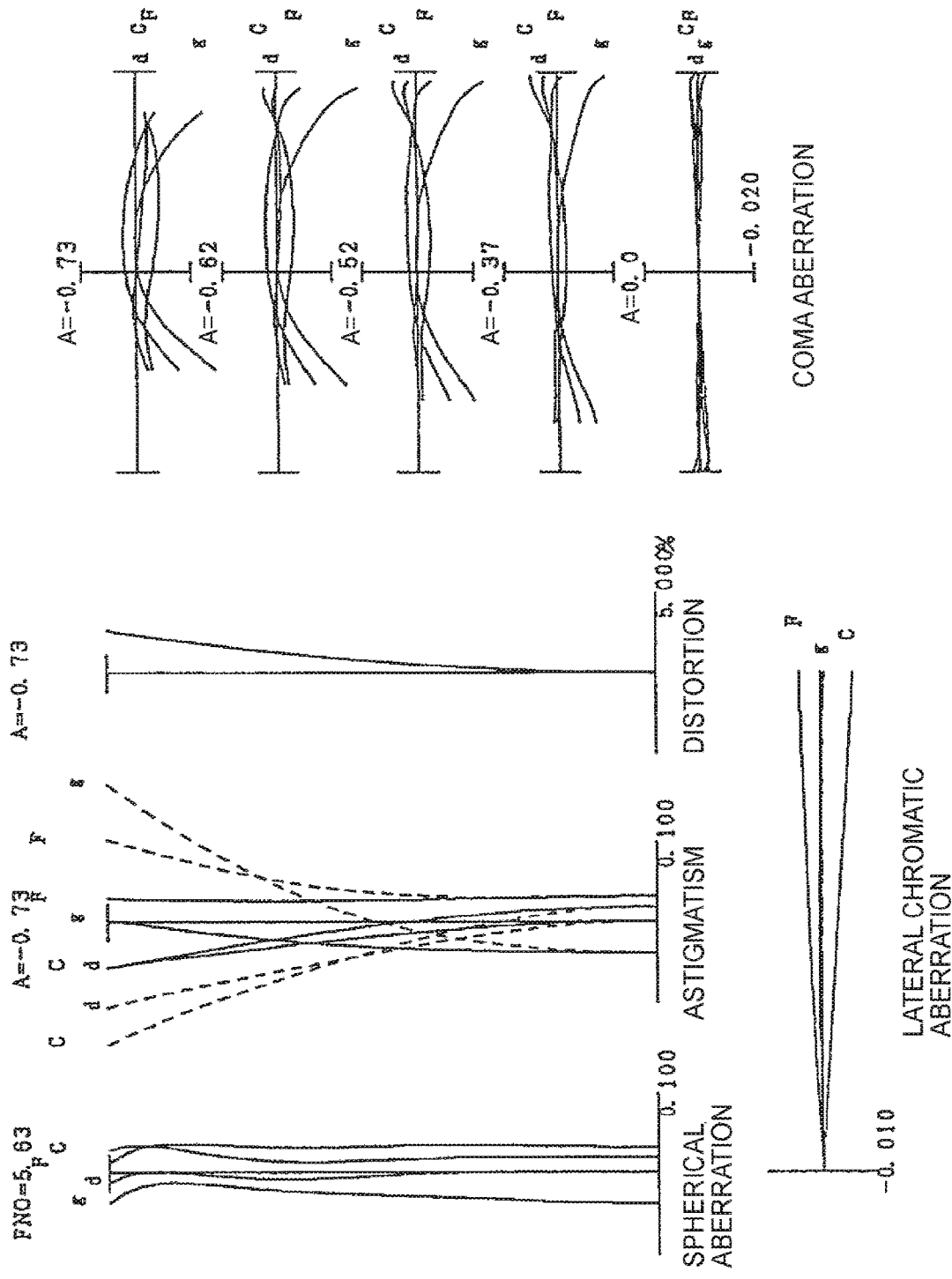

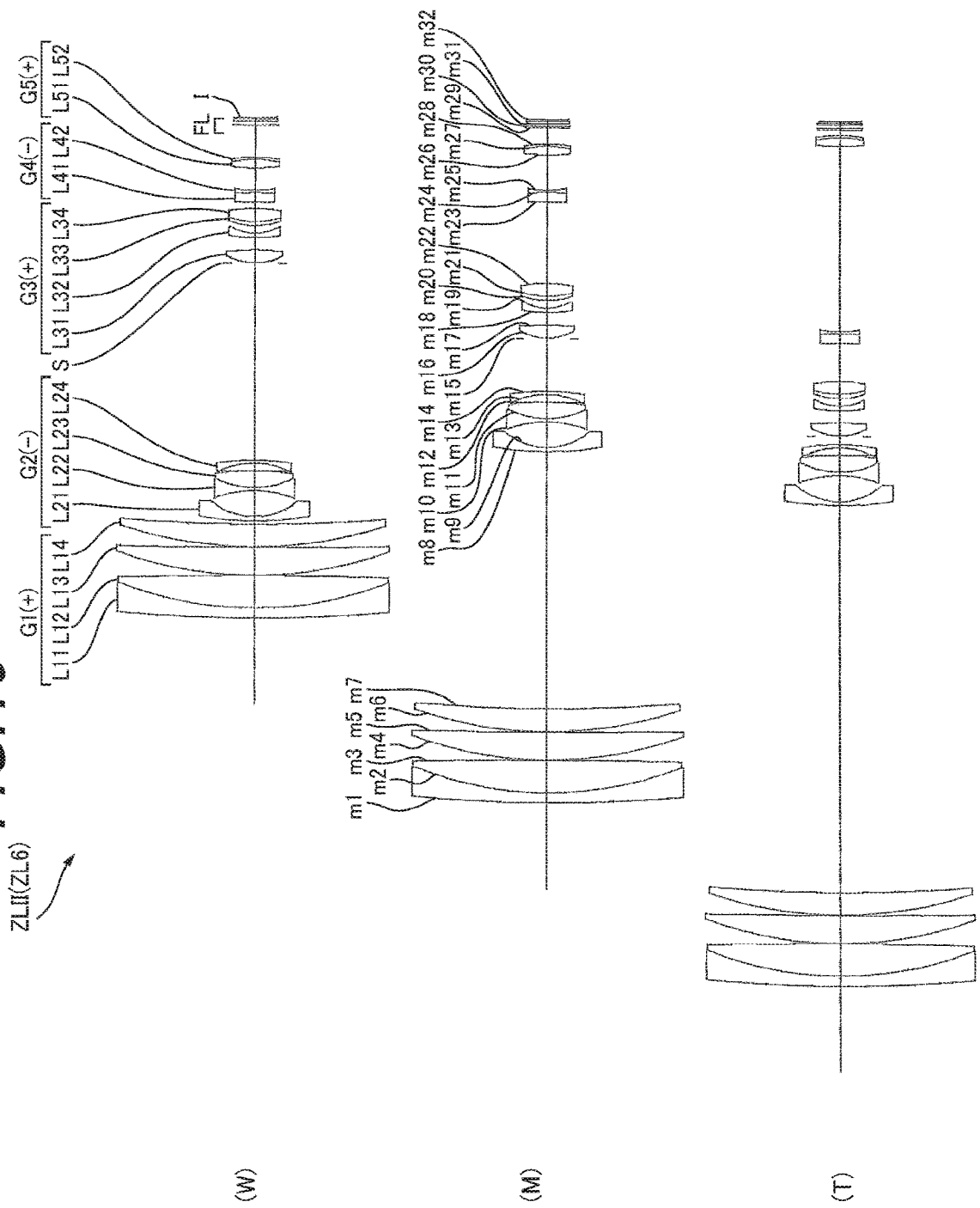

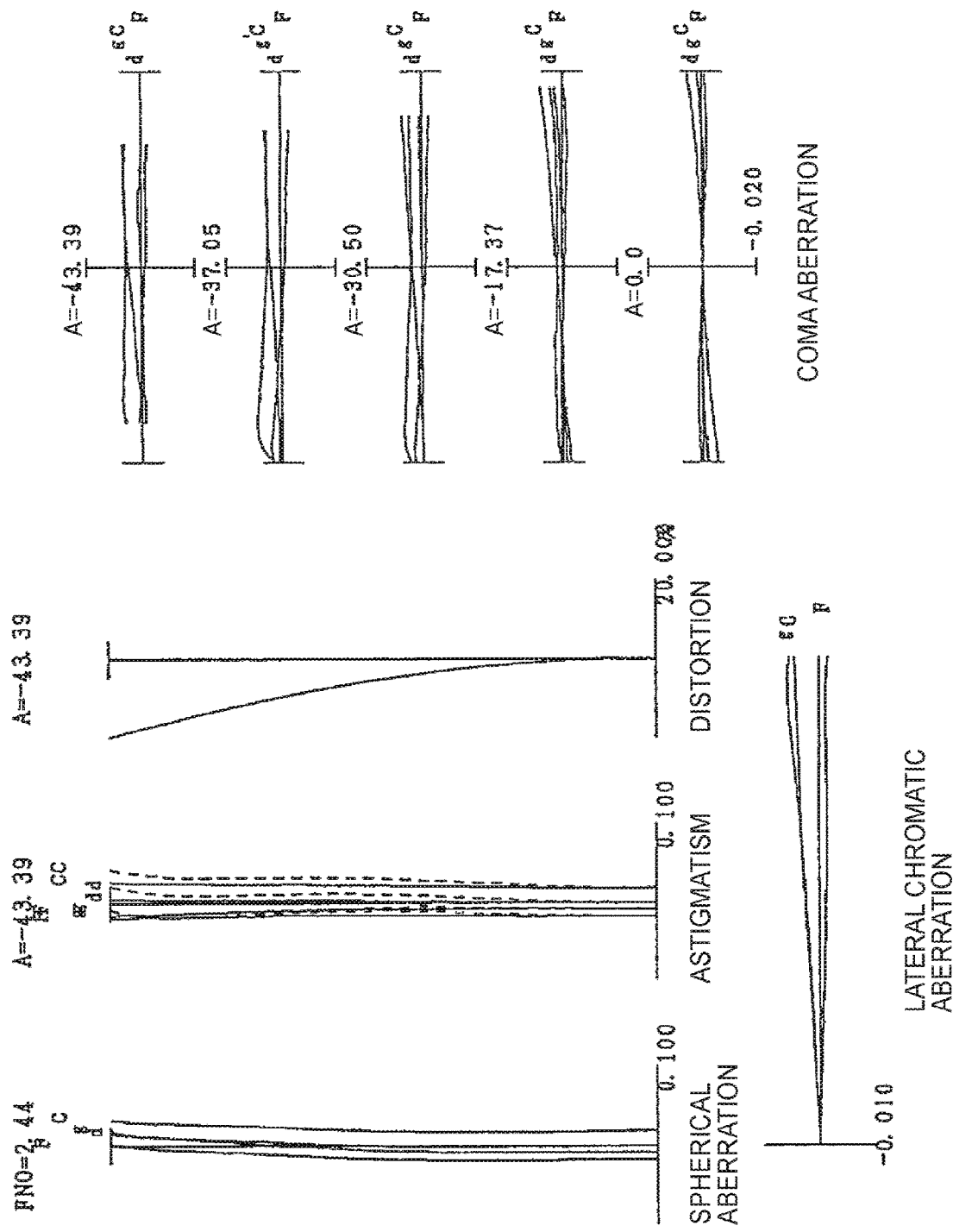

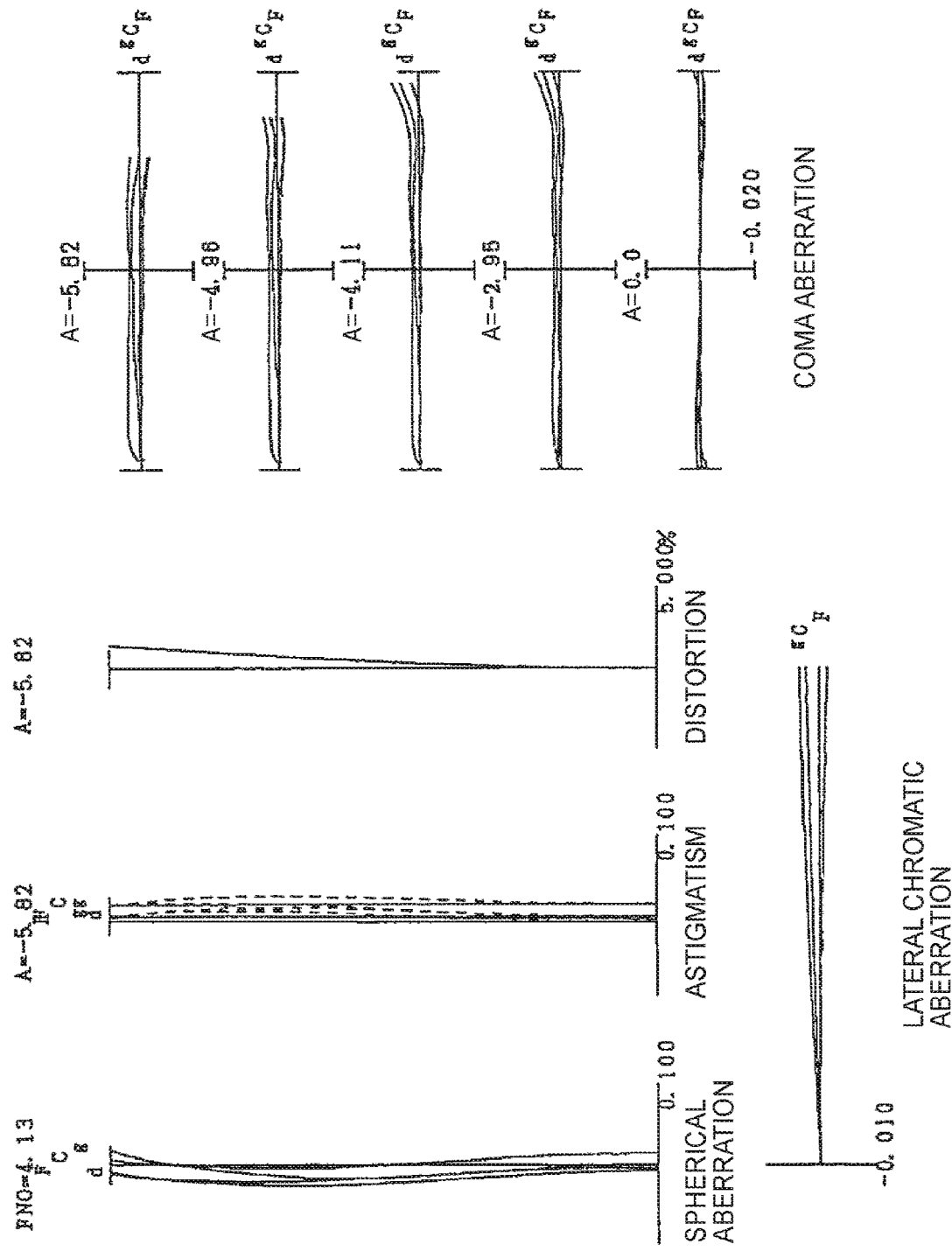

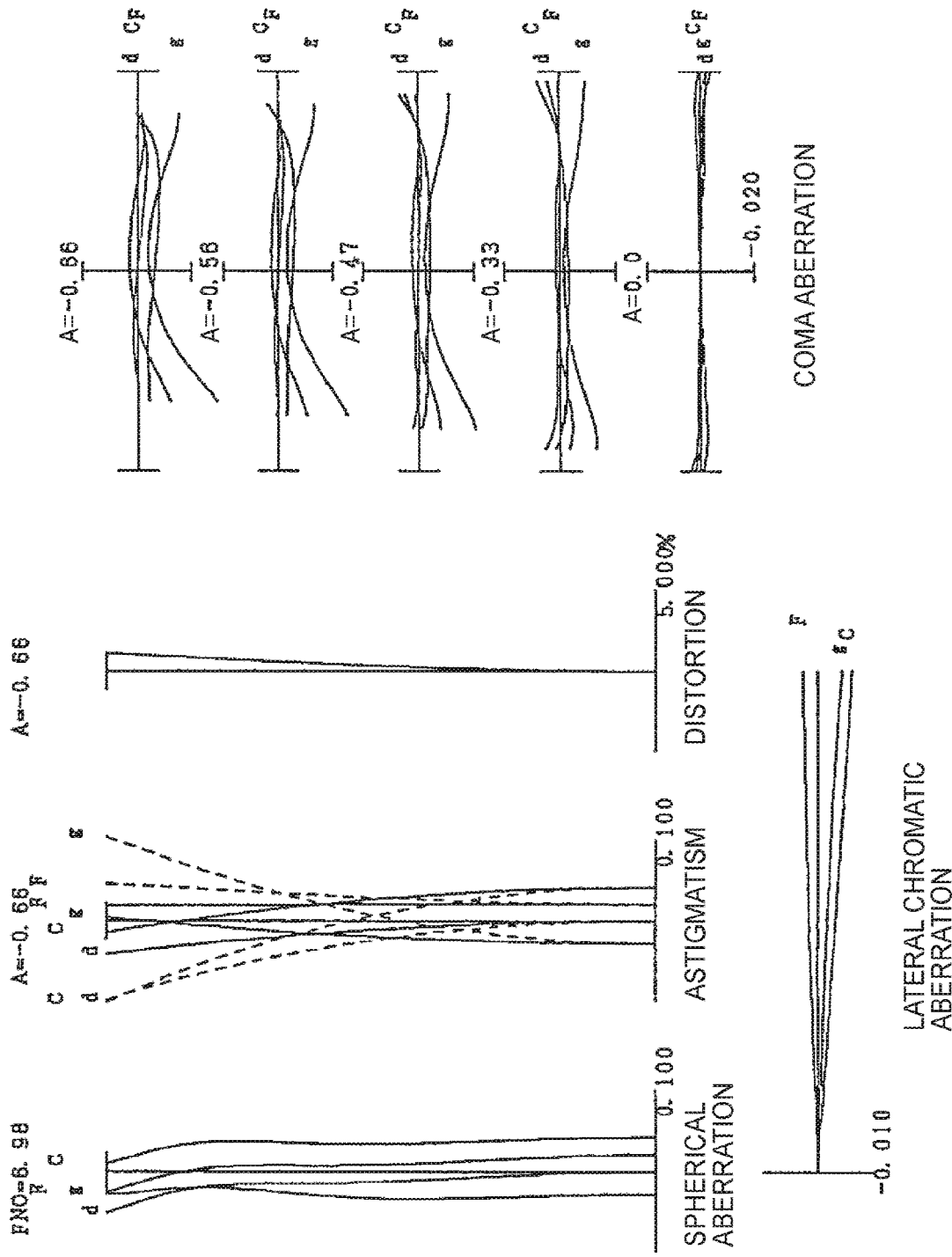

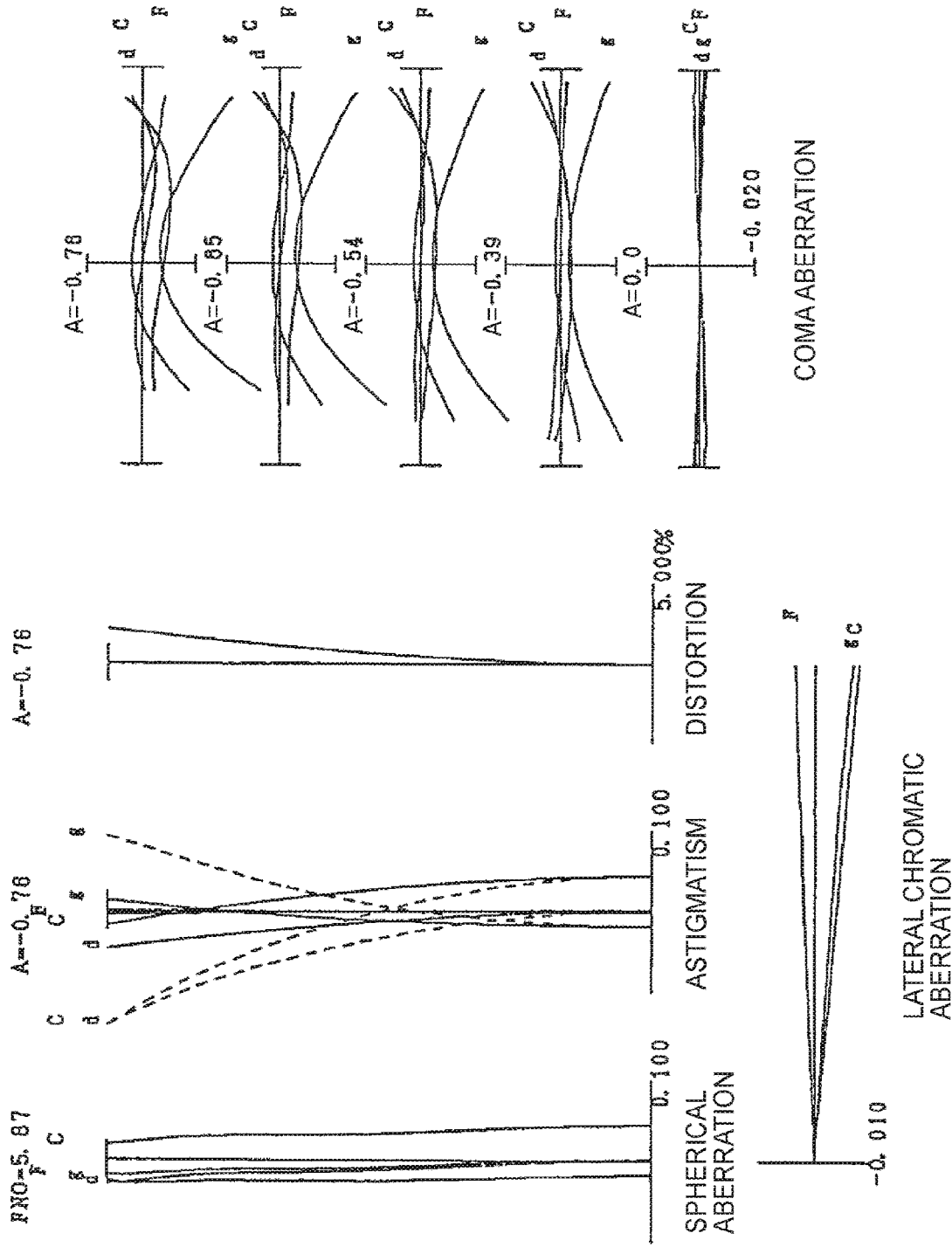

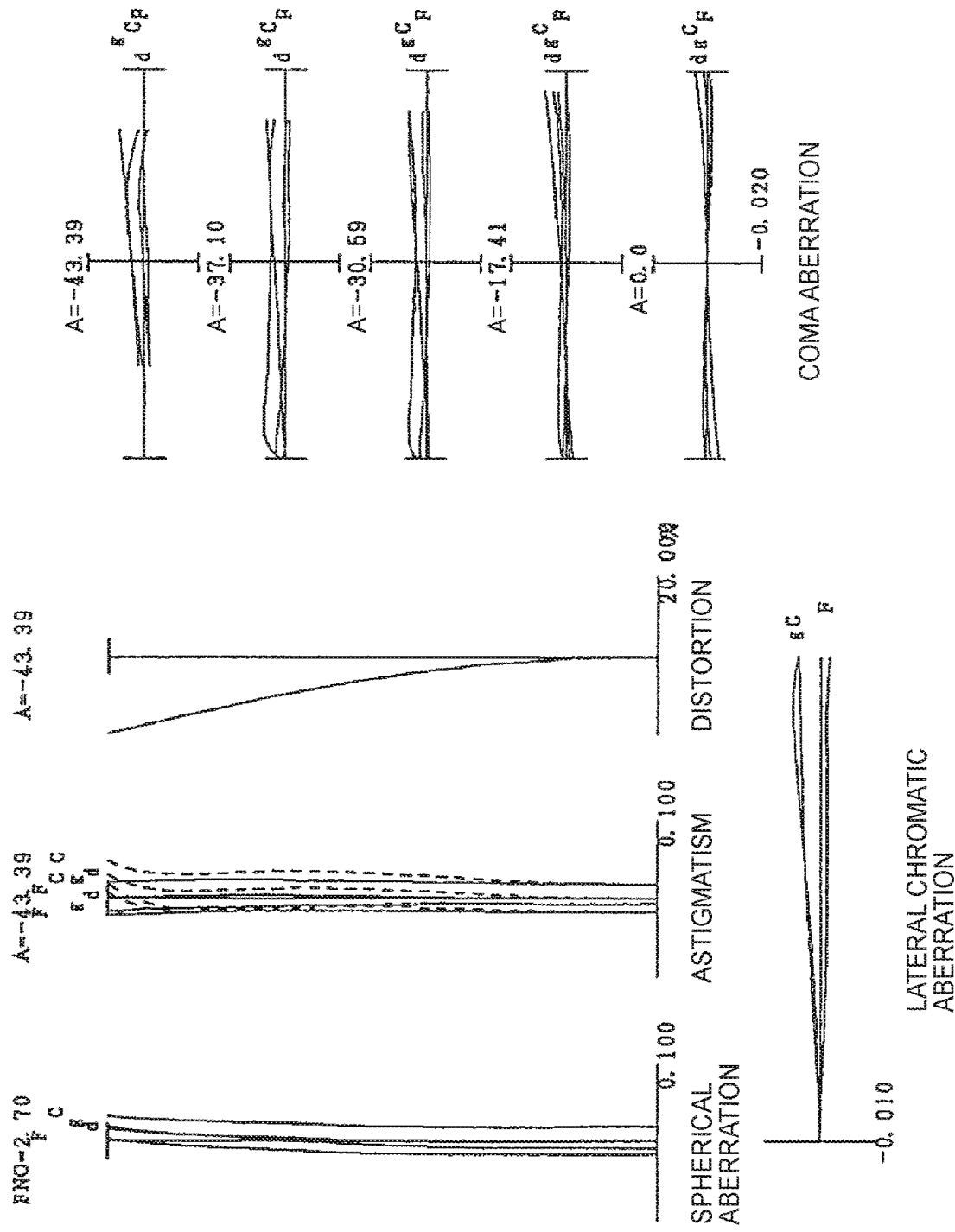

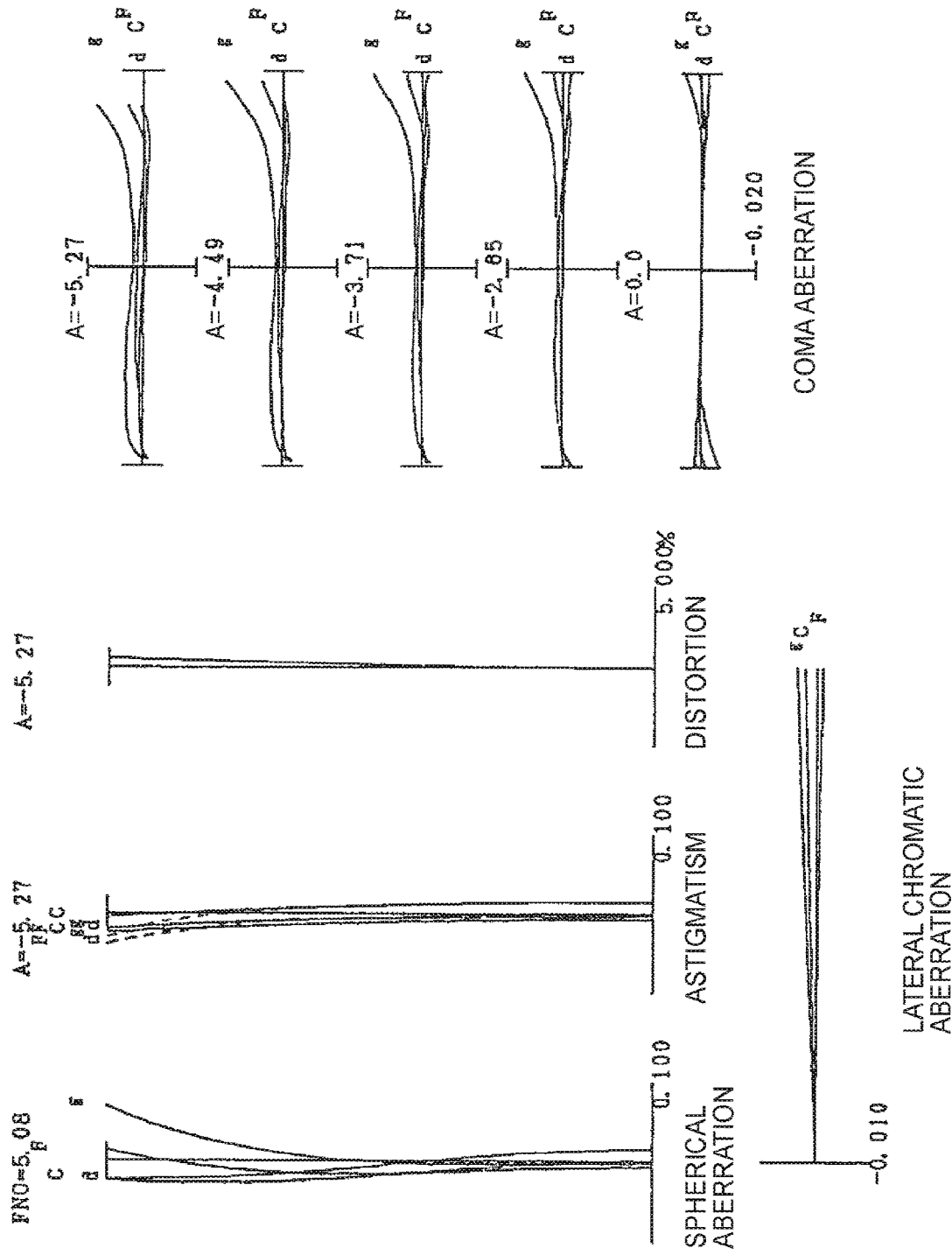

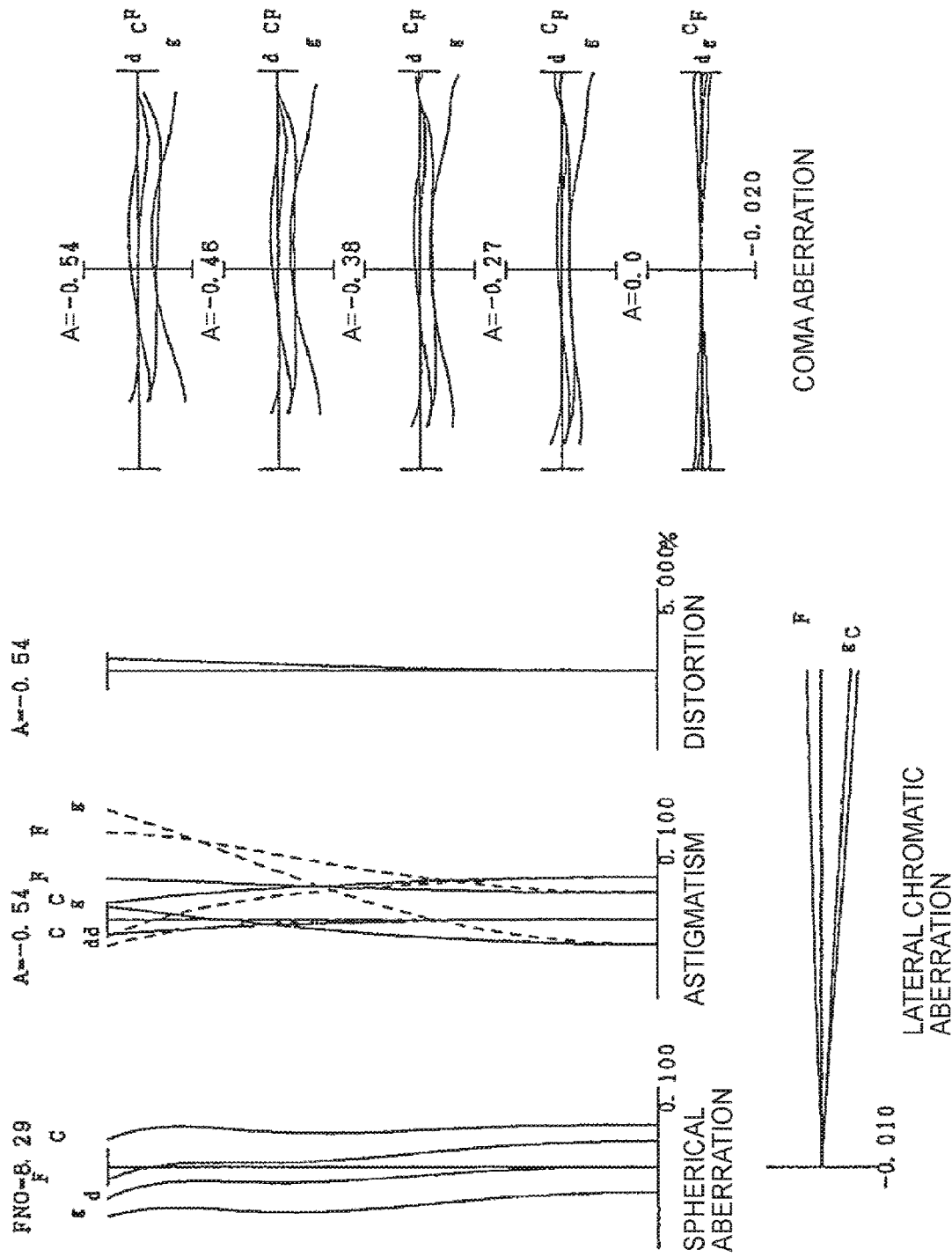

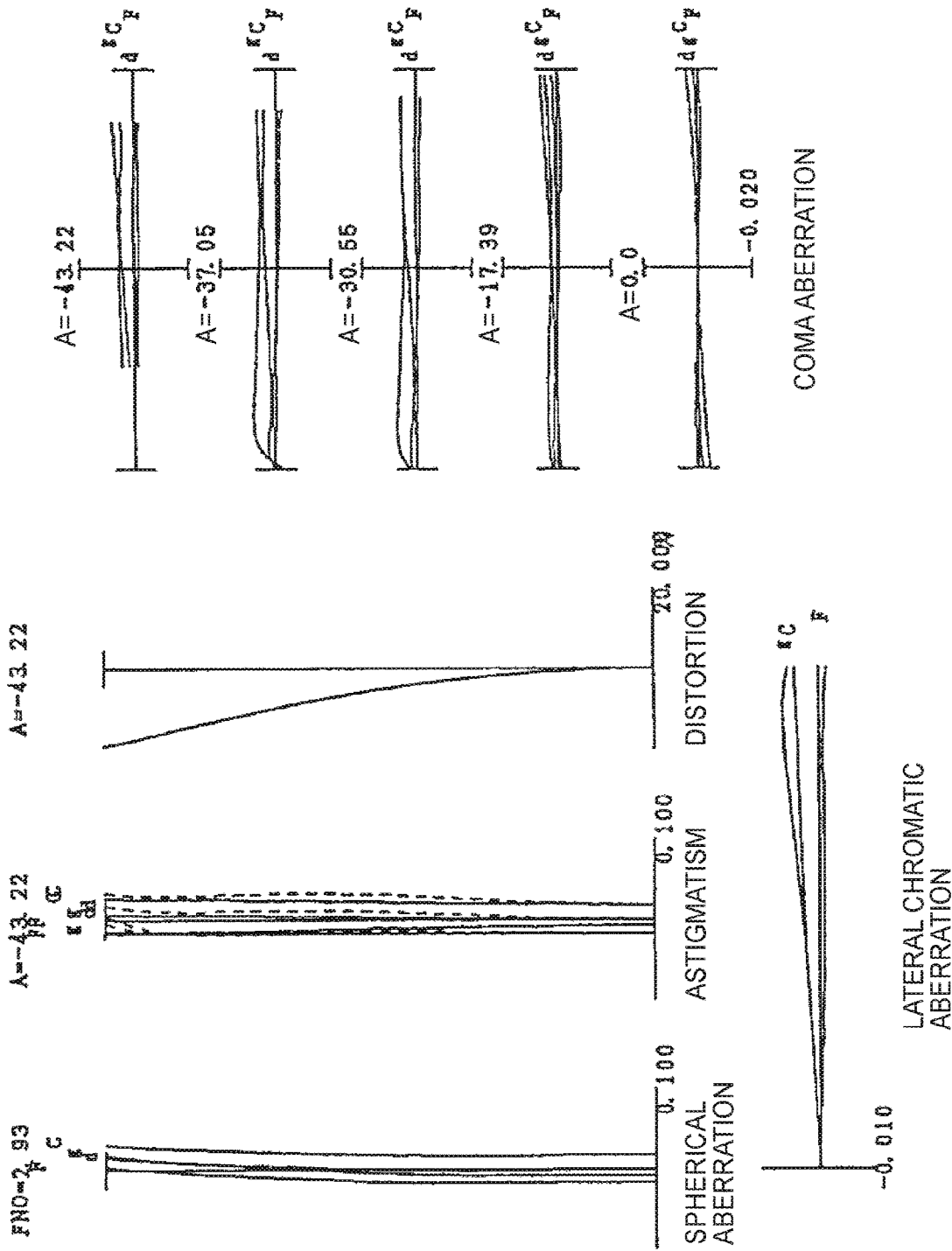

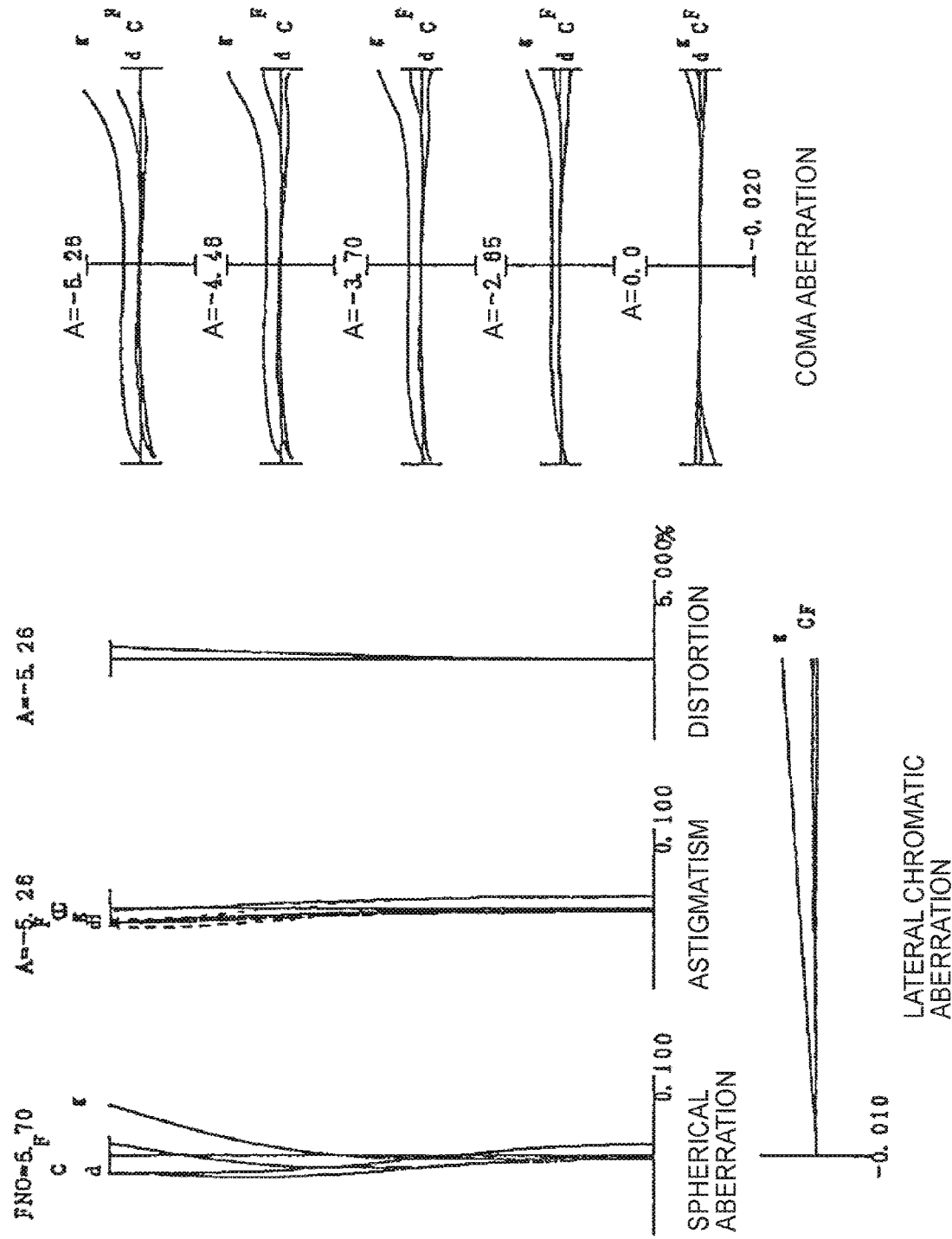

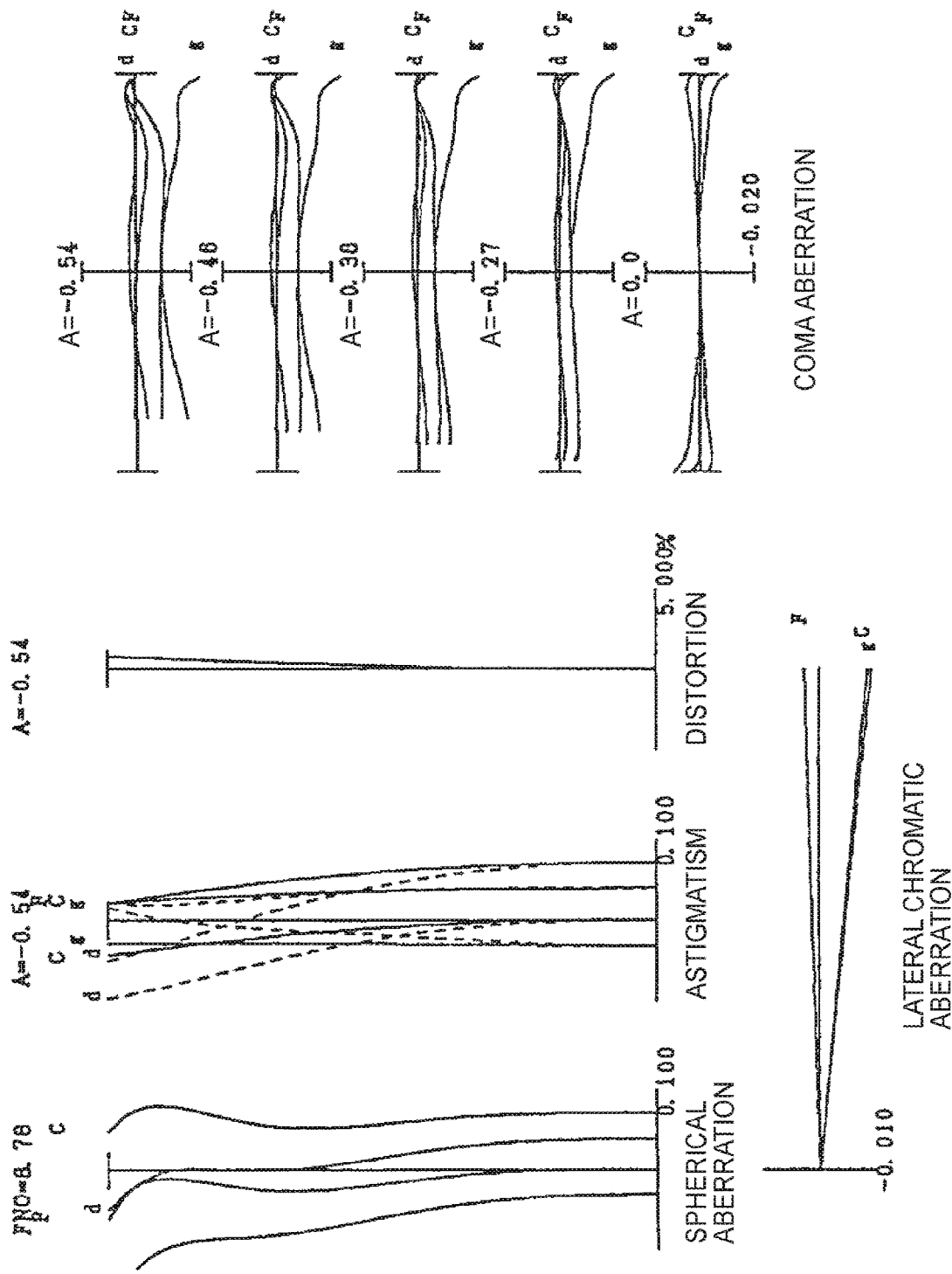

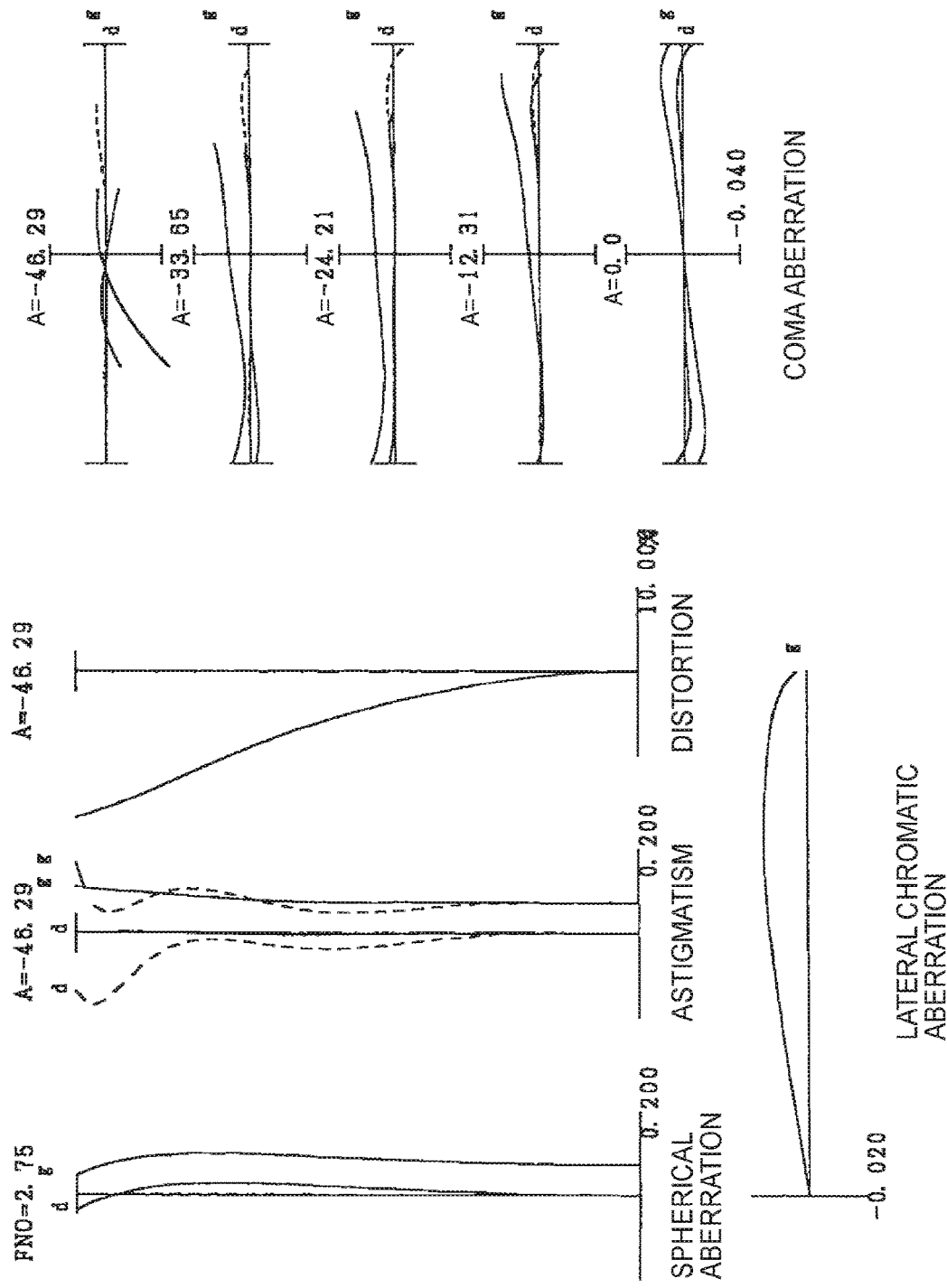

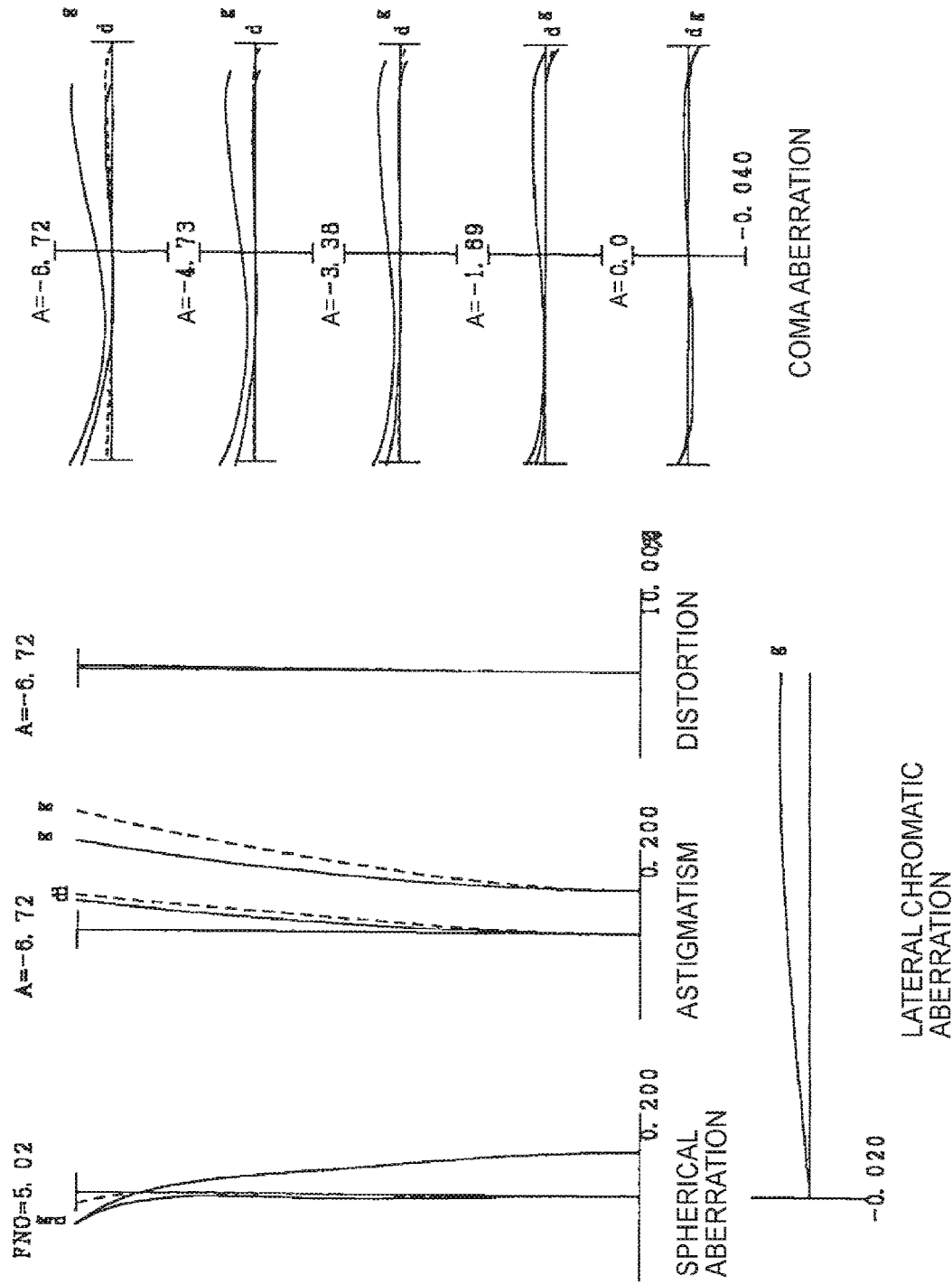

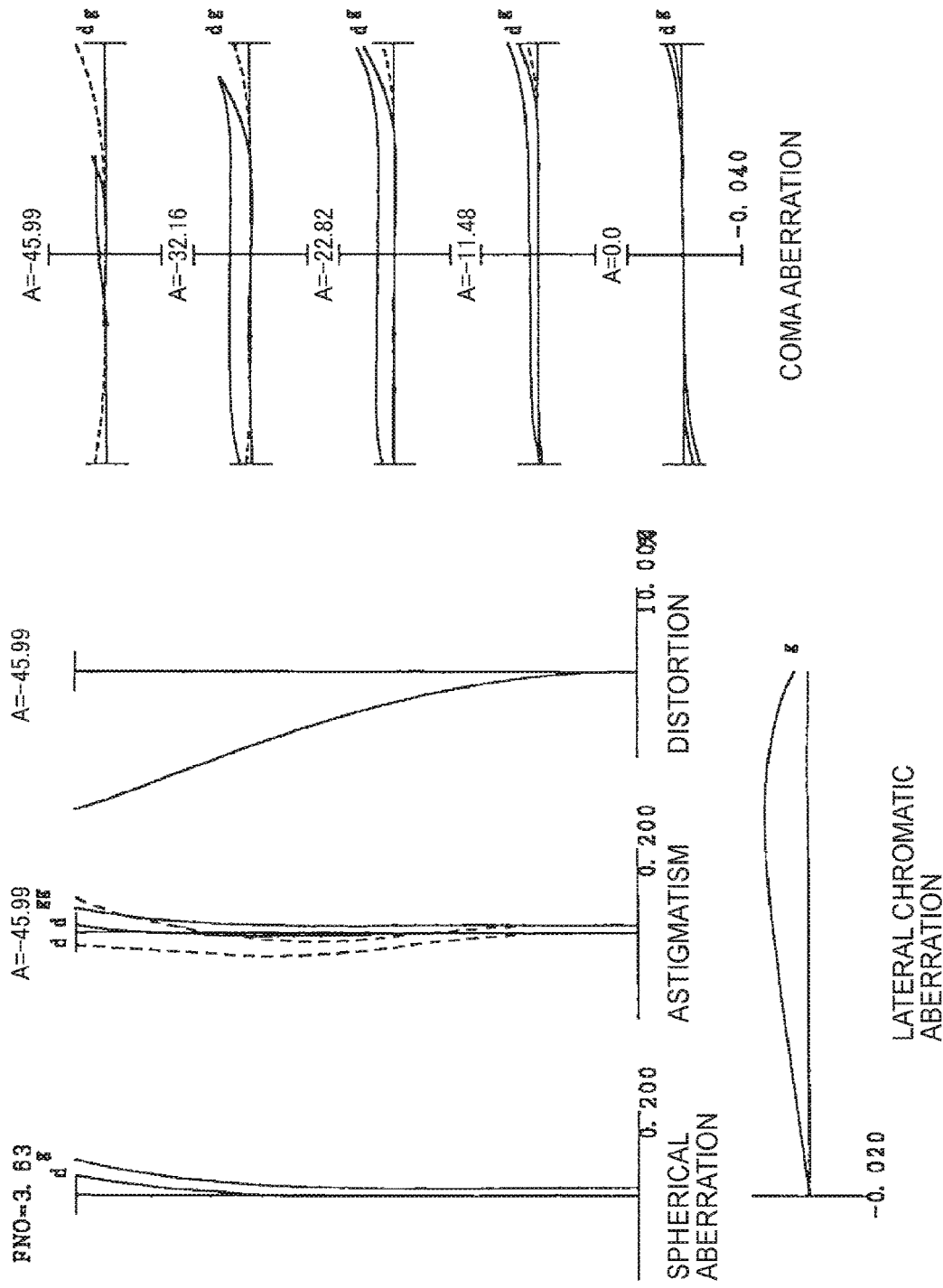

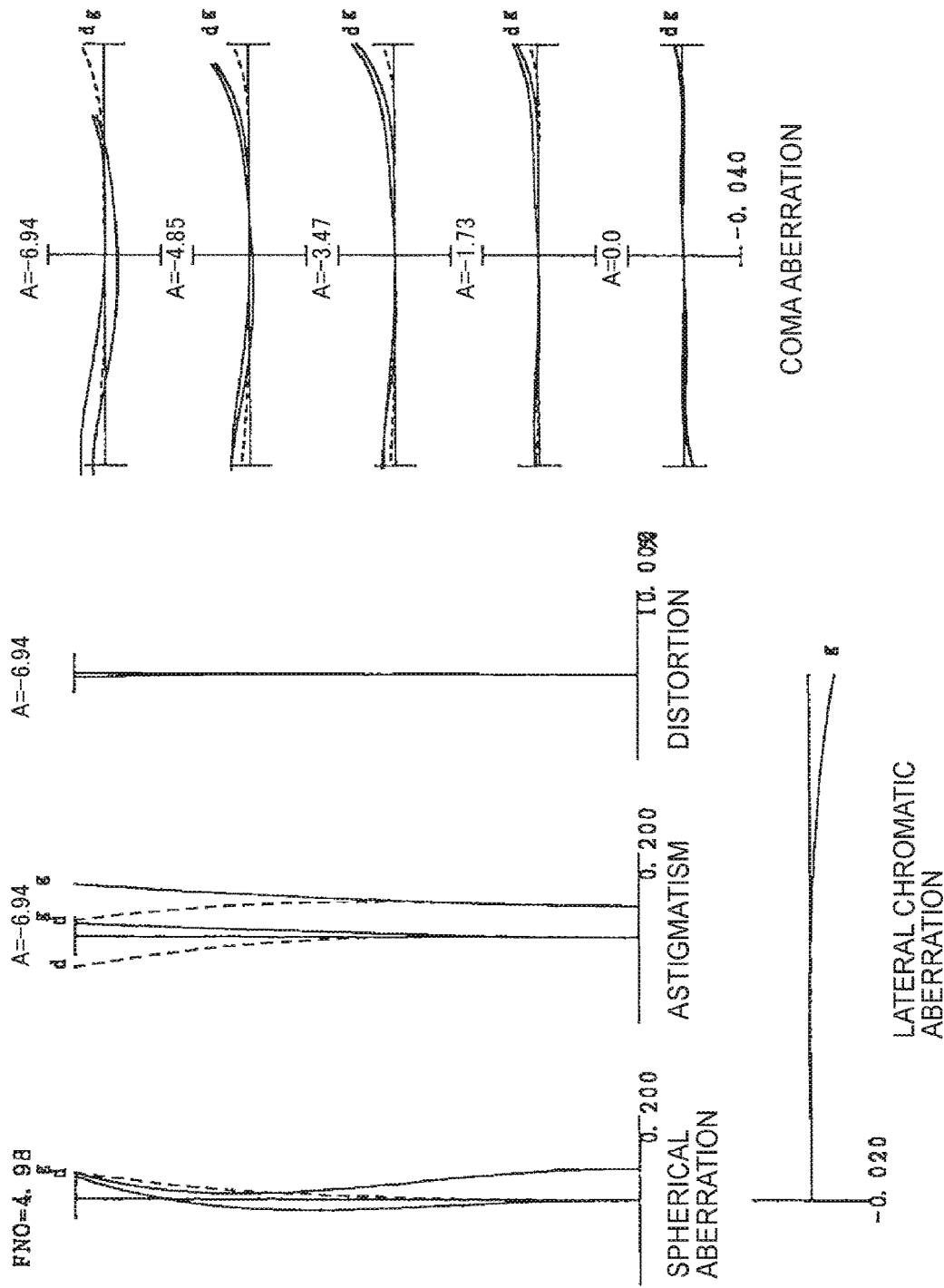

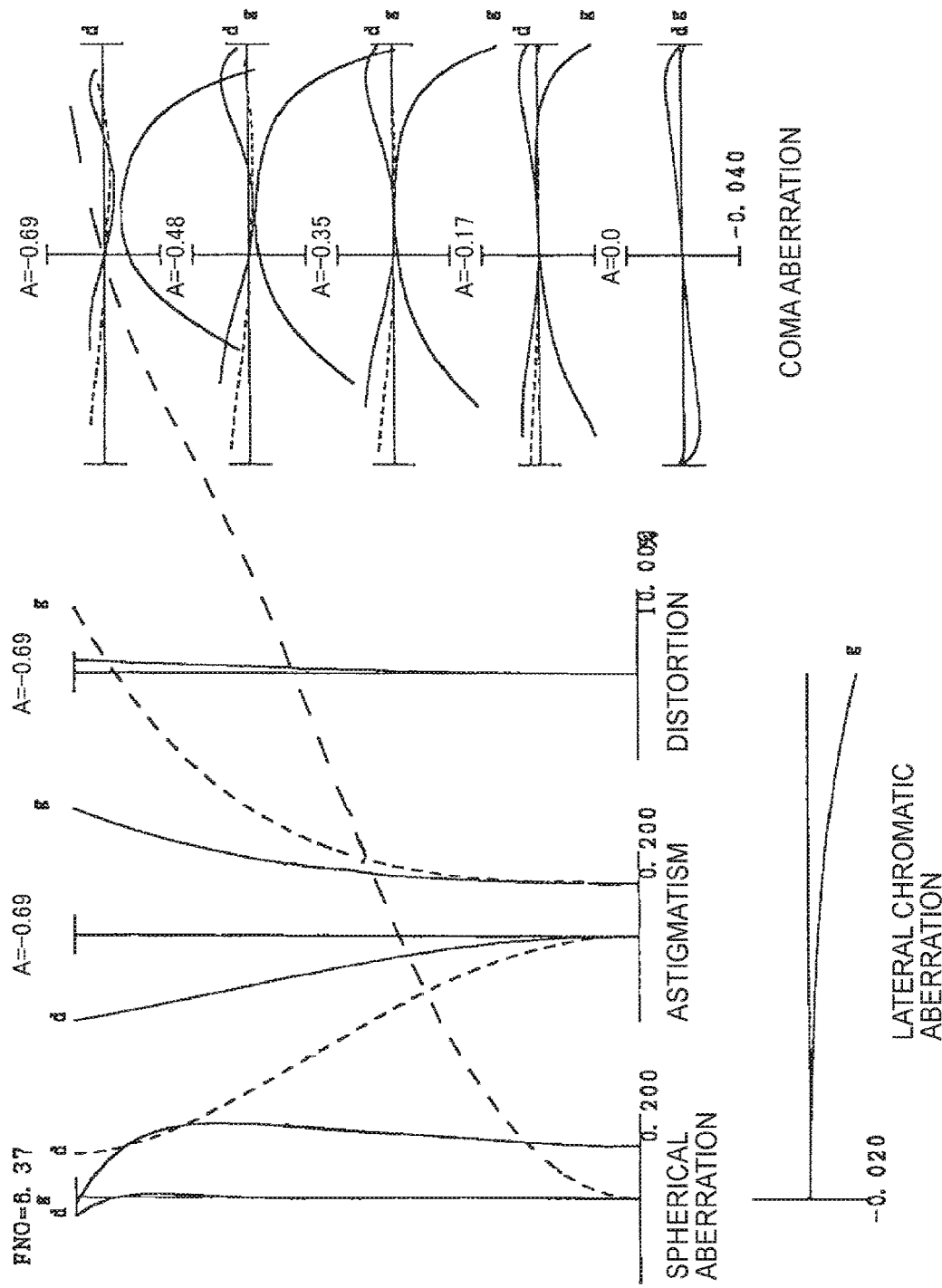

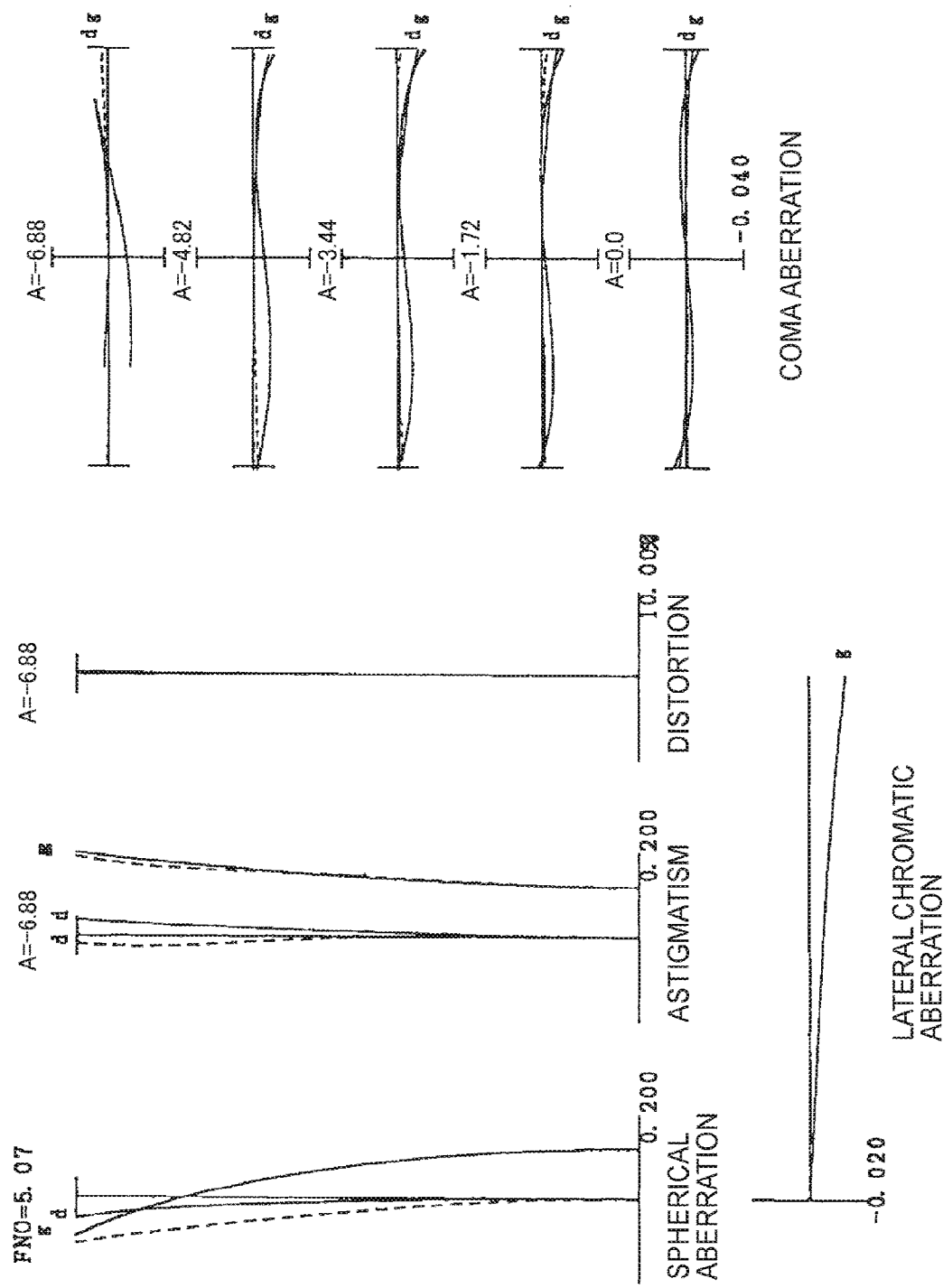

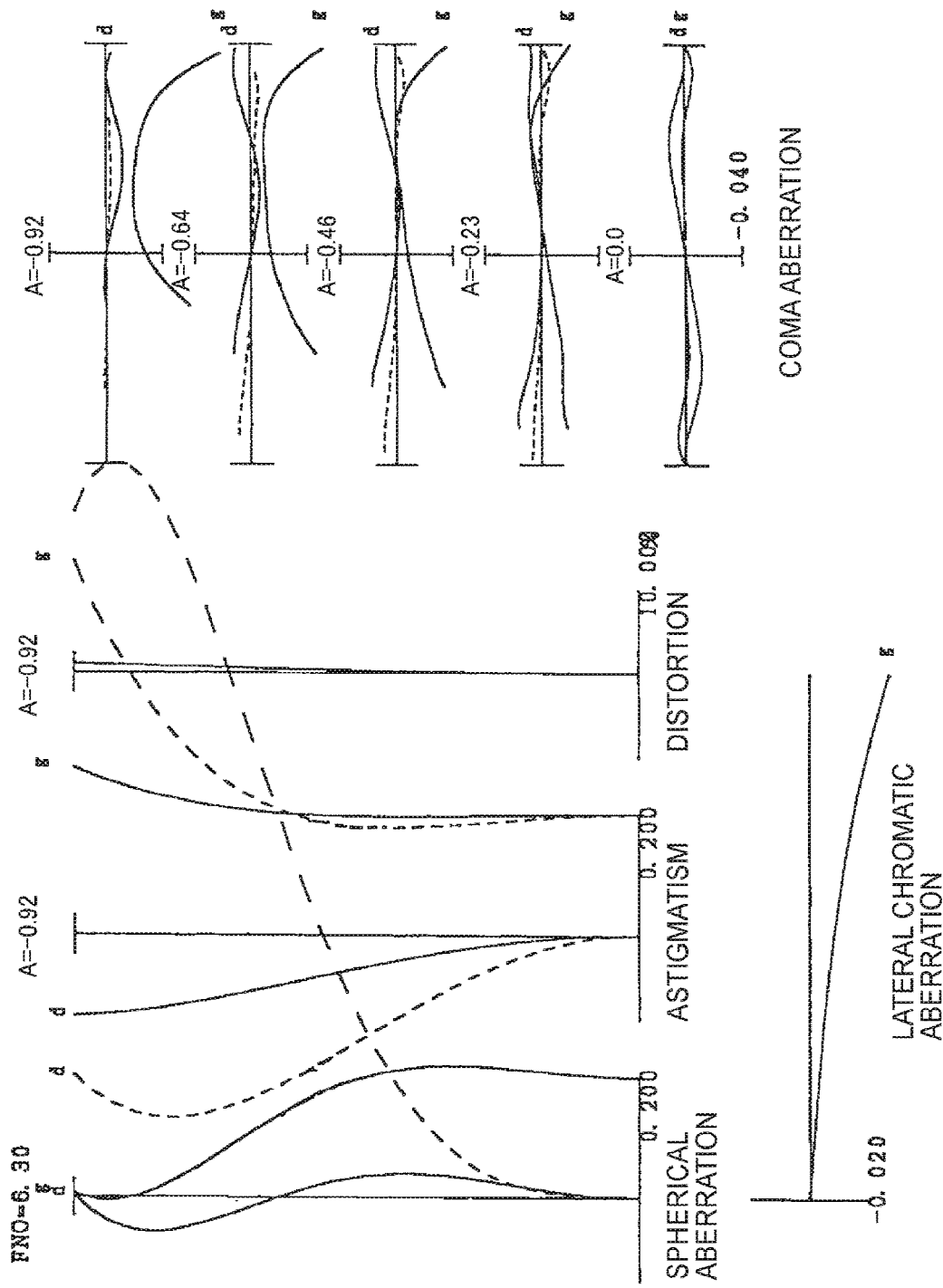

ZOOM LENS, OPTICAL APPARATUS AND METHOD FOR MANUFACTURING THE ZOOM LENS

TECHNICAL FIELD

The present invention relates to a zoom lens, optical apparatus and method for manufacturing the zoom lens.

TECHNICAL BACKGROUND

Conventionally, a zoom lens, which is composed of, in order from an object, a first lens group having positive refractive power, a second lens group having negative refractive power, a third lens group having positive refractive power, a fourth lens group having negative refractive power, and a fifth lens group having positive refractive power, and in which zooming is performed by moving each lens group, is proposed (for instance, refer to Patent Document 1).

Conventionally, a zoom lens, which is composed of, in order from an object, a first lens group having positive refractive power, a second lens group having negative refractive power, a third lens group having positive refractive power, a fourth lens group having negative refractive power, and a fifth lens group having positive refractive power, and in which zooming is performed by moving each lens group, is proposed (for instance, refer to Patent Document 2).

Conventionally, as a zoom lens having a high zooming rate, a zoom lens, which comprises, in order from an object, a first lens group having positive refractive power, a second lens group having negative refractive power, a third lens group having positive refractive power, a fourth lens group having negative refractive power, and a fifth lens group having positive refractive power, and in which zooming is performed by moving each lens group, is proposed (for instance, refer to Patent Document 1).

PRIOR ARTS LIST

Patent Document

Patent Document 1: Japanese Laid-Open Patent Publication No. 2012-98699 (A)
Patent Document 2: Japanese Laid-Open Patent Publication No. 2013-164455 (A)

SUMMARY OF THE INVENTION

Problems to be Solved by the Invention

However, in the conventional zoom lenses, the zooming rates are limited to approximately 50 times, thus it is difficult to ensure good performance with a higher zooming rate than that.

The conventional zoom lenses would not have sufficient optical performance.

Means to Solve the Problems

A zoom lens according to a first present invention comprises, in order from an object, a first lens group having positive refractive power, a second lens group having negative refractive power, a third lens group having positive refractive power, a fourth lens group having negative refractive power, and a fifth lens group having positive refractive power, and zooming is performed by changing distances between each lens group, and the first lens group is composed of three or more than three lenses, the fourth lens group is composed of two or less lenses, and the fifth lens group is composed of two or less lenses and moves to an image surface side upon zooming from a wide angle end state to a telephoto end state, and the following conditional expression is satisfied.

$$8.40 < f1/(-f2)$$

where,
f1 denotes a focal length of the first lens group, and
f2 denotes a focal length of the second lens group.

A zoom lens according to a second present invention comprises, in order from an object, a first lens group having positive refractive power, a second lens group having negative refractive power, a third lens group having positive refractive power, a fourth lens group having negative refractive power, and a fifth lens group having positive refractive power, and zooming is performed by changing distances between each lens group, and the first lens group is composed of three or more lenses, the fourth lens group is composed of two or less lenses, and the fifth lens group is composed of two or less lenses and moves to an image surface side upon zooming from a wide angle end state to a telephoto end state, and the following conditional expression is satisfied.

$$5.80 < Dt12/(-f2)$$

where,
Dt12 denotes a distance on an optical axis from an image side surface of the first lens group in a telephoto end state to an object side surface of the second lens group, and
f2 denotes a focal length of the second lens group.

A zoom lens according to a third present invention comprises, in order from an object, a first lens group having positive refractive power, a second lens group having negative refractive power, a third lens group having positive refractive power, a fourth lens group having negative refractive power, and a fifth lens group having positive refractive power, and zooming is performed by changing distances between each lens group, and the first lens group is composed of three or more lenses, the fourth lens group is composed of two or less lenses, and the fifth lens group is composed of two or less lenses and moves to an image surface side upon zooming from a wide angle end state to a telephoto end state, and the following conditional expressions are satisfied.

$$0.01 < D1/ft < 0.15$$

$$0.70 < Zidwt/Fnwt < 1.10$$

where,
D1 denotes a distance on an optical axis from the object side surface of the first lens group to the image side surface,
ft denotes a focal length of a whole system in a telephoto end state,
$\beta t4$ denotes magnification of the fourth lens group in the telephoto end state,
$\beta t5$ denotes magnification of the fifth lens group in the telephoto end state,
$\beta w4$ denotes magnification of the fourth lens group in the wide angle end state,
$\beta w5$ denotes magnification of the fifth lens group in the wide angle end state, Fnt denotes an f number in the telephoto end state, and
Fnw denotes an f number in the wide angle end state.
Note that the following definitions are applicable.

$$Zidwt=\{(1-\beta t4^2)*\beta t5^2\}/\{(1-\beta w4^2)*\beta w5^2\}$$

$$Fnwt=Fnt/Fnw$$

A zoom lens according to a fourth present invention comprises, in order from an object, a first lens group having positive refractive power, a second lens group having negative refractive power, a third lens group having positive refractive power, a fourth lens group having negative refractive power, and a fifth lens group having positive refractive power, and zooming is performed by changing distances between each lens group, and the first lens group is composed of three or more lenses, and the fifth lens group moves to an image surface side upon zooming from a wide angle end state to a telephoto end state, and the following conditional expression is satisfied.

$$0.020<(-f2)/ft<0.031$$

where,
f2 denotes a focal length of the second lens group in the telephoto end state, and
ft denotes a focal length of a whole system in the telephoto end state.

A zoom lens according to a fifth present invention comprises, in order from an object, a first lens group having positive refractive power, a second lens group having negative refractive power, a third lens group having positive refractive power, a fourth lens group having negative refractive power, and a fifth lens group having positive refractive power, and the following conditional expressions is satisfied.

$$33.00<ft/(-f2)<46.00$$

$$1.60<(Fnt\cdot f1)/ft<2.30$$

$$43.00<\beta 2t\cdot\beta 3t/\beta 2w\cdot\beta 3w<65.00$$

where,
ft denotes a focal length of a whole system in a telephoto end state,
f2 denotes a focal length of the second lens group,
Fnt denotes an F value in the telephoto end state,
f1 denotes a focal length of the first lens group,
β2t denotes magnification of the second lens group in the telephoto end state,
β3t denotes magnification of the third lens group in the telephoto end state,
β2w denotes magnification of the second lens group in a wide angle end state, and
β3w denotes magnification of the third lens group in the wide angle end state.

An optical apparatus according to the present invention is equipped with any one of the zoom lenses according to the first to fifth present inventions.

A method for manufacturing a zoom lens according to the first present invention is a method for manufacturing a zoom lens comprising, in order from an object, a first lens group having positive refractive power, a second lens group having negative refractive power, a third lens group having positive refractive power, a fourth lens group having negative refractive power, and a fifth lens group having positive refractive power, and zooming is performed by changing distances between each lens group, and the first lens group is composed of three or more lenses, the fourth lens group is composed of two or less lenses, and the fifth lens group is composed of two or less lenses and moves to an image surface side upon zooming from a wide angle end state to a telephoto end state, and each lens is disposed within a lens barrel so that the following conditional expression is satisfied.

$$8.40<f1/(-f2)$$

where,
f1 denotes a focal length of the first lens group, and
f2 denotes a focal length of the second lens group.

A method for manufacturing a zoom lens according to the second present invention is a method for manufacturing a zoom lens comprising, in order from an object, a first lens group having positive refractive power, a second lens group having negative refractive power, a third lens group having positive refractive power, a fourth lens group having negative refractive power, and a fifth lens group having positive refractive power, and zooming is performed by changing distances between each lens, and the first lens group is composed of three or more lenses, the fourth lens group is composed of two or less lenses, and the fifth lens group is composed of two or less lenses and moves to an image surface side upon zooming from a wide angle end state to a telephoto end state, and each lens is disposed within a lens barrel so that the following conditional expression is satisfied.

$$5.80<Dt12/(-f2)$$

where,
Dt12 denotes a distance on an optical axis from an image side surface of the first lens group in the telephoto end state to an object side surface of the second lens group, and
f2 denotes a focal length of the second lens group.

A method for manufacturing a zoom lens according to the third present invention is a method for manufacturing a zoom lens comprising, in order from an object, a first lens group having positive refractive power, a second lens group having negative refractive power, a third lens group having positive refractive power, a fourth lens group having negative refractive power, and a fifth lens group having positive refractive power, and zooming is performed by changing distances between each lens group, and the first lens group is composed of three or more lenses, the fourth lens group is composed of two or less lenses, and the fifth lens group is composed of two or less lenses and moves to an image surface side upon zooming from a wide angle end state to a telephoto end state, and each lens is disposed within a lens barrel so that the following conditional expressions are satisfied.

$$0.01<D1/ft<0.15$$

$$0.70<Zidwt/Fnwt<1.10$$

where,
D1 denotes a distance on an optical axis from an object side surface of the first lens group to an image side surface,
ft denotes a focal length of a whole system in the telephoto end state,
βt4 denotes magnification of the fourth lens group in the telephoto end state,
βt5 denotes magnification of the fifth lens group in the telephoto end state,
βw4 denotes magnification of the fourth lens group in the wide angle end state, βw5 denotes magnification of the fifth lens group in the wide angle end state, Fnt denotes an f number in the telephoto end state, and Fnw denotes an f number in the wide angle end state.

Note that the following definitions are applicable.

$$Zidwt=\{(1-\beta t4^2)*\beta t5^2\}/\{(1-\beta w4^2)*\beta w5^2\}$$

$$Fnwt=Fnt/Fnw$$

A method for manufacturing a zoom lens according to the fourth present invention is a method for manufacturing a zoom lens comprising, in order from an object, a first lens group having positive refractive power, a second lens group having negative refractive power, a third lens group having positive refractive power, a fourth lens group having negative refractive power, and a fifth lens group having positive refractive power, and zooming is performed by changing distances between each lens group, and the first lens group is composed of three or more lenses, and the fifth lens group moves to an image surface side upon zooming from a wide angle end state to a telephoto end state, and each lens is disposed within a lens barrel so that the following conditional expression is satisfied.

$$0.020<(-f2)/ft<0.031$$

where, f2 denotes a focal length of the second lens group in the telephoto end state, and ft denotes a focal length of a whole system in the telephoto end state.

A method for manufacturing a zoom lens according to the fifth present invention is a method for manufacturing a zoom lens comprising, in order from an object, a first lens group having positive refractive power, a second lens group having negative refractive power, a third lens group having positive refractive power, a fourth lens group having negative refractive power, and a fifth lens group having positive refractive power, and each lens is disposed within a lens barrel so that the following conditional expressions are satisfied.

$$33.00<ft/(-f2)<46.00$$

$$1.60<(Fnt \cdot f1)/ft<2.30$$

$$43.00<\beta 2t \cdot \beta 3t/(\beta 2w \cdot \beta 3w)<65.00$$

where, ft denotes a focal length of a whole system in the telephoto end state, f2 denotes a focal length of the second lens group, Fnt denotes an F value in the telephoto end state, f1 denotes a focal length of the first lens group, β2t denotes magnification of the second lens group in the telephoto end state, β3t denotes magnification of the third lens group in the telephoto end state, β2w denotes magnification of the second lens group in the wide angle end state, and β3w denotes magnification of the third lens group in the wide angle end state.

BRIEF DESCRIPTION OF THE DRAWINGS

FIG. 1 illustrates a sectional view showing a configuration of a zoom lens according to Example 1, where (W) depicts a wide angle end state, (M) depicts an intermediate focal length state, and (T) depicts positions of each lens group in a telephoto end state.

FIGS. 2A, 2B and 2C illustrate graphs showing various aberrations upon focusing on imaging distance infinity regarding the zoom lens according to Example 1, where FIG. 2A depicts a wide angle state, FIG. 2B depicts an intermediate focal length state, and FIG. 2C depicts a telephoto end state.

FIG. 3 illustrates a sectional view showing a configuration of a zoom lens according to Example 2, where (W) depicts a wide angle end state, (M) depicts an intermediate focal length state, and (T) depicts a position of each lens group in a telephoto end state.

FIGS. 4A, 4B and 4C illustrate graphs showing various aberrations upon focusing on imaging distance infinity regarding the zoom lens according to Example 2, where FIG. 4A depicts a wide angle end state, FIG. 4B depicts an intermediate focal length status, and FIG. 4C depicts a telephoto end state.

FIG. 5 illustrates a sectional view showing a configuration of a zoom lens according to Example 3, where (W) depicts a wide angle end state, (M) depicts an intermediate focal length state, and (T) depicts a position of each lens group in a telephoto end state.

FIGS. 6A, 6B and 6C illustrate graphs showing various aberrations upon focusing on imaging distance infinity regarding the zoom lens according to Example 3, where FIG. 6A depicts a wide angle end state, FIG. 6B depicts an intermediate focal length state, and FIG. 6C depicts a telephoto end state.

FIGS. 12A, 12B and 12C illustrate graphs showing various aberrations upon focusing on imaging distance infinity regarding the zoom lens according to Example 4, where FIG. 12A depicts a wide angle end state, FIG. 12B depicts an intermediate focal length state, and FIG. 12C depicts a telephoto end state.

FIGS. 14A, 14B and 14C illustrate graphs showing various aberrations upon focusing on imaging distance infinity regarding a zoom lens according to Example 5, where FIG. 14A depicts a wide angle end state, FIG. 14B depicts an intermediate focal length status, and FIG. 14C depicts a telephoto end state.

FIG. 15 illustrates a sectional view showing a configuration of a zoom lens according to Example 6, where (W) depicts a wide angle end state, (M) depicts an intermediate focal length state, and (T) depicts a position of each lens group in a telephoto end state.

FIGS. 16A, 16B and 16C illustrate graphs showing various aberrations upon focusing on imaging distance infinity regarding the zoom lens according to Example 6, where FIG. 16A depicts a wide angle end state, FIG. 16B depicts an intermediate focal length state, and FIG. 16C depicts a telephoto end state.

FIGS. 18A, 18B and 18C illustrate graphs showing various aberrations upon focusing on imaging distance infinity regarding a zoom lens according to Example 7, where FIG. 18A depicts a wide angle end state, FIG. 183 depicts an intermediate focal length state, and FIG. 18C depicts a telephoto end state.

FIGS. 20A, 20B and 20C illustrate graphs showing various aberrations upon focusing on imaging distance infinity regarding a zoom lens according to Example 8, where FIG. 20A depicts a wide angle end state, FIG. 20B depicts an intermediate focal length state, and FIG. 20C depicts a telephoto end state.

FIGS. 22A, 22B and 22C illustrate graphs showing various aberrations upon focusing on imaging distance infinity of the zoom lens according to Example 9, where FIG. 22A depicts a wide angle end state, FIG. 22B depicts an intermediate focal length state, and FIG. 22C depicts a telephoto end state.

FIGS. 27A, 27B and 27C illustrate graphs showing various aberrations upon focusing on imaging distance infinity regarding the zoom lens according to Example 10, where FIG. 27A depicts a wide angle end state, FIG. 27B depicts an intermediate focal length state, and FIG. 27C depicts a telephoto end state.

FIGS. 29A, 29B and 29C illustrate graphs showing various aberrations upon focusing on imaging distance infinity regarding the zoom lens according to Example 11, where FIG. 29A depicts a wide angle end state, FIG. 29B depicts an intermediate focal length state, and FIG. 29C depicts a telephoto end state.

FIGS. 31A, 31B and 31C illustrate graphs showing various aberrations upon focusing on imaging distance infinity regarding a zoom lens according to Example 12, where FIG. 31A depicts a wide angle end state, FIG. 31B depicts an intermediate focal length state, and FIG. 31C depicts a telephoto end state.

Figure 4C:
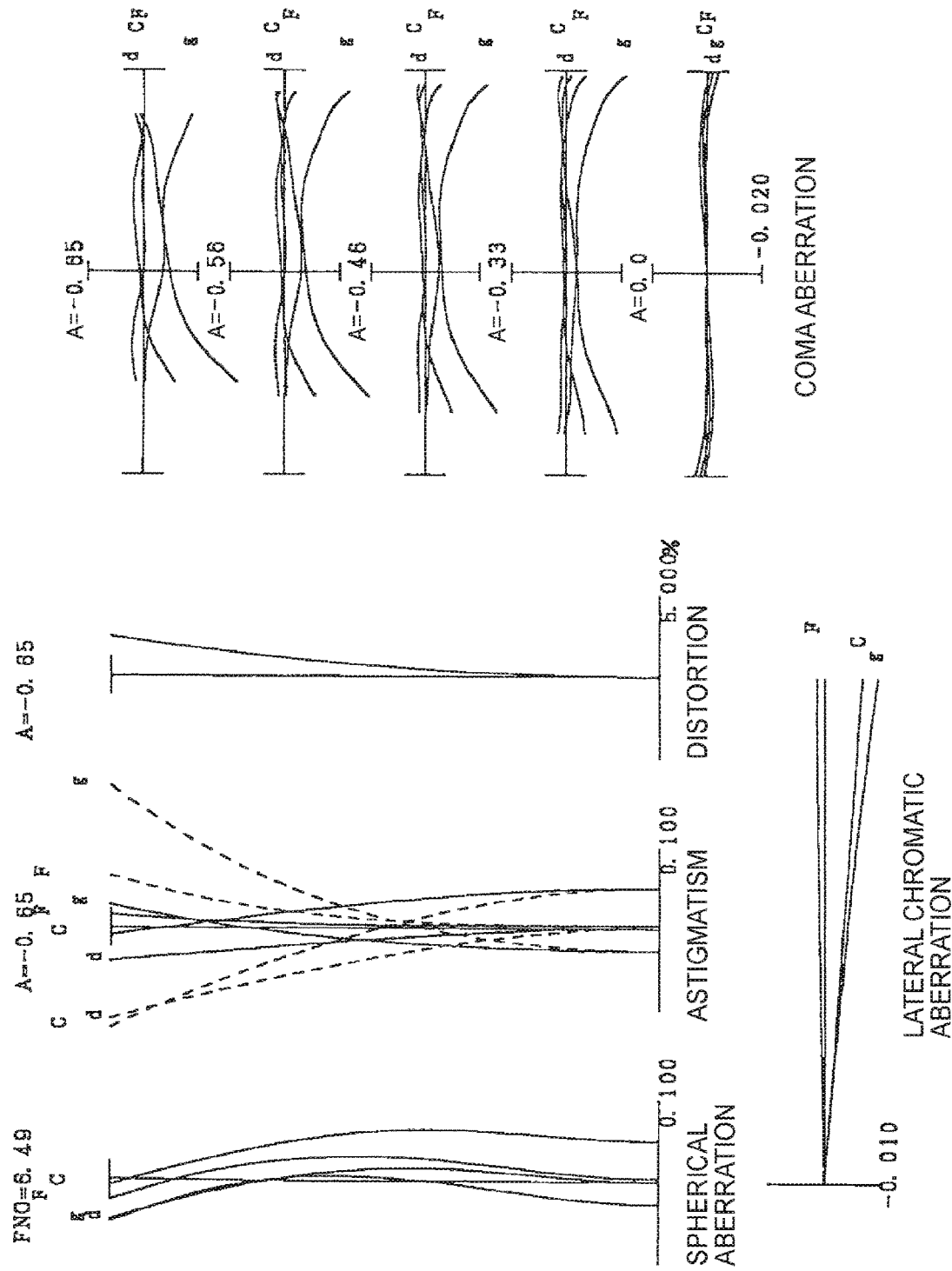

DESCRIPTION OF THE EMBODIMENTS
(FIRST AND SECOND EMBODIMENTS)

A first embodiment will be now described with reference to the drawings. A zoom lens ZLI according to the first embodiment comprises, as illustrated in FIG. 1, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power, and zooming is performed by changing distances between each lens group, and the first lens group G1 is composed of three or more lenses, the fourth lens group G4 is composed of two or less lenses, and the fifth lens group G5 is composed of two or less lenses and moves to an image surface side upon zooming from a wide angle end state to a telephoto end state. With this arrangement, it is possible to achieve high zoom magnification.

In the zoom lens ZLI according to the first embodiment, the following conditional expression (1) is satisfied.

$$8.40 < f1/(-f2) \qquad (1)$$

where, f1 denotes a focal length of the first lens group G1, and f2 denotes a focal length of the second lens group G2.

The conditional expression (1) is a conditional expression for reducing spherical aberration, astigmatism, and chromatic aberration.

When deceeding the lower limit of the conditional expression (1) because the refractive power of the first lens group G1 relatively becomes excessively large, it is advantageous to achieve a small size, however it becomes difficult to correct lateral chromatic aberration and spherical aberration in a telephoto end state. When deceeding the lower limit of the conditional expression (1) because the refractive power of the second lens group G2 relatively becomes excessively small, the total length is enlarged in order to secure a high zooming rate. Here, so as to maintain a small size of the optical system, the refractive power of the first lens group G1 must be enlarged, and spherical aberration in a telephoto end state gets worse.

In order to ensure the advantageous effect of the first embodiment, it is preferable to set the lower limit of the conditional expression (1) to 9.50. In order to further ensure the advantageous effect of the first embodiment, it is preferable to set the lower limit of the conditional expression (1) to 10.50.

In order to ensure the advantageous effect of the first embodiment, it is preferable to set the upper limit of the conditional expression (1) to 20.00. When deceeding the upper limit of the conditional expression (1), spherical aberration, astigmatism, and chromatic aberration become further smaller, therefore it is preferable. In order to ensure the advantageous effect of the first embodiment, it is preferable to set the upper limit of the conditional expression (1) to 17.50. In order to further ensure the advantageous effect of the first embodiment, it is preferable to set the upper limit of the conditional expression (1) to 15.00.

In the zoom lens ZLI according to the first embodiment, it is preferable that the following conditional expression (2) is satisfied.

$$2.70 < \beta t3/\beta w3 \quad (2)$$

where, $\beta t3$ denotes magnification of the third lens group G3 in a telephoto end state, and $\beta w3$ denotes magnification of the third lens group G3 in a wide angle end state.

The conditional expression (2) is a conditional expression for reducing spherical aberration variation upon zooming.

When deceeding the lower limit of the conditional expression (2), the third lens group G3 excessively makes less contribution upon zooming, therefore the first lens group G1 and the second lens group G2 are needed to cover much more zoom actions. Here, so as to maintain the small size of the optical system, when enlarging the refractive power of the first lens group G1, spherical aberration in a telephoto end state and chromatic aberration covering all zoom range gets worse. So as to maintain the small size of the whole optical system, when enlarging the refractive power of the second lens group G2, it becomes difficult to correct axial chromatic aberration in a telephoto end state and astigmatism covering all zoom range.

In order to ensure the advantageous effect of the first embodiment, it is preferable to set the lower limit of the conditional expression (2) to 2.70. In order to further ensure the advantageous effect of the first embodiment, it is preferable to set the lower limit of the conditional expression (2) to 3.50. In order to additionally ensure the advantageous effect of the first embodiment, it is preferable to set the lower limit of the conditional expression (2) to 4.00.

In order to ensure the advantageous effect of the first embodiment, it is preferable to set the upper limit of the conditional expression (2) to 10.00. When deceeding the upper limit of the conditional expression (2), spherical aberration variation upon zooming becomes smaller, therefore it is preferable. In order to ensure the advantageous effect of the first embodiment, it is preferable to set the upper limit of the conditional expression (2) to 8.00. In order to further ensure the advantageous effect of the first embodiment, it is preferable to set the upper limit of the conditional expression (2) to 6.00.

In the zoom lens ZLI according to the first embodiment, it is preferable that the following conditional expression (3) is satisfied.

$$5.80 < Dt12/(-f2) \quad (3)$$

where, Dt12 denotes a distance on the optical axis from an image side surface of the first lens group G1 in a telephoto end state to an object side surface of the second lens group G2.

The conditional expression (3) is a conditional expression for reducing spherical aberration, lateral chromatic aberration, and axial chromatic aberration, and securing good optical performance.

When deceeding the lower limit of the conditional expression (3), a distance between the first lens group G1 and the second lens group G2 in a telephoto end state remarkably becomes small, therefore the refractive power of the first lens group G1 and the second lens group G2 excessively become large. When the refractive power of the first lens group G1 becomes large, it becomes difficult to correct, especially, lateral chromatic aberration and spherical aberration in a telephoto end state. When the refractive power of the second lens group G2 becomes large, it becomes difficult to correct axial chromatic aberration.

In order to ensure the advantageous effect of the first embodiment, it is preferable to set the lower limit of the conditional expression (3) to 7.50. In order to further ensure the advantageous effect of the first embodiment, it is preferable to set the lower limit of the conditional expression (3) to 8.40. In order to additionally ensure the advantageous effect of the first embodiment, it is preferable to set the lower limit of the conditional expression (3) to 9.40.

In order to ensure the advantageous effect of the first embodiment, it is preferable to set the upper limit of the conditional expression (3) to 20.00. When deceeding the upper limit of the conditional expression (3), spherical aberration, lateral chromatic aberration and axial chromatic aberration become small, therefore it is preferable. In order to ensure the advantageous effect of the first embodiment, it is preferable to set the upper limit of the conditional expression (3) to 16.00. In order to further ensure the advantageous effect of the first embodiment, it is preferable to set the upper limit of the conditional expression (3) to 13.00.

In the zoom lens ZLI according to the first embodiment, it is preferable that the fourth lens group G4 is composed of two lenses, and these two lenses are cemented with each other. With this arrangement, it is possible to effectively correct chromatic aberration. By reducing power of each lens surface, it is possible to suppress performance degradation upon manufacturing.

In the zoom lens ZLI according to the first embodiment, it is preferable that the fifth lens group G5 is composed of two lenses, and these two lenses are cemented with each other. With this arrangement, it is possible to effectively correct chromatic aberration. By reducing power of each lens surface, it is possible to suppress performance degradation upon manufacturing.

In the zoom lens ZLI according to the first embodiment, it is preferable that the second lens group G2 is composed of, in order from an object, a negative lens, a negative lens, a positive lens, and a negative lens. With this arrangement, it is possible to effectively correct astigmatism covering all zoom range and axial chromatic aberration in a telephoto end state.

In the zoom lens ZLI according to the first embodiment, it is preferable that the third lens group G3 comprises, in order from an object, a positive lens, a negative lens, a negative lens, and a positive lens. With this arrangement, it is possible to correct coma aberration and spherical aberration at every a wavelength in a telephoto end state with good balance.

In the zoom lens ZLI according to the first embodiment, it is preferable that focusing is performed by moving the fourth lens group G4 along the optical axis. With this arrangement, it is possible to prevent performance degradation upon focusing. However, it is also possible that focusing is performed using other groups, such as the fifth lens group G5, etc.

According to the zoom lens ZLI set forth in the first embodiment equipped with the configurations above, although it is high zoom magnification, the zoom lens having good optical performance can be realized.

Figure 7A:
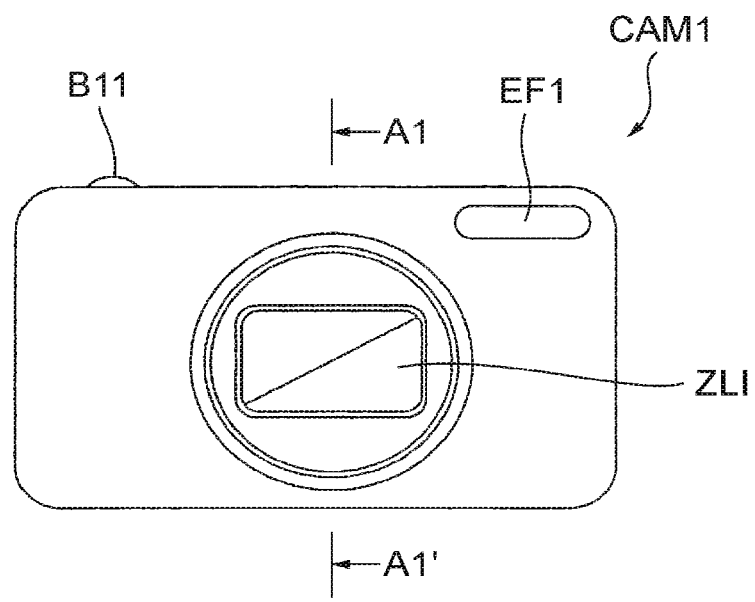
FIG. 7A is a front view of a digital still camera.
Figure 7B:
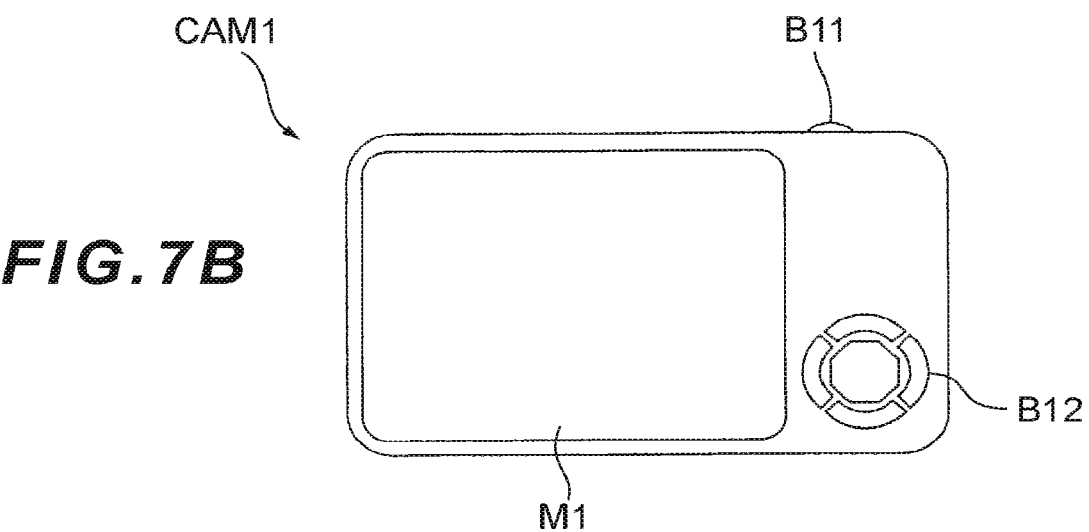
FIG. 7B is a rear view of the digital still camera.
Figure 8:
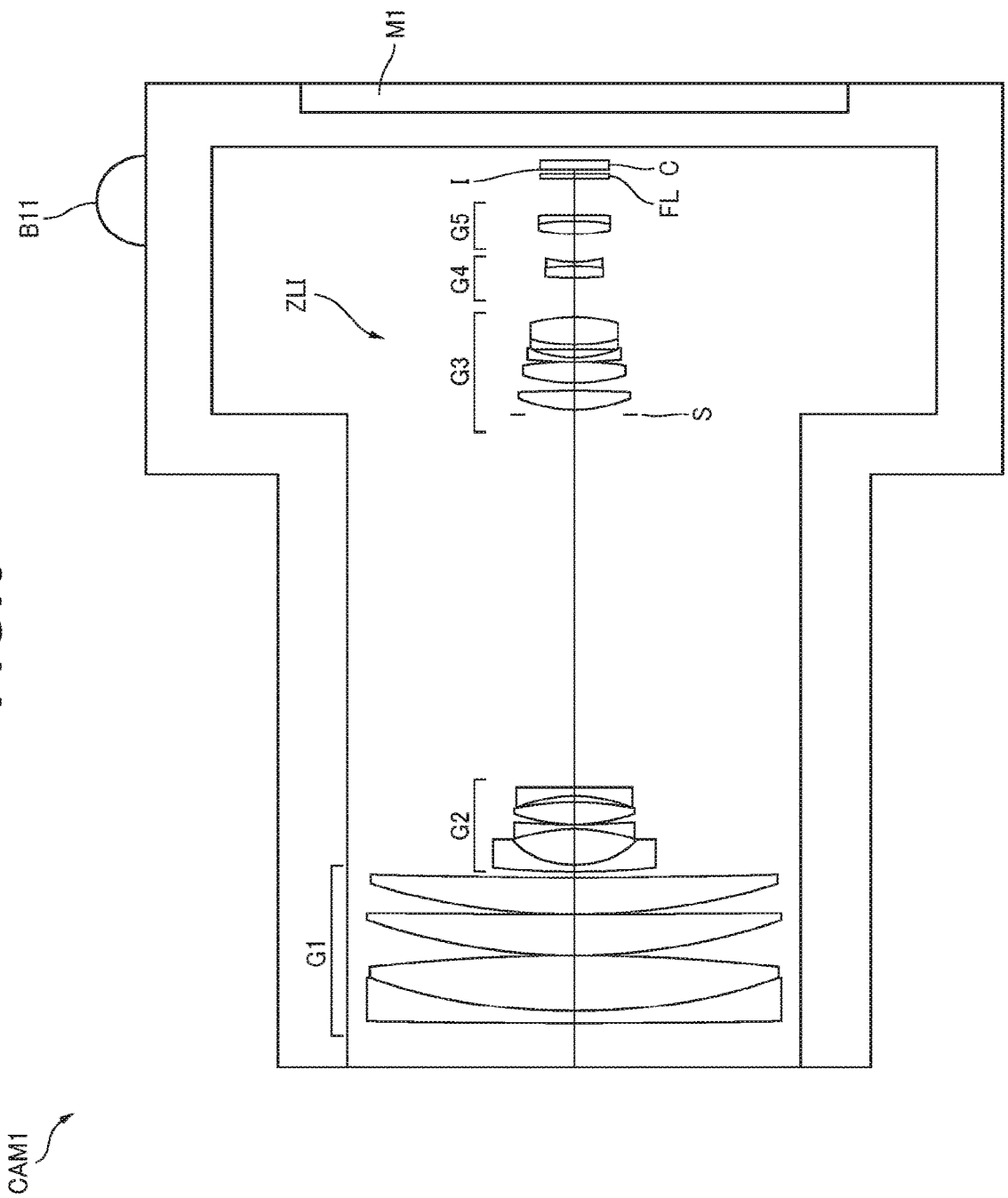
FIG. 8 illustrates a sectional view along arrows A1-A1' in FIG. 7A.

FIGS. 7A and 7B, and FIG. 8 illustrate a configuration of a digital still camera CAM1 (optical apparatus) as an optical apparatus equipped with the zoom lens ZLI. In the digital still camera CAM, when pressing an unillustrated power button, an unillustrated shutter of an imaging lens (ZL)

opens, then light from a subject (object) are collected by the imaging lens (ZL), and forms an image on an imaging element C (for example, a CCD or CMOS, etc.) disposed on an image surface I (refer to FIG. 1). The image of the subject formed by the imaging element C is displayed on a liquid crystal display monitor M provided behind the digital still camera CAM. A photographer shoots, after deciding a composition of the image of the subject while looking at the liquid crystal display monitor M, the image of the subject by pressing a shutter release button B1, and this is recorded to an unillustrated memory. As mentioned above, the photographer can shoot the subject with the camera CAM1.

In the camera CAM1, an auxiliary light emitting unit EF1, which emits auxiliary light when the subject is dark, and a function button B12, etc. used for various conditional settings, etc. of the digital still camera CAM1 are also disposed.

Here, exampling a compact-type camera in which the camera CAM1 is integrated with the zoom lens ZLI, however, as an optical apparatus, it is also applicable to a single-lens reflex camera in which a lens barrel having the zoom lens ZLI is detachable and attachable with a camera body.

According to the camera CAM1 set forth in the first embodiment equipped with the configurations above, by equipping the zoom lens ZLI as an imaging lens, although it is high zoom magnification, a camera having good optical performance can be realized.

Figure 9:
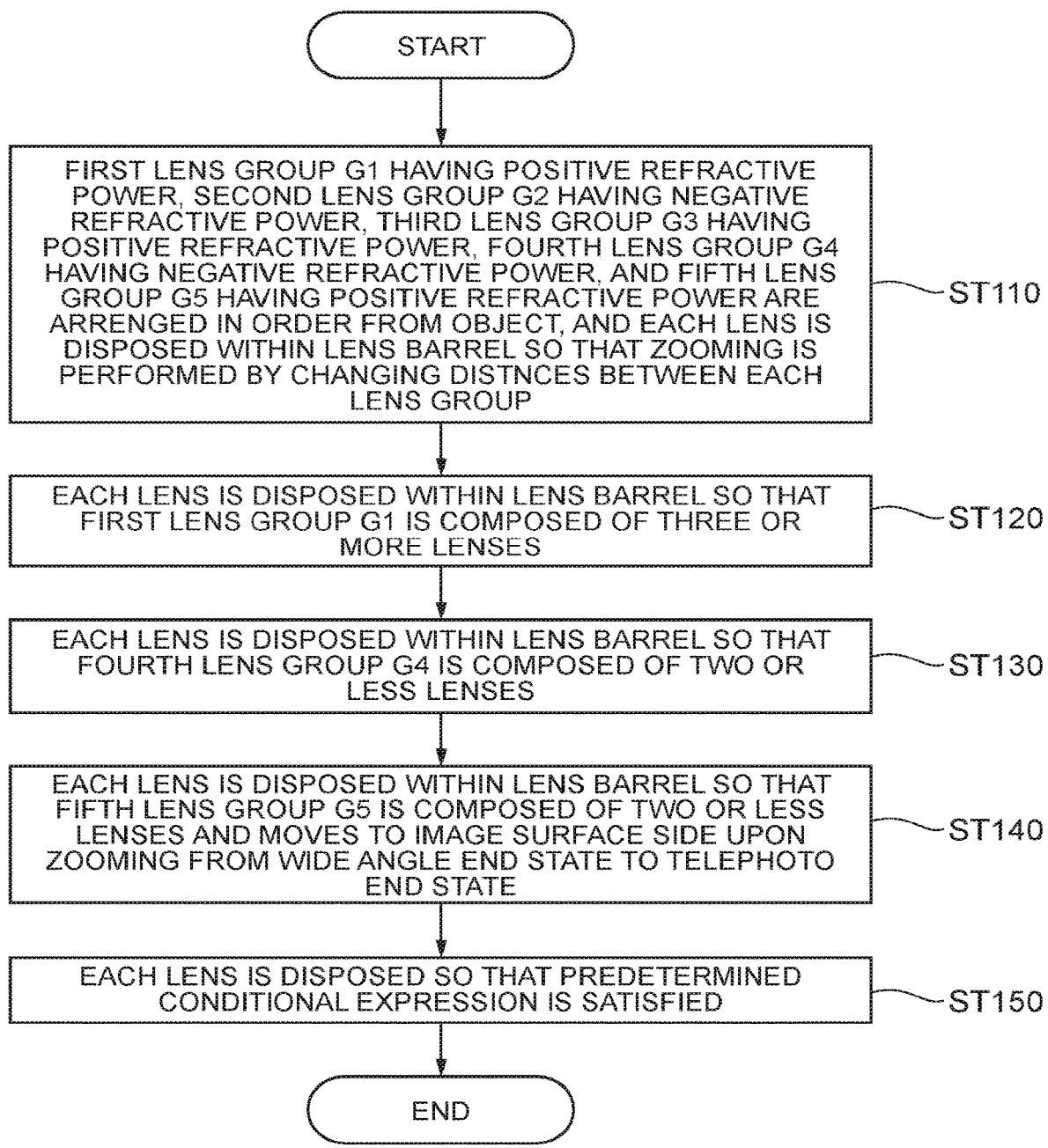
FIG. 9 illustrates a flowchart showing a method for manufacturing a zoom lens according to the first embodiment.

Subsequently, a method for manufacturing the zoom lens ZLI above is explained with reference to FIG. 9. Firstly, a first lens group G1 having positive refractive power, a second lens group G2 having negative refractive power, a third lens group G3 having positive refractive power, a fourth lens group G4 having negative refractive power, and a fifth lens group G5 having positive refractive power are arranged within a lens barrel in order from an object, and each lens is disposed so that zooming is performed by changing distances between each lens group (Step ST110). Each lens is disposed in the lens barrel so that the first lens group G1 is composed of three or more lenses (Step ST120). Each lens is disposed in the lens barrel so that the fourth lens group G4 is composed of two or less lenses (Step ST130). Each lens is disposed in the lens barrel so that the fifth lens group G5 is composed of two or less lenses, and moves to an image surface side upon zooming from a wide angle end state to a telephoto end state (Step ST140). Each lens is disposed so that the following conditional expression (1) is satisfied (Step ST150).

$$8.40 < f1/(-f2) \qquad (1)$$

where, f1 denotes a focal length of the first lens group G1, and f2 denotes a focal length of the second lens group G2.

Exampling a lens arrangement according to the first embodiment, in order from the object as shown in FIG. 1, a first lens group G1 is configured by arranging a cemented lens composed of a negative meniscus lens L11 having a concave surface facing an image and a biconvex positive lens L12, a positive meniscus lens L13 having a convex surface facing the object, and a positive meniscus lens L14 having a convex surface facing the object, the second lens group G2 is configured by arranging a negative meniscus lens L21 having a concave surface facing the image, a biconcave negative lens L22, a biconvex positive lens L23, and a biconcave negative lens L24, the third lens group G3 is configured by arranging a biconvex positive lens L31, a biconvex positive lens L32 and a negative meniscus lens L33 having a concave surface facing the image, a cemented lens composed of a negative meniscus lens L34 having a concave surface facing the image and a biconvex positive lens L35, the fourth lens group G4 is configured by arranging a cemented lens composed of a biconvex positive lens L41 and a biconcave negative lens L42, and the fifth lens group G5 is configured by arranging a cemented lens composed of a biconvex positive lens L51 and a negative meniscus lens L52 having a concave surface facing the object. Each lens group prepared as above is disposed in the procedures above, and the zoom lens ZLI is manufactured.

According to the manufacturing method set forth in the first embodiment, although it is high zoom magnification, it is possible to manufacture the zoom lens ZLI having good optical performance.

A second embodiment will be now described with reference to the drawings. A zoom lens ZLI according to the second embodiment comprises, as illustrated in FIG. 1, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power, and zooming is performed by changing distances between each lens group, and the first lens group G1 is composed of three or more lenses, and the fourth lens group G4 is composed of two or less lenses, and the fifth lens group G5 is composed of two or less lenses and moves to an image surface side upon zooming from a wide angle end state to a telephoto end state. With this arrangement, it is possible to achieve high zoom magnification.

In the zoom lens ZLI according to the second embodiment, the following conditional expression (4) is satisfied.

$$5.80 < Dt12/(-f2) \qquad (4)$$

where, Dt12 denotes a distance on the optical axis from the image side surface of the first lens group G1 in a telephoto end state to the object side surface of the second lens group G2, and f2 denotes a focal length of the second lens group G2.

The conditional expression (4) is a conditional expression for reducing spherical aberration, lateral chromatic aberration and axial chromatic aberration, and securing good optical performance.

When deceeding the lower limit of the conditional expression (4), a distance between the first lens group G1 and the second lens group G2 in a telephoto end state remarkably becomes small, therefore the refractive power of the first lens group G1 and the second lens group G2 excessively become large. When the refractive power of the first lens group G1 becomes large, it becomes difficult to correct, especially, lateral chromatic aberration and spherical aberration in a telephoto end state. When the refractive power of the second lens group G2 becomes large, it becomes difficult to correct axial chromatic aberration.

In order to ensure the advantageous effect of the second embodiment, it is preferable to set the lower limit of the conditional expression (4) to 7.50. In order to further ensure the advantageous effect of the second embodiment, it is preferable to set the lower limit of the conditional expression (4) to 8.40. In order to additionally ensure the advantageous effect of the second embodiment, it is preferable to set the lower limit of the conditional expression (4) to 8.90.

In order to ensure the advantageous effect of the second embodiment, it is preferable to set the upper limit of the conditional expression (4) to 20.00. When deceeding the upper limit of the conditional expression (4), spherical aberration, lateral chromatic aberration and axial chromatic aberration become smaller, thus it is preferable. In order to ensure the advantageous effect of the second embodiment, it is preferable to set the upper limit of the conditional expression (4) to 16.00. In order to further ensure the advantageous effect of the second embodiment, it is preferable to set the upper limit of the conditional expression (4) to 13.00.

In the zoom lens ZLI according to the second embodiment, it is preferable that the following conditional expression (5) is satisfied.

$$0.03 < Mv2/ft \qquad (5)$$

where, Mv2 denotes amount of movement of the second lens group G2 from a wide angle end state to a telephoto end state, and ft denotes a focal length of a whole system in a telephoto end state.

The conditional expression (5) is a conditional expression for reducing axial chromatic aberration and lateral chromatic aberration.

When deceeding the lower limit of the conditional expression (5), the amount of movement of the second lens group G2 upon zooming remarkably become small, therefore it is necessary to enlarge the refractive power of the second lens group G2, thereby it becomes difficult to suppress a variation of the chromatic aberration upon zooming. Although it is possible to deal with it by enlarging the amount of movement of the first lens group G1, the front lens diameter becomes large, therefore it becomes difficult to achieve a small size.

In order to ensure the advantageous effect of the second embodiment, it is preferable to set the lower limit of the conditional expression (5) to 0.05. In order to further ensure the advantageous effect of the second embodiment, it is preferable to set the lower limit of the conditional expression (5) to 0.07.

In the zoom lens ZLI according to the second embodiment, it is preferable that the following conditional expression (6) is satisfied.

$$0.01 < D1/ft < 0.15 \qquad (6)$$

where, D1 denotes a distance on the optical axis from the object side surface of the first lens group G1 to the image side surface, and ft denotes a focal length of the whole system in a telephoto end state.

The conditional expression (6) is a conditional expression for reducing variations of lateral chromatic aberration and spherical aberration upon zooming.

When deceeding the lower limit of the conditional expression (6), the thickness of the first lens group G1 excessively becomes thin, therefore in order to secure the refractive power of the first lens group G1, it is necessary to enlarge the refracture index of the positive lens in the first lens group G1, thereby it becomes difficult to correct lateral chromatic aberration in a telephoto end state.

In order to ensure the advantageous effect of the second embodiment, it is preferable to set the lower limit of the conditional expression (6) to 0.03. In order to further ensure the advantageous effect of the second embodiment, it is preferable to set the lower limit of the conditional expression (6) to 0.05.

When exceeding the upper limit of the conditional expression (6), the thickness of the first lens group G1 excessively becomes large, therefore the ray height from the optical axis in a wide angle end state becomes large, thereby the front lens diameter is enlarged. Although it can be dealt with to an extent by enlarging the refractive power of the second lens group G2, it becomes difficult to suppress a variation of chromatic aberration upon zooming.

In order to ensure the advantageous effect of the second embodiment, it is preferable to set the upper limit of the conditional expression (6) to 0.10. In order to further ensure the advantageous effect of the second embodiment, it is preferable to set the upper limit of the conditional expression (6) to 0.07.

In the zoom lens ZLI according to the second embodiment, it is preferable that the following conditional expression (7) is satisfied.

$$0.70 < Zidwt/Fnwt < 1.10 \qquad (7)$$

Note that the following definitions are applicable.

$$Zidwt = \{(1-\beta t4^2)*\beta t5^2\}/\{(1-\beta w4^2)*\beta w5^2\}$$

$$Fnwt = Fnt/Fnw$$

where, βt4 denotes magnification of the fourth lens group G4 in a telephoto end state, βt5 denotes magnification of the fifth lens group G5 in the telephoto end state, βw4 denotes magnification of the fourth lens group G4 in a wide angle end state, βw5 denotes magnification of the fifth lens group G5 in the wide angle end state, Fnt denotes an f number in the telephoto end state, and Fnw denotes an f number in the wide angle end state.

The conditional expression (7) is a conditional expression for reducing variations of curvature of field, astigmatism and spherical aberration upon zooming, shortening a focus time upon focusing on a short-distance object with the fourth lens group G4. Note that Zidwt denotes a ratio of coefficients in the telephoto end state and wide angle end state, which shows amount of movement of an imaging position when lenses move. Fnwt denotes a ratio of the f number in the telephoto end state and wide angle end state.

When deceeding the lower limit of the conditional expression (7) because the value of Zidwt relatively becomes small, the magnification of the fifth lens group G5 excessively becomes small in a telephoto end state, therefore it becomes difficult to suppress variations of astigmatism and curvature of field due to strong shrinking magnification working on. When deceeding the lower limit of the conditional expression (7) because a value of Fnwt relatively becomes large, the f number in a wide angle end state becomes small, therefore it becomes difficult to correct spherical aberration.

In order to ensure the advantageous effect of the second embodiment, it is preferable to set the lower limit of the conditional expression (7) to 0.80. In order to further ensure the advantageous effect of the second embodiment, it is preferable to set the lower limit of the conditional expression (7) to 0.95.

When exceeding the upper limit of the conditional expression (7) because the value of Zidwt relatively becomes large, the magnification of the fifth lens group G5 excessively becomes large in the telephoto end state, therefore it becomes difficult to achieve a small size. Although it can be dealt with by raising the refractive power of the first lens group G1 and the second lens group G2, it becomes difficult to correct spherical aberration in a telephoto end state, and suppress variations of curvature of field and astigmatism upon zooming. When exceeding the upper limit of the conditional expression (7) because the value of Fnwt relatively becomes small, the f number in the telephoto end state becomes small, therefore it becomes difficult to correct spherical aberration.

In order to ensure the advantageous effect of the second embodiment, it is preferable to set the upper limit of the conditional expression (7) to 1.05.

In the zoom lens ZLI according to the second embodiment, it is preferable that the following conditional expression (8) is satisfied.

$$2.70 < \beta t3/\beta w3 \qquad (8)$$

where, $\beta t3$ denotes magnification of the third lens group G3 in a telephoto end state, and $\beta w3$ denotes magnification of the third lens group G3 in a wide angle end state.

The conditional expression (8) is a conditional expression for reducing a variation of spherical aberration upon zooming.

When deceeding the lower limit of the conditional expression (8) because contribution of the third lens group G3 upon zooming excessively becomes small, it is necessary to have more zooming actions with the first lens group G1 and the second lens group G2. Here, if the refractive power of the first lens group G1 is raised so as to maintain to achieve a small size of the optical system, spherical aberration in a telephoto end state and chromatic aberration covering all zoom range will get worse. If the refractive power of the second lens group G2 is raised so as to maintain to achieve a small size of the whole optical system, it becomes difficult to correct axial chromatic aberration in a telephoto end state and astigmatism covering all zoom range.

In order to ensure the advantageous effect of the second embodiment, it is preferable to set the lower limit of the conditional expression (8) to 3.00. In order to further ensure the advantageous effect of the second embodiment, it is preferable to set the lower limit of the conditional expression (8) to 3.50.

In order to additionally ensure the advantageous effect of the second embodiment, it is preferable to set the upper limit of the conditional expression (8) to 10.00. When deceeding the upper limit of the conditional expression (8), the spherical aberration variation upon zooming becomes smaller, thus it is preferable. In order to ensure the advantageous effect of the second embodiment, it is preferable to set the upper limit of the conditional expression (8) to 8.00. In order to further ensure the advantageous effect of the second embodiment, it is preferable to set the upper limit of the conditional expression (8) to 6.00.

In the zoom lens ZLI according to the second embodiment, it is preferable that the following conditional expression (9) is satisfied.

$$8.40 < f1/(-f2) \qquad (9)$$

where, f1 denotes a focal length of the first lens group G1.

The conditional expression (9) is a conditional expression for reducing spherical aberration, astigmatism, and chromatic aberration.

When deceeding the lower limit of the conditional expression (9) because the refractive power of the first lens group G1 relatively becomes large, it is advantageous to achieve a small size, however it becomes difficult to correct lateral chromatic aberration and spherical aberration in a telephoto end state. When deceeding the lower limit of the conditional expression (9) because the refractive power of the second lens group G2 relatively becomes small excessively, the total length is enlarged in order to secure a high zooming rate. Here, in order to maintain to achieve a small size of the optical system, the refractive power of the first lens group G1 must be raised, therefore spherical aberration in a telephoto end state will get worse.

In order to ensure the advantageous effect of the second embodiment, it is preferable to set the lower limit of the conditional expression (9) to 9.00. In order to further ensure the advantageous effect of the second embodiment, it is preferable to set the lower limit of the conditional expression (9) to 10.00. In order to additionally ensure the advantageous effect of the second embodiment, it is preferable to set the lower limit of the conditional expression (9) to 11.00.

In order to ensure the advantageous effect of the second embodiment, it is preferable to set the upper limit of the conditional expression (9) to 20.00. When deceeding the upper limit of the conditional expression (9), spherical aberration, astigmatism, and chromatic aberration become smaller, thus it is preferable. In order to ensure the advantageous effect of the second embodiment, it is preferable to set the upper limit of the conditional expression (9) to 17.50. In order to further ensure the advantageous effect of the second embodiment, it is preferable to set the upper limit of the conditional expression (9) to 15.00.

In the zoom lens ZLI according to the second embodiment, it is preferable that the fourth lens group G4 is composed of two lenses, and these two lenses are cemented with each other. With this arrangement, it is possible to effectively correct chromatic aberration. It is possible to suppress performance degradation upon manufacturing by reducing each power of each lens surface.

In the zoom lens ZLI according to the second embodiment, it is preferable that the fifth lens group G5 is composed of two lenses, and these two lenses are cemented with each other. With this arrangement, it is possible to effectively correct chromatic aberration. By reducing each power of each lens surface, it is possible to suppress performance degradation upon manufacturing.

In the zoom lens ZLI according to the second embodiment, it is preferable that the second lens group G2 is composed of, in order from the object, a negative lens, a negative lens, a positive lens, and a negative lens. With this arrangement, it is possible to effectively correct astigmatism covering all zoom range, and axial chromatic aberration in a telephoto end state.

In the zoom lens ZLI according to the second embodiment, it is preferable that the third lens group G3 comprises, in order from the image, a positive lens, a negative lens, a negative lens, and a positive lens. With this arrangement, it is possible to correct coma aberration and spherical aberration at every wave length in a telephoto end state with a good balance.

In the zoom lens ZLI according to the second embodiment, it is preferable that focusing is performed by moving the fourth lens group G4 along the optical axis direction. With this arrangement, it is possible to prevent performance degradation upon focusing. However, focusing may be performed using other groups, such as the fifth lens group G5, etc.

According to the zoom lens ZLI set forth in the second embodiment equipped with the configurations above, although it is high zoom magnification, a zoom lens having good optical performance can be realized.

FIGS. 7A and 7B, and FIG. 8 illustrate configurations of a digital still camera CAM1 (optical apparatus) as an optical apparatus equipped with the zoom lens ZLI above. This digital still camera CAM has the same configurations as those of the first embodiment, and the configurations are already described, thus descriptions thereof are now omitted.

According to the camera CAM1 set forth in the second embodiment equipped with the configurations above, although it is high zoom magnification, by having the zoom lens ZLI above as an imaging lens, a camera having good optical performance can be realized.

Figure 10:
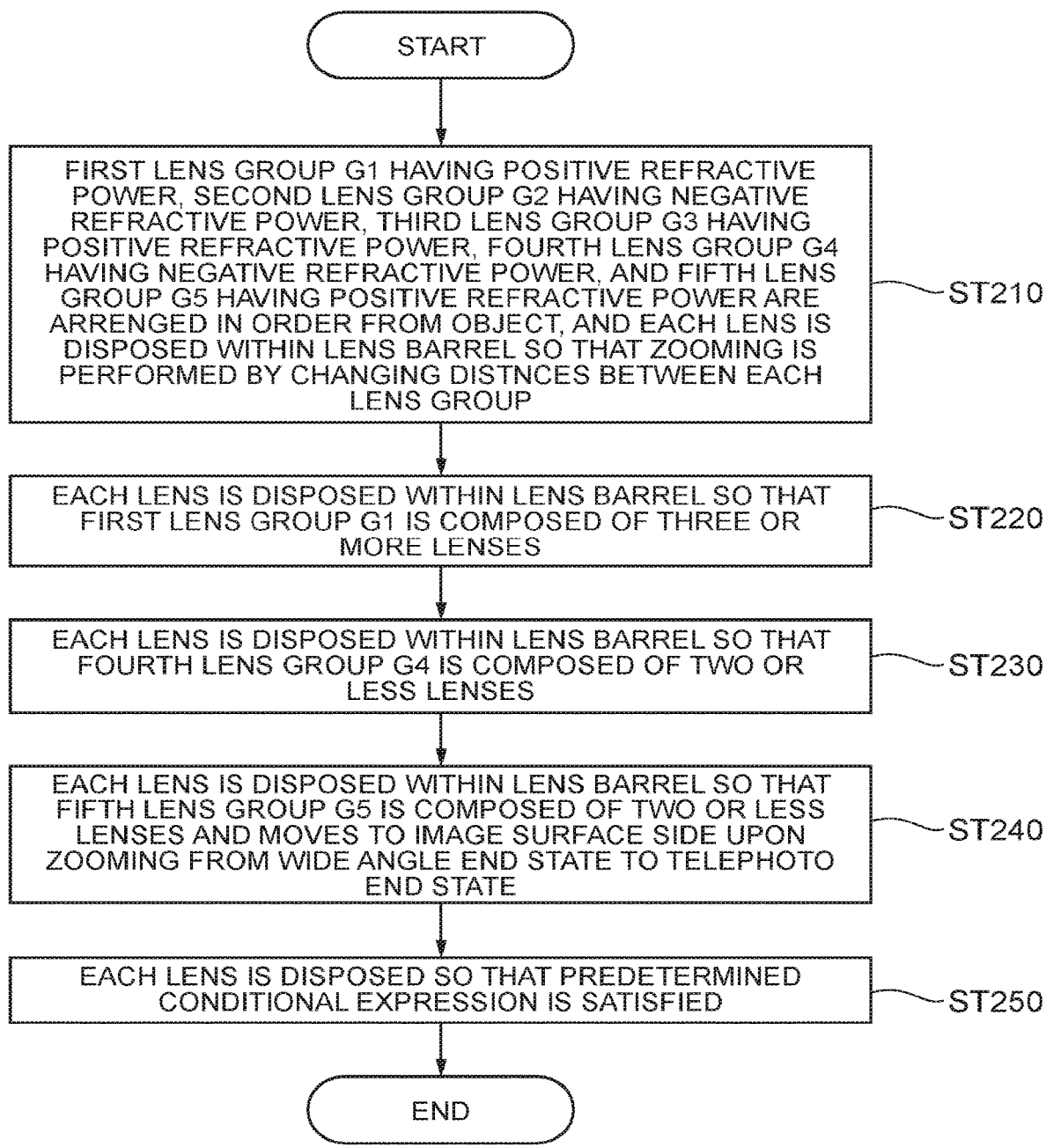
FIG. 10 illustrates a flowchart showing a method for manufacturing a zoom lens according to the second embodiment.

Subsequently, a method for manufacturing the zoom lens ZLI above is explained with reference to FIG. 10. Firstly, a first lens group G1 having positive refractive power, a second lens group G2 having negative refractive power, a third lens group G3 having positive refractive power, a fourth lens group G4 having negative refractive power, and a fifth lens group G5 having positive refractive power are arranged in order from the object, and each lens is disposed in a lens barrel so that zooming is performed by changing distances between each lens group (Step ST210). Each lens is disposed in the lens barrel so that the first lens group G1 is composed of three or more lenses (Step ST220). Each lens is disposed in the lens barrel so that the fourth lens group G4 is composed of two or less lenses (Step ST230). Each lens is disposed in the lens barrel so that the fifth lens group G5 is composed of two or less lenses and moves to an image surface side upon zooming from a wide angle end state to a telephoto end state (Step ST240). Each lens is arranged so that the following conditional expression (4) is satisfied (Step ST250).

$$5.80 < Dt12/(-f2) \qquad (4)$$

where, Dt12 denotes a distance on the optical axis from the image side surface of the first lens group G1 in a telephoto end state to the object side surface of the second lens group G2, and f2 denotes a focal length of the second lens group G2.

Exampling a lens configuration according to the second embodiment, in order from the object as illustrated in FIG. 1, the first lens group G1 comprises a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object, the second lens group G2 comprises a negative meniscus lens L21 having a concave surface facing the image, a biconcave negative lens L22, a biconvex positive lens L23, and a biconcave negative lens L24, the third lens group G3 comprises a biconvex positive lens L31, a biconvex positive lens L32 and a negative meniscus lens L33 having a concave surface facing the image, a cemented lens composed of a negative meniscus lens L34 having a concave surface facing the image and a biconvex positive lens L35, the fourth lens group G4 comprises a biconvex positive lens L41 and a biconcave negative lens L42, and the fifth lens group G5 comprises a cemented lens composed of a biconvex positive lens L51 and a negative meniscus lens L52 having a concave surface facing the object. Each lens group prepared in the procedures above is disposed, and the zoom lens ZLI is manufactured.

According to the manufacturing method set forth in the second embodiment, although it is high zoom magnification, it is possible to manufacture the zoom lens ZLI having good optical performance.

Examples According to First and Second Embodiments

Each example according to the first and second embodiments are described with reference to the drawings. FIGS. 1, 3 and 5 are sectional views showing configurations and refractive power distribution of the zoom lens ZLI (ZL1 to ZL3) according to each example.

Each reference sign regarding FIG. 1 according to Example 1 is used independently for every example, in order to avoid complicating explanations due to swelling of the digit number of reference signs. Therefore, even if attached with the same reference signs as those in drawings according to other examples, this does not necessarily mean the same configurations as those in the other examples.

Tables 1 to 3 are illustrated below, these are tables according to Examples 1 to 3.

In each example, d-line (wave length of 587.6 nm), g-line (wave length of 435.8 nm), C-line (wave length of 656.3 nm), and F-line (wave length of 486.1 nm) are selected as subjects for calculating aberration characteristics.

In [Lens data] in tables, a surface number means an order of each optical surface from the object side along a direction in which light travels, R means a radius of curvature of each optical surface, D means a surface distance showing a distance on the optical axis from each optical surface to the next optical surface (or image surface), nd means a refractive index against d-line of a material of an optical member, and vd means an Abbe number on the basis of d-line of the material of the light member. (Variable) means a variable distance between surfaces, "∞" of a radius of curvature means a plane or an aperture, (Stop S) means an aperture stop S, and an image surface means an image surface I. The refractive index "1.00000" of air is omitted. In a case the optical surface is an aspherical surface, a sign "*" is assigned to the surface number, and a paraxial radius of curvature is shown in a column of a radius of curvature R.

In [Aspherical surface data] in tables, regarding the aspherical surfaces in [Lens data], the configuration is defined by the following expression (a). X(y) means a distance along the optical axis direction from a tangent plane in a vertex of the aspherical surface to a position on the aspherical surface at a height y, and R means a radius of curvature (paraxial radius of curvature) of a criterion spherical surface, κ means a conic constant, and, Ai means an i-th aspherical surface coefficient. "E-n" means "x10-$^n$." For example, it is 1.234E-05=1.234×10-$^5$. Note that the secondary aspherical surface coefficient A2 is 0, and its description is omitted.

$$X(y)=(y^2/R)/\{1+(1-\kappa \times y^2/R^2)^{1/2}\}+A4 \times y^4+A6 \times y^6+A8 \times y^8+A10 \times y^{10} \qquad (a)$$

In [General data] in tables, f means a focal length of a whole lens system, and FNo means an f number, ω means an half angle of view (maximum incident angle, unit: °), Y means an image height, Bf means a distance on the optical axis from the lens last surface to the paraxial image surface, Bf(air) means what a distance from the lens last surface to the paraxial image surface is described in air-equivalent length, TL means a total lens length (what is Bf is added to a distance on the optical axis from the lens first surface to the lens last surface), and TL (air) means what is Bf(air) is added to a distance on the optical axis from the lens forefront surface to the lens last surface.

In [Variable distance data] in tables, values Di of a variable distance in each state of a wide angle end state, an intermediate focal length state, and a telephoto end state are shown. Note that Di means a variable distance between an i-th surface and an (i+1)-th surface.

In [Lens group data] in tables, a focal length and the lens forefront surface regarding each lens group are shown.

In [conditional expression] in tables, values corresponding to the above conditional expressions (1) to (9) are shown.

Hereinafter, in all general data values, regarding the focal length f, a radius of curvature R, a surface distance D, and other lengths, etc. as shown, "mm" is generally used except a specific request, however an optical system is not limited to the above, since equivalent optical performance can be obtained even if the optical system is proportionally scaled. The unit is not limited to "mm," another appropriate unit is available, instead.

The explanations concerning the tables are common among all the examples, thus hereinafter the explanation is omitted.

Example 1

Example 1 is described using FIG. 1 and FIGS. 2A, 2B and 2C, and Table 1. The zoom lens ZLI (ZL1) according to Example 1 comprises, as illustrated in FIG. 1, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a biconcave negative lens L22, a biconvex positive lens L23, and a biconcave negative lens L24.

The third lens group G3 is composed of, in order from the object, a biconvex positive lens L31, a biconvex positive lens L32, a negative meniscus lens L33 having a concave surface facing the image, and a cemented lens composed of a negative meniscus lens L34 having a concave surface facing the image and a biconvex positive lens L35.

Both side surfaces of the biconvex positive lens L31 are aspherical.

The fourth lens group G4 is composed of, in order from the object, a cemented lens composed of a biconvex positive lens L41 and a biconcave negative lens L42.

An object side surface of the biconvex positive lens L41 is aspherical.

The fifth lens group G5 is composed of, in order from the objects, a cemented lens composed of a biconvex positive lens L51 and a negative meniscus lens L52 having a concave surface facing the object.

The object side surface of the biconvex positive lens L51 is aspherical.

An aperture stop S is provided on an object side of the third lens group G3 for the purpose of aiming at adjusting the light quantity.

The filter FL is provided on the image side of the fifth lens group G5. The filter FL is composed of low-pass filters, infrared cut filters, etc. for cutting spatial frequencies more than the marginal resolution of a solid-state image sensing device, such as CCD disposed on the image surface I.

In the zoom lens ZL1 according to the present example, upon zooming from a wide angle end state to a telephoto end state, all lens groups from the first lens group G1 to the fifth lens group G5 are moved so that distances between each lens group change. Specifically, the first lens group G1 is moved to the object side. The second lens group G2 is moved once to the image surface, and afterward moved to the object side. The third lens group G3 is moved to the object side. The fourth lens group G4 is moved once to the object side, and afterward moved to the object side. The fifth lens group G5 is moved to the image surface side. The aperture stop S is moved to the object side together with the third lens group G3.

The following Table 1 shows values of each data in Example 1. The surface numbers 1 to 33 in Table 1 correspond to each optical surface of m1 to m33 shown in FIG. 1.

TABLE 1

[Lens Data]

| Surface number | R | D | nd | vd |
|---|---|---|---|---|
| Object surface | ∞ | | | |
| 1 | 1098.9825 | 1.8000 | 1.804000 | 46.5977 |
| 2 | 79.1099 | 8.8106 | 1.437001 | 95.1004 |
| 3 | −239.9403 | 0.1000 | | |
| 4 | 82.2574 | 6.1989 | 1.496997 | 81.6084 |
| 5 | 1523.9054 | 0.1000 | | |
| 6 | 89.9100 | 5.6000 | 1.496997 | 81.6084 |
| 7 | 768.6046 | D7(Variable) | | |
| 8 | 107.6966 | 1.0000 | 1.834810 | 42.7334 |
| 9 | 11.6443 | 5.5064 | | |
| 10 | −25.3488 | 0.7000 | 1.834810 | 42.7334 |
| 11 | 92.8811 | 0.1774 | | |
| 12 | 24.8647 | 3.3358 | 1.922860 | 20.8804 |
| 13 | −36.0593 | 0.9641 | | |
| 14 | −18.9977 | 1.3410 | 1.834810 | 42.7334 |
| 15 | 684.6171 | D15(Variable) | | |
| 16 | ∞ | 0.7500 | (Stop S) | |
| *17 | 17.1514 | 3.0050 | 1.589130 | 61.1500 |
| *18 | −67.5172 | 1.1196 | | |
| 19 | 20.6602 | 3.2736 | 1.496997 | 81.6084 |
| 20 | −54.9465 | 0.1000 | | |
| 21 | 116.0203 | 0.6000 | 1.834000 | 37.1838 |
| 22 | 14.8071 | 1.3307 | | |
| 23 | 2815.9221 | 0.6000 | 1.720467 | 34.7080 |
| 24 | 21.6373 | 4.3258 | 1.603000 | 65.4413 |
| 25 | −18.9606 | D25(Variable) | | |

TABLE 1-continued

| | | | | |
|---|---|---|---|---|
| *26 | 44.9637 | 1.8886 | 1.672700 | 32.1855 |
| 27 | −37.2442 | 0.6000 | 1.670000 | 57.3496 |
| 28 | 12.1780 | D28(Variable) | | |
| *29 | 17.6808 | 2.1729 | 1.618750 | 63.7334 |
| 30 | −23.9691 | 1.0000 | 1.846663 | 23.7848 |
| 31 | −75.0000 | D31(Variable) | | |
| 32 | ∞ | 0.8000 | 1.516800 | 63.8807 |
| 33 | ∞ | Bf | | |
| Image surface | ∞ | | | |

[Aspherical Data]

| Surface number | κ | A4 | A6 | A8 | A10 |
|---|---|---|---|---|---|
| 17 | 0.0785 | 6.8202E−06 | 9.2770E−08 | 3.6522E−11 | 0.0000E+00 |
| 18 | 0.3350 | 6.7762E−05 | 2.5527E−08 | 1.2890E−10 | 0.0000E+00 |
| 26 | 1.0000 | −5.2516E−06 | 2.2052E−06 | −2.8016E−07 | 1.0265E−08 |
| 29 | 1.0000 | 1.7725E−06 | −1.3037E−06 | 6.7078E−08 | 0.0000E+00 |

[General Data]
Zooming rate 78.22

| | Wide angle end | Intermediate focus | Telephoto end |
|---|---|---|---|
| f | 4.430 | 39.000 | 346.502 |
| Fno | 2.00257 | 4.19533 | 6.60712 |
| ω | 42.9497 | 5.7616 | 0.6533 |
| Bf | 0.530 | 0.530 | 0.530 |
| Bf(Air) | 6.665 | 2.996 | 1.557 |
| TL | 132.6704 | 166.9200 | 195.1357 |
| TL(Air) | 132.398 | 166.647 | 194.863 |

[Variable Distance Data]

| Variable distance | Wide angle end | Intermediate focus | Telephoto end |
|---|---|---|---|
| D7 | 0.90176 | 63.00443 | 91.08694 |
| D15 | 58.14079 | 16.93034 | 2.02752 |
| D25 | 5.94269 | 20.40134 | 20.00000 |
| D28 | 4.34707 | 6.91470 | 23.79095 |
| D31 | 5.60788 | 1.93891 | 0.50000 |

[Lens Group Data]

| Group number | Group starting surface | Group focal length |
|---|---|---|
| G1 | 1 | 114.32333 |
| G2 | 8 | −10.09770 |
| G3 | 16 | 19.86940 |
| G4 | 26 | −25.80086 |
| G5 | 29 | 27.37196 |

[Conditional Expression]

| | |
|---|---|
| Conditional Expression(1) | f1/(−f2) = 11.322 |
| Conditional Expression(2) | βt3/βw3 = 3.629 |
| Conditional Expression(3) | Dt12/(−f2) = 9.021 |
| Conditional Expression(4) | Dt12/(−f2) = 9.021 |
| Conditional Expression(5) | Mv2/ft = 0.080 |
| Conditional Expression(6) | D1/ft = 0.065 |
| Conditional Expression(7) | Zidwt/Fnwt = 0.962 |
| Conditional Expression(8) | βt3/βw3 = 3.629 |
| Conditional Expression(9) | f1/(−f2) = 11.322 |

Based on Table 1, it is found that in the zoom lens ZL1 according to Example 1 the conditional expressions (1) to (9) are satisfied.

FIGS. 2A, 2B and 2C illustrate graphs showing various aberrations upon focusing on imaging distance infinity regarding the zoom lens ZL1 according to Example 1 (graphs showing spherical aberration, astigmatism, distortion, coma aberration and lateral chromatic aberration), where FIG. 2A depicts a wide angle state, FIG. 2B depicts an intermediate focal length state, and FIG. 2C depicts a telephoto end state.

In each graph showing aberrations, FNO means an f number, and A means a half angle of view (unit: °) against each image height. d indicates an aberration at d-line, g indicates an aberration at g-line, C indicates an aberration at C-line, and F indicates an aberration at F-line. What is not described with these means an aberration at d-line. In graphs showing a sagittal image surface, a solid line indicates a meridional image surface. Note that also in graphs showing aberrations of each example described below, the same signs are used as those in the present example.

As it is obvious each graph showing aberrations in FIGS. 2A, 2B and 2C, It is found that in the zoom lens ZL1 according to Example 1, various aberrations are appropriately corrected, and outstanding imaging performance is obtained.

Example 2

Example 2 is described using FIG. 3, FIGS. 4A, 4B and 4C, and Table 2. The zoom lens ZLI (ZL2) according to Example 2 comprises, as shown in FIG. 3, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a biconcave negative lens L22, a biconvex positive lens L23, and a biconcave negative lens L24.

The third lens group G3 is composed of, in order from the object, a biconvex positive lens L31, a negative meniscus lens L32 having a concave surface facing the image, and a cemented lens composed of a negative meniscus lens L33 having a concave surface facing the image and a biconvex positive lens L34.

Both side surfaces of the biconvex positive lens L31 is aspherical.

The fourth lens group G4 is composed of, in order from the object, a cemented lens composed of a biconvex positive lens L41 and a biconcave negative lens L42.

The fifth lens group G5 is composed of, in order from the object, a cemented lens composed of a biconvex positive lens L51 and a negative meniscus lens L52 having a concave surface facing the object.

The object side surface of the biconvex positive lens L51 is aspherical.

An aperture stop S is provided on an object side of the third lens group G3 for the purpose of aiming at adjusting the light quantity.

The filter FL is provided on the image side of the fifth lens group G5. The filter FL is composed of low-pass filters, infrared cut filters, etc. for cutting spatial frequencies more than the marginal resolution of a solid-state image sensing device, such as CCD disposed on the image surface I.

In the zoom lens ZL2 according to the present example, upon zooming from a wide angle end state to a telephoto end state, all lens groups from the first lens group G1 to the fifth lens group G5 are moved so that distances between each lens group change. Specifically, the first lens group G1 is moved to the object side. The second lens group G2 is moved to the image surface side. The third lens group G3 is moved to the object side. The fourth lens group G4 is moved to the object side. The fifth lens group G5 is moved to the image surface side. The aperture stop S is moved to the object side together with the third lens group G3.

The following Table 2 shows values of each data in Example 2. The surface numbers 1 to 31 in Table 2 correspond to each optical surface of m1 to m31 shown in FIG. 3.

TABLE 2

| [Lens Data] | | | | |
|---|---|---|---|---|
| Surface number | R | D | nd | vd |
| Object surface | ∞ | | | |
| 1 | 484.4033 | 2.3000 | 1.785900 | 44.1699 |
| 2 | 85.0000 | 7.3809 | 1.437001 | 95.1004 |
| 3 | −350.5228 | 0.1000 | | |
| 4 | 86.0152 | 6.2000 | 1.497820 | 82.5713 |
| 5 | 6404.7076 | 0.1000 | | |
| 6 | 94.9006 | 5.0000 | 1.497820 | 82.5713 |
| 7 | 317.0879 | D7(Variable) | | |
| 8 | 285.0282 | 1.0000 | 1.834810 | 42.7334 |
| 9 | 13.4140 | 6.1209 | | |
| 10 | −28.9721 | 0.800 | 1.834810 | 42.7334 |
| 11 | 65.6936 | 0.5807 | | |
| 12 | 26.2967 | 2.8915 | 1.922860 | 20.8804 |
| 13 | −49.9285 | 0.9100 | | |
| 14 | −23.5354 | 0.7000 | 1.696800 | 55.5204 |
| 15 | 67.7824 | D15(Variable) | | |
| 16 | ∞ | 0.7500 | (Stop S) | |
| *17 | 12.7205 | 3.0000 | 1.553319 | 71.6846 |
| *18 | −64.8335 | 2.6500 | | |
| 19 | 27.1737 | 1.0000 | 1.903658 | 31.3150 |
| 20 | 13.1901 | 3.0000 | | |
| 21 | 18.1149 | 0.5000 | 1.785900 | 44.1699 |
| 22 | 11.1100 | 3.5000 | 1.497820 | 82.5713 |
| 23 | −30.9288 | D23(Variable) | | |
| 24 | 81.6464 | 2.3146 | 1.531720 | 48.7796 |
| 25 | −53.0701 | 0.5000 | 1.497820 | 82.5713 |
| 26 | 17.0991 | D26(Variable) | | |

TABLE 2-continued

| | | | | |
|---|---|---|---|---|
| *27 | 23.8500 | 1.9271 | 1.589130 | 61.1500 |
| 28 | −24.7549 | 0.5000 | 1.717360 | 29.5729 |
| 29 | −65.0000 | D29(Variable) | | |
| 30 | ∞ | 0.7100 | 1.516800 | 63.8807 |
| 31 | ∞ | Bf | | |
| Image surface | ∞ | | | |

[Aspherical Data]

| Surface number | κ | A4 | A6 | A8 | A10 |
|---|---|---|---|---|---|
| 17 | 1.0000 | −2.3567E−05 | −8.3836E−07 | 2.3372E−08 | 0.0000E+00 |
| 18 | 1.0000 | 5.9006E−05 | −9.6651E−07 | 3.2880E−08 | −7.9949E−11 |
| 27 | 1.0000 | −5.6440E−05 | −8.8494E−07 | 1.2292E−08 | 0.0000E+00 |

[General Data]
Zooming rate 78.22

| | Wide angle end | Intermediate focus | Telephoto end |
|---|---|---|---|
| f | 4.430 | 39.218 | 346.505 |
| Fno | 2.87575 | 4.65096 | 6.47791 |
| ω | 43.2096 | 5.7207 | 0.6537 |
| Bf | 1.300 | 1.300 | 1.300 |
| Bf(Air) | 6.524 | 3.775 | 2.167 |
| TL | 133.3685 | 171.8996 | 199.8660 |
| TL(Air) | 133.127 | 171.658 | 199.623 |

[Variable Distance Data]

| Variable distance | Wide angle end | Intermediate focus | Telephoto end |
|---|---|---|---|
| D7 | 0.75000 | 64.61154 | 96.27731 |
| D15 | 60.13384 | 18.41985 | 1.80999 |
| D23 | 3.49384 | 17.87410 | 20.68068 |
| D26 | 8.50000 | 13.25234 | 24.96239 |
| D29 | 4.75515 | 2.00614 | 0.40000 |

[Lens Group Data]

| Group number | Group starting surface | Group focal length |
|---|---|---|
| G1 | 1 | 121.16789 |
| G2 | 8 | −10.01637 |
| G3 | 16 | 21.08324 |
| G4 | 24 | −46.26883 |
| G5 | 27 | 32.98244 |

[Conditional Expression]

| | |
|---|---|
| Conditional Expression(1) | f1/(−f2) = 12.097 |
| Conditional Expression(2) | βt3/βw3 = 3.941 |
| Conditional Expression(3) | Dt12/(−f2) = 9.612 |
| Conditional Expression(4) | Dt12/(−f2) = 9.612 |
| Conditional Expression(5) | Mv2/ft = 0.084 |
| Conditional Expression(6) | D1/ft = 0.061 |
| Conditional Expression(7) | Zidwt/Fnwt = 1.034 |
| Conditional Expression(8) | βt3/βw3 = 3.941 |
| Conditional Expression(9) | f1/(−f2) = 12.097 |

Based on Table 2, it is found that in the zoom lens ZL2 according to Example 2, the conditional expressions (1) to (9) are satisfied.

FIGS. 4A, 4B and 4C illustrate graphs showing various aberrations upon focusing on imaging distance infinity regarding the zoom lens ZL2 according to Example 2 (graphs showing spherical aberration, astigmatism, distortion, coma aberration and lateral chromatic aberration), where FIG. 4A depicts a wide angle end state, FIG. 4B depicts an intermediate focal length status, and FIG. 4C depicts a telephoto end state.

As it is obvious from each graph showing aberrations shown in FIGS. 4A, 4B and 4C, it is found that in the zoom lens ZL2 according to Example 2, various aberrations are appropriately corrected, and outstanding imaging performance is obtained.

Example 3

Example 3 is described using FIG. 5, FIGS. 6A, 6B and 6C, and Table 3. The zoom lens ZLI (ZL3) according to Example 3 comprises, in order from the object as shown in FIG. 5, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a cemented lens composed of a biconcave negative lens L22 and a biconvex positive lens L23, and a negative meniscus lens L24 having a concave surface facing the object.

The third lens group G3 is composed of, in order from the object, a biconvex positive lens L31, a negative meniscus lens L32 having a concave surface facing the image, and a cemented lens composed of a negative meniscus lens L33 having a concave surface facing the image and a biconvex positive lens L34.

Both side surfaces of the biconvex positive lens L31 are aspherical.

The fourth lens group G4 is composed of, in order from the object, a cemented lens composed of a biconvex positive lens L41 and a biconcave negative lens L42.

The fifth lens group G5 is composed of, in order from the object, a cemented lens composed of a biconvex positive lens L51 and a negative meniscus lens L52 having a concave surface to the object.

The object side surface of the biconvex positive lens L51 is aspherical.

An aperture stop S is provided on an object side of the third lens group G3 for the purpose of aiming at adjusting the light quantity.

The filter FL is provided on the image side of the fifth lens group G5. The filter FL is composed of low-pass filters, infrared cut filters, etc. for cutting spatial frequencies more than the marginal resolution of a solid-state image sensing device, such as CCD disposed on the image surface I.

In the zoom lens ZL3 according to the present example, upon zooming from a wide angle end state to a telephoto end state, all lens groups from the first lens group G1 to the fifth lens group G5 are moved so that distances between each lens group change. Specifically, the first lens group G1 is moved to the object side. The second lens group G2 is moved once to the object side, and afterward moved to the object side. The third lens group G3 is moved to the object side. The fourth lens group G4 is moved once to the object side, and afterward moved to the object side. The fifth lens group G5 is moved to the image surface side. The aperture stop S is moved to the object side together with the third lens group G3.

The following Table 3 shows values of each data in Example 3. The surface numbers 1 to 30 in Table 3 correspond to each optical surface of m1 to m30 shown in FIG. 5.

TABLE 3

[Lens Data]

| Surface number | R | D | nd | vd |
|---|---|---|---|---|
| Object surface | ∞ | | | |
| 1 | 684.3944 | 2.3000 | 1.785900 | 44.1699 |
| 2 | 88.5883 | 7.4292 | 1.437001 | 95.1004 |
| 3 | −286.7900 | 0.1000 | | |
| 4 | 87.7854 | 6.0709 | 1.497820 | 82.5713 |
| 5 | 4722.6942 | 0.1000 | | |
| 6 | 94.2199 | 4.7668 | 1.497820 | 82.5713 |
| 7 | 336.7415 | D7(Variable) | | |
| 8 | 179.2706 | 1.0000 | 1.834810 | 42.7334 |
| 9 | 14.6897 | 5.9573 | | |
| 10 | −25.1944 | 0.8000 | 1.744000 | 44.8042 |
| 11 | 17.2656 | 3.4603 | 1.922860 | 20.8804 |
| 12 | −64.8896 | 1.2728 | | |
| 13 | −19.4404 | 0.7000 | 1.785900 | 44.1699 |
| 14 | −82.5000 | D14(Variable) | | |
| 15 | ∞ | 0.7500 | (Stop S) | |
| *16 | 12.4672 | 2.6305 | 1.553319 | 71.6846 |
| *17 | −59.9456 | 2.3724 | | |
| 18 | 25.5702 | 0.9990 | 1.903658 | 31.3150 |
| 19 | 12.0000 | 3.2000 | | |
| 20 | 19.0940 | 0.5000 | 1.804400 | 39.6073 |
| 21 | 14.0398 | 2.8805 | 1.497820 | 82.5713 |
| 22 | −24.1660 | D22(Variable) | | |
| 23 | 93.5777 | 2.2752 | 1.531720 | 48.7796 |
| 24 | −24.8694 | 0.5000 | 1.497820 | 82.5713 |
| 25 | 14.9217 | D25(Variable) | | |

TABLE 3-continued

| | | | | |
|---|---|---|---|---|
| *26 | 25.2736 | 1.8147 | 1.589130 | 61.1500 |
| 27 | −27.4400 | 0.5000 | 1.805180 | 25.4483 |
| 28 | −65.0000 | D28(Variable) | | |
| 29 | ∞ | 0.7100 | 1.516800 | 63.8807 |
| 30 | ∞ | Bf | | |
| Image surface | ∞ | | | |

[Aspherical Data]

| Surface number | κ | A4 | A6 | A8 | A10 |
|---|---|---|---|---|---|
| 16 | 1.0000 | −3.4837E−05 | −3.7395E−07 | 4.0089E−09 | 0.0000E+00 |
| 17 | 1.0000 | 5.8798E−05 | −3.9831E−07 | 5.8745E−09 | 0.0000E+00 |
| 26 | 1.0000 | −1.1977E−04 | 1.5724E−06 | −4.7608E−08 | 0.0000E+00 |

[General Data]
Zooming rate 78.22

| | Wide angle end | Intermediate focus | Telephoto end |
|---|---|---|---|
| f | 4.430 | 39.179 | 346.504 |
| Fno | 3.09863 | 4.57242 | 6.84974 |
| ω | 43.4725 | 5.6976 | 0.6510 |
| Bf | 1.300 | 1.300 | 1.300 |
| Bf(Air) | 5.375 | 4.055 | 2.168 |
| TL | 134.7637 | 168.1698 | 200.0000 |
| TL(Air) | 134.522 | 167.928 | 199.758 |

[Variable Distance Data]

| Variable distance | Wide angle end | Intermediate focus | Telephoto end |
|---|---|---|---|
| D7 | 0.80000 | 65.29820 | 96.41213 |
| D14 | 61.58986 | 16.55966 | 1.75000 |
| D22 | 2.80178 | 17.33563 | 19.59710 |
| D25 | 11.57540 | 12.30000 | 27.45116 |
| D28 | 3.60706 | 2.28669 | 0.40000 |

[Lens Group Data]

| Group number | Group starting surface | Group focal length |
|---|---|---|
| G1 | 1 | 121.53230 |
| G2 | 8 | −9.68967 |
| G3 | 15 | 19.81666 |
| G4 | 23 | −38.50803 |
| G5 | 26 | 36.16627 |

[Conditional Expression]

| | |
|---|---|
| Conditional Expression(1) | f1/(−f2) = 12.542 |
| Conditional Expression(2) | βt3/βw3 = 4.374 |
| Conditional Expression(3) | Dt12/(−f2) = 9.950 |
| Conditional Expression(4) | Dt12/(−f2) = 9.950 |
| Conditional Expression(5) | Mv2/ft = 0.088 |
| Conditional Expression(6) | D1/ft = 0.060 |
| Conditional Expression(7) | Zidwt/Fnwt = 0.994 |
| Conditional Expression(8) | βt3/βw3 = 4.374 |
| Conditional Expression(9) | f1/(−f2) = 12.542 |

Based on Table 3, it is found that in the zoom lens ZL3 according to Example 3 the conditional expressions (1) to (9) are satisfied.

FIGS. 6A, 6B and 6C illustrate graphs showing various aberrations upon focusing on imaging distance infinity regarding the zoom lens ZL3 according to Example 3 (graphs showing spherical aberration, astigmatism, distortion, coma aberration and lateral chromatic aberration), where FIG. 6A depicts a wide angle end state, FIG. 6B depicts an intermediate focal length state, and FIG. 6C depicts a telephoto end state.

As it is obvious from each graph showing aberrations shown in FIGS. 6A, 6B and 6C, it is found that in the zoom lens ZL3 according to Example 3, various aberrations are appropriately corrected, and outstanding imaging performance is obtained.

In order to make the present invention understandable, the descriptions were made with elements of the embodiments, however, needless to say, the present invention is not limited to the above. The following contents can be suitably adopted within a range which does not spoil the optical performance of the zoom lens of the present application.

Although five group configurations are exampled as examples of values of the zoom lens ZLI according to the first and second embodiments, however they are not limited to these configurations, therefore another group configuration (for instance, six groups, etc.) can be adopted. Specifically, this is applicable to a configuration in which a lens or a lens group is added closest to the object, or a configuration in which a lens or a lens group is added closest to the image. Note that a lens group means part which has at least one lens separated with an air distance which changes upon zooming.

In the zoom lens ZLI according to the first and second embodiments, in order to perform focusing from an infinity object to a short-distance object, it is appreciated that part of lens group, a whole one lens group, or a plurality of lens groups are configured to move in the optical axis direction as a focusing lens group. This focusing lens group is also applicable to autofocus, and is also suitable for motor drive for autofocus (using an ultrasonic motor, etc.). In particular, it is preferable that the fourth lens group G4 or the fifth lens group G5 is configured as a focusing lens group. It is also possible to perform zooming by concurrently moving the fourth lens group G4 and the fifth lens group G5.

In the zoom lens ZLI according to the first and second embodiments, each whole lens group or a partial lens group may be configured as a vibration-proof lens group to correct image blur generated due to camera shake, etc. by moving it in a manner of having a component in the direction perpendicular to the optical axis, or rotating and moving (swinging) it in an inner surface direction including the optical axis. In particular, it is preferable that the third lens group G3 is configured as a vibration-proof lens group.

In the zoom lens ZLI according to the first and a second embodiments, a lens surface may be configured with a spherical surface or a plane, or configured with an aspherical surface. In a case that a lens surface has a spherical surface or a plane, it is possible to easily have lens processing and an assembly adjustment, and to prevent degradation of optical performance due to errors of the processing and the assembly adjustment, thus it is preferable. It is preferable because there is less degradation of depiction performance when an image surface is shifted. In a case that a lens surface has an aspherical surface, it is appreciated that the aspherical surface is formed as any one of an aspherical surface which is formed through grinding processing, a glass mold aspherical surface which glass is formed into an aspherical surface configuration using a mold, and a complexed aspherical surface which a resin is formed on a surface of glass and formed in an aspherical surface configuration. It is appreciated that a lens surface is formed as a diffractive surface, additionally a lens is formed as a graded-index lens (GRIN lens) or a plastic lens.

In the zoom lens ZLI according to the first and a second embodiments, it is preferable that the aperture stop S is disposed in the third lens group G3, or in its vicinity, however, instead of providing a member as an aperture stop, the role may be substituted with a frame of the lens.

In the zoom lens ZLI according to the first and second embodiments, an antireflection film having high transmittivity in a large wavelength band may be applied to each lens surface in order to reduce flare and ghost and attain high optical performance with high contrast.

Description of the Embodiments (Third Embodiment)

Figure 11:
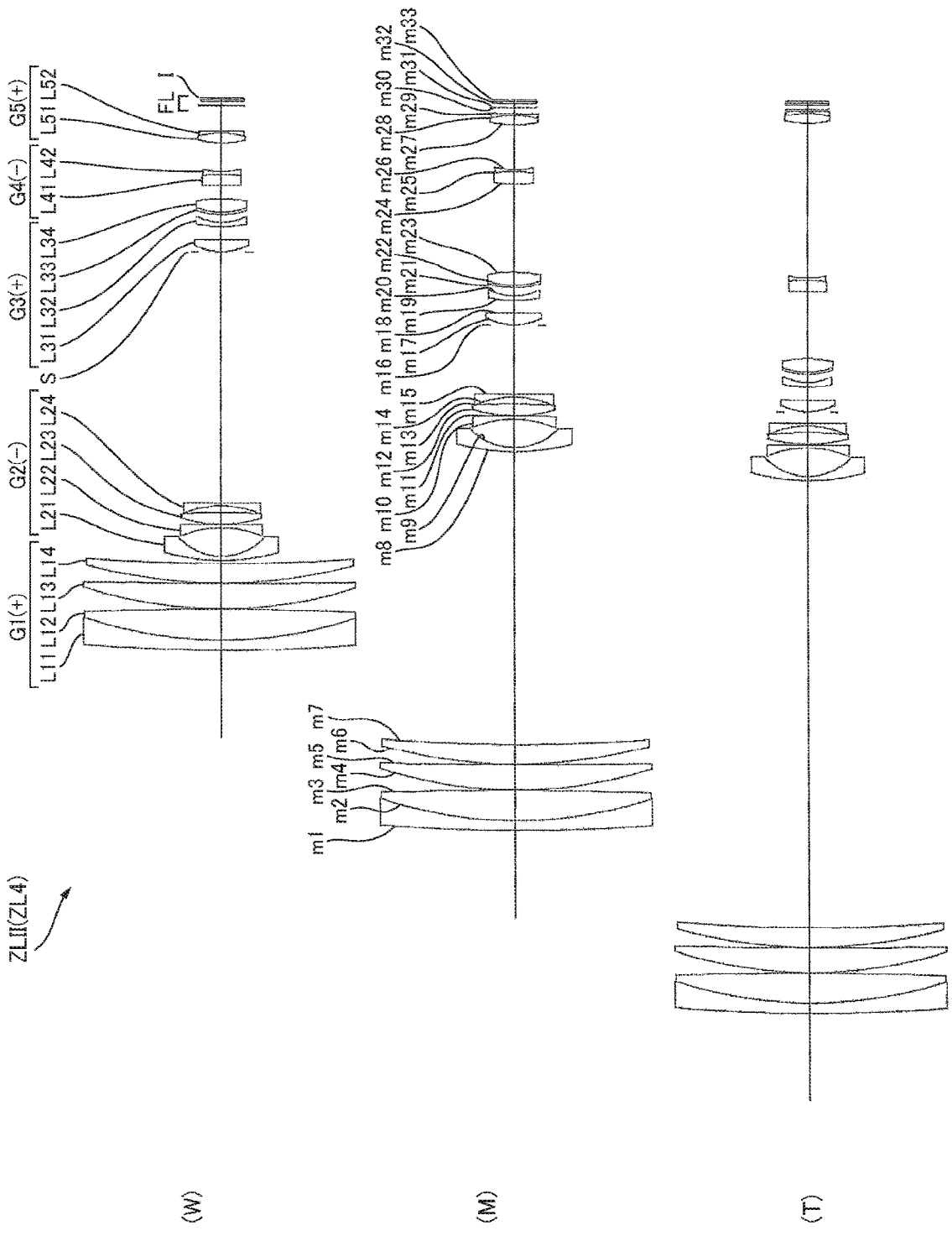
FIG. 11 illustrates a sectional view showing a configuration of a zoom lens according to Example 4, where (W) depicts a wide angle end state, (M) depicts an intermediate focal length state, and (T) depicts a position of each lens group in a telephoto end state.

An embodiment is now described with reference to the drawings. A zoom lens ZLII according to the third embodiment comprises, as shown in FIG. 11, in order from an object, a first lens group G1 having positive refractive power, a second lens group G2 having negative refractive power, a third lens group G3 having positive refractive power, a fourth lens group G4 having negative refractive power, a fifth lens group G5 having positive refractive power, and zooming is performed by changing distances between each lens group, and the first lens group G1 is composed of three or more lenses, and the fifth lens group G5 moves to an image surface side upon zooming from a wide angle end state to a telephoto end state, and the following conditional expression (10) is satisfied.

$$0.020 < (-f2)/ft < 0.031 \qquad (10)$$

where, f2 denotes a focal length of the second lens group G2 in a telephoto end state, and ft denotes a focal length of the whole system in a telephoto end state.

The conditional expression (10) is a conditional expression for reducing coma aberration and spherical aberration upon zooming.

When deceeding the lower limit of the conditional expression (10), the refractive power of the second lens group G2 in a telephoto end state excessively becomes strong. For this reason, refractive power is needed be strengthen similarly concerning another lens group. If the refractive power of the first lens group G1 is strengthened, it becomes difficult to correct coma aberration and spherical aberration in a telephoto end state. If the refractive power of the third lens group G3 is strengthened, spherical aberration in the third lens group G3 becomes large, and coma aberration and spherical aberration within all zoom range will get worse.

When exceeding the upper limit of the conditional expression (10), the refractive power of the second lens group G2 in a telephoto end state excessively becomes weak. For this reason, refractive power is needed to be weakened similarly concerning another lens group. If the refractive power of the first lens group G1 is weakened, the total length of the lens barrel excessively becomes long, therefore when trying to maintain the size of the lens barrel, it is necessary to strengthen the refractive power of the third lens group G3, the spherical aberration in the third lens group G3 becomes large, thereby spherical aberration and coma aberration will get worse within all zoom range. If the refractive power of the third lens group G3 is weakened, the total length of the lens barrel becomes long, therefore when trying to maintain the size of the lens barrel, it is necessary to strengthen the refractive power of the first lens group G1, and the spherical aberration in the first lens group G1 becomes large, thereby coma aberration and spherical aberration in a telephoto end state get worse.

In order to ensure the advantageous effect of the third embodiment, it is preferable to set the lower limit of the conditional expression (10) to 0.024.

In the zoom lens ZLII according to the third embodiment, it is preferable that the following conditional expressions (11) and (12) are satisfied.

$$74.00 < AVE1Grpvd < 80.00 \qquad (11)$$

$$36.00 < G1vd < 48.00 \qquad (12)$$

where, AVE1Grpvd denotes an average of an Abbe number on the basis of d-line of a lens in the first lens group G1, and G1vd denotes an Abbe number on the basis of d-line of the lens L11 disposed closest to the object side of the first lens group G1.

The conditional expression (11) is a conditional expression for reducing generation of axial chromatic aberration and lateral chromatic aberration. When deceeding the lower limit of the conditional expression (11), the average value of the Abbe number of lenses configuring the first lens group G1 against the focal length of the whole system in a telephoto end state becomes small, therefore it becomes difficult to suppress the axial chromatic aberration and lateral chromatic aberration. When exceeding the upper limit of the conditional expression (11), the average value of the Abbe number of the lenses configuring the first lens group G1 against the focal length of the whole system in a telephoto end state becomes large. This means that the lenses configuring the first lens group G1 generally have weak refractive power. If the refractive power of the first lens group G1 becomes weak, the size of the lens barrel becomes long, therefore when strengthening the refractive power of the third lens group G3 by trying to maintain the size of the lens barrel, it becomes difficult to suppress spherical aberration and coma aberration.

In order to ensure the advantageous effect of the third embodiment, it is preferable to set the lower limit of the conditional expression (11) to 74.50.

The conditional expression (12) is a conditional expression for reducing generation of axial chromatic aberration and lateral chromatic aberration. When deceeding the lower limit of the conditional expression (12), the Abbe number of the lens L11 in the first lens group G1 disposed closest to the object side of the first lens group G1 against the focal length of the whole system in a telephoto end state, therefore it becomes difficult to suppress the axial chromatic aberration and lateral chromatic aberration. When exceeding the upper limit of the conditional expression (12), the Abbe number of the lens L11 in the first lens group G1 becomes large against the focal length of the whole system in a telephoto end state, therefore the refractive power of the lens generally becomes weak. When the refractive power of the lens L11 disposed closest to the object becomes weak as above, it becomes difficult to suppress chromatic aberration, therefore it is necessary to weaken the refractive power of the lens L12 in order to suppress chromatic aberration, as a result, the refractive power in the first lens group G1 becomes weak, thereby the size of the lens barrel becomes long. When strengthening the refractive power of the third lens group G3 for the purpose of trying to maintain the size of the lens barrel, it becomes difficult to suppress spherical aberration and coma aberration.

In order to ensure the advantageous effect of the third embodiment, it is preferable to set the lower limit of the conditional expression (12) to 37.00.

In order to further ensure the advantageous effect of the third embodiment, it is preferable to set the upper limit of the conditional expression (12) to 47.50.

In the zoom lens ZLII according to the third embodiment, it is preferable that the following conditional expression (13) is satisfied.

$$100.00 < D12t/D12w < 140.00. \quad (13)$$

where, D12t denotes an air distance between the first lens group G1 and the second lens group G2 in a telephoto end state, and D12w denotes an air distance between the first lens group G1 and the second lens group G2 in a wide angle end state.

The conditional expression (13) is a conditional expression for reducing generation of lateral chromatic aberration, coma aberration, and spherical aberration upon zooming. When deceeding the lower limit of the conditional expression (13), the distance between the first lens group G1 and the second lens group G2 in a telephoto end state excessively becomes narrow, therefore it is necessary to strengthen the refractive power of the first lens group G1. Then, if the refractive index of the positive lens in the first lens group G1 is raised, it becomes difficult to correct lateral chromatic aberration, coma aberration, and spherical aberration in a telephoto end state. When exceeding the upper limit of the conditional expression (13), the distance between the first lens group G1 and the second lens group G2 in a telephoto end state excessively becomes large, therefore the total length of the lens barrel becomes long. While the refractive power of the first lens group G1 is needed to weakened, this can be dealt with to some extent by raising the refractive power of the second lens group G2, however it becomes difficult to suppress a variation of chromatic aberration upon zooming.

In order to ensure the advantageous effect of the third embodiment, it is preferable to set the lower limit of the conditional expression (13) to 105.00.

In order to further ensure the advantageous effect of the third embodiment, it is preferable to set the upper limit of the conditional expression (13) to 138.00.

In the zoom lens ZLII according to the third embodiment, it is preferable that the following conditional expression (14) is satisfied.

$$12.34 < \beta 2t/\beta 2w < 14.40. \quad (14)$$

where, $\beta 2t$ denotes magnification of the second lens group G2 in a telephoto end state, and $\beta 2w$ denotes magnification of the second lens group G2 in a wide angle end state.

The conditional expression (14) is a conditional expression for reducing a variation of coma aberration and spherical aberration upon zooming. When deceeding the lower limit of the conditional expression (14), the contribution of the second lens group G2 upon zooming excessively becomes small. That is, it is necessary for the third lens group G3 to cover much more zoom actions. If the refractive power of the third lens group G3 is strengthened so as to maintain the size of the lens barrel, it becomes difficult to correct spherical aberration in a telephoto end state, and coma aberration and spherical aberration within all zoom range. When exceeding the upper limit of the conditional expression (14), the contribution of the second lens group G2 upon zooming excessively becomes large. When the amount of movement of the second lens group G2 is large, it becomes difficult to maintain the size of the lens barrel. If the refractive power of the second lens group G2 is strong, it becomes difficult to collect coma aberration and aspherical aberration within all zoom range.

In order to ensure the advantageous effect of the third embodiment, it is preferable to set the upper limit of the conditional expression (14) to 14.35.

In the zoom lens ZLII according to the third embodiment, it is preferable that the following conditional expression (15) is satisfied.

$$0.04 < f3/ft < 0.06 \quad (15)$$

where, f3 denotes a focal length of the third lens group G3 in a telephoto end state.

The conditional expression (15) is a conditional expression for reducing a variation of the spherical aberration upon zooming. When deceeding the lower limit of the conditional expression (15), the refractive power of the third lens group G3 in a telephoto end state excessively become strong. Then, the spherical aberration in the third lens group G3 becomes large. It becomes difficult to correct coma aberration and spherical aberration within all zoom range. When exceeding the upper limit of the conditional expression (15), the refractive power of the third lens group G3 in a telephoto end state excessively become weak. As a result, the amount of movement of the third lens group G3 becomes large, therefore it becomes difficult to maintain the size of the lens barrel. If the refractive power of the first lens group G1 is strengthened so as to maintain the size of the lens barrel, it becomes difficult to correct coma aberration and spherical aberration within all zoom range.

In order to ensure the advantageous effect of the third embodiment, it is preferable to set the lower limit of the conditional expression (15) to 0.045.

In the zoom lens ZLII according to the third embodiment, it is preferable that the third lens group G3 is composed of, in order from the object, a positive lens, a negative lens, a negative lens, and a positive lens.

With this arrangement, it is possible to correct coma aberration and spherical aberration at every wavelength in a telephoto end state with a good balance.

In the zoom lens ZLII according to the third embodiment, it is preferable that the third lens group G3 has at least one aspherical lens.

With this arrangement, it is possible to appropriately correct spherical aberration and coma aberration.

According to the zoom lens ZLII set forth in the third embodiment equipped with the above configurations, although it is high zoom magnification, it is possible to realize the zoom lens having good optical performance.

Figure 23A:
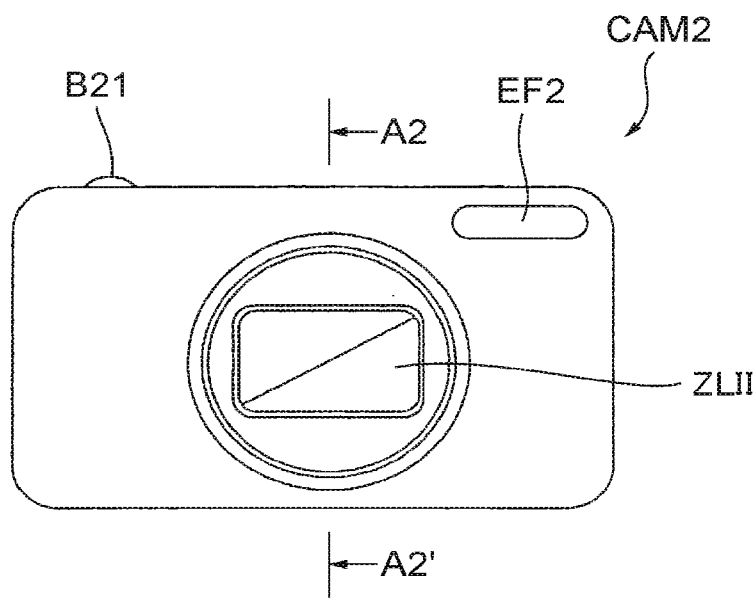
FIG. 23A is a front view of a digital still camera.
Figure 23B:
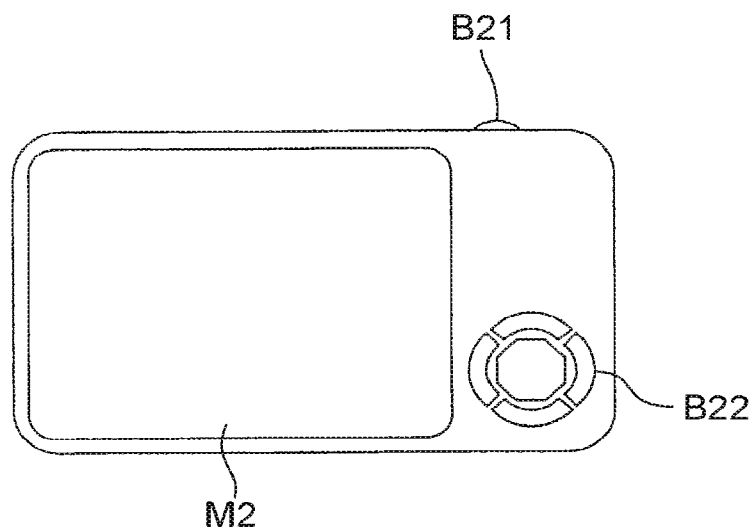
FIG. 23B is a rear view of the digital still camera.
Figure 24:
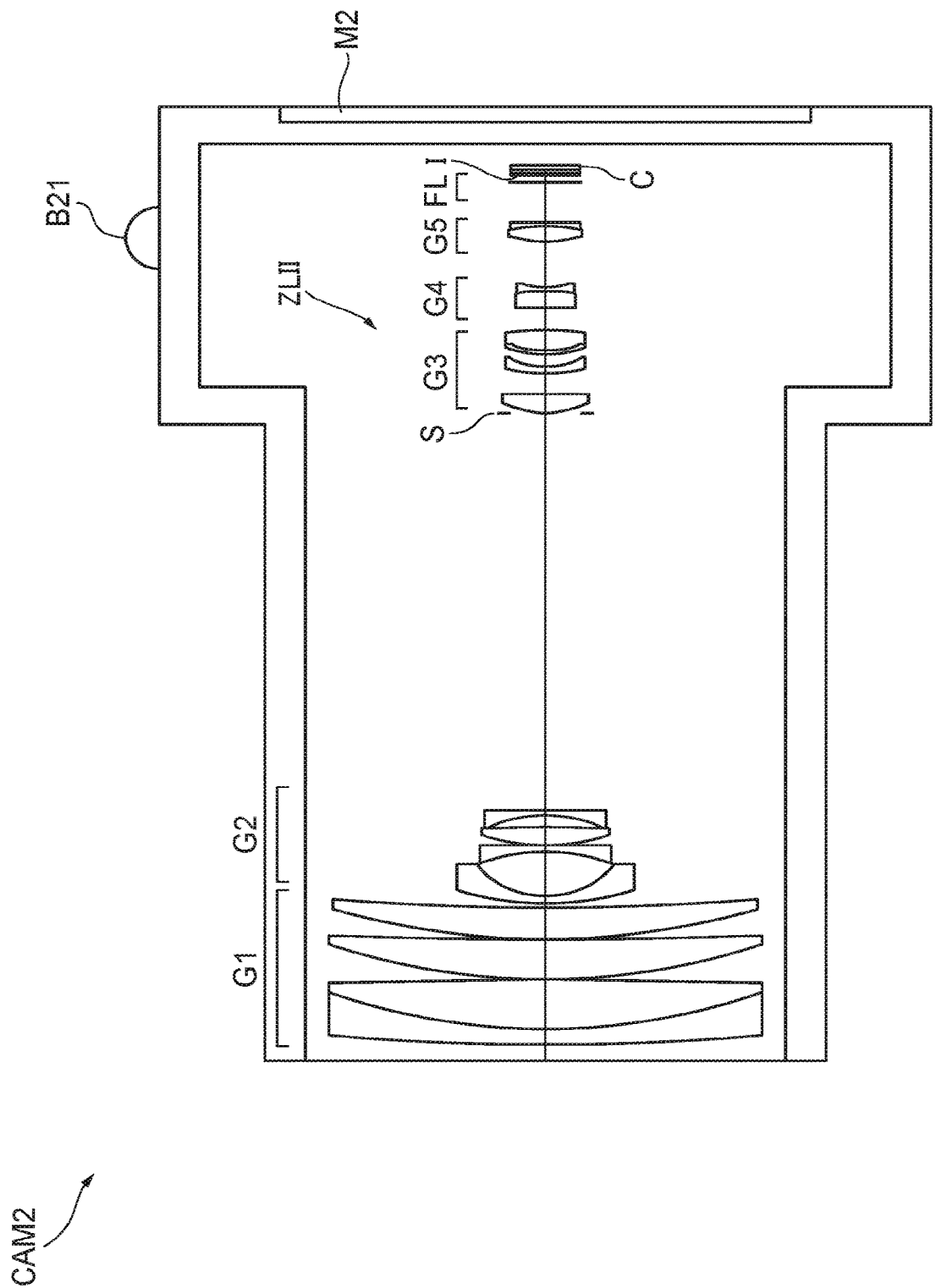
FIG. 24 illustrates a sectional view along arrows A2-A2' in FIG. 23A.

FIGS. 23A and 23B, and FIG. 24 illustrate configurations of the digital still camera CAM2 (optical apparatus) as an optical apparatus equipped with the zoom lens ZLII. In the digital still camera CAM2, when pressing an unillustrated power button, an unillustrated shutter of an imaging lens (Zoom lens ZLII) opens, then light from a subject (object) are collected by the imaging lens (Zoom lens ZLII), and forms an image on an imaging element C (for example, a CCD or CMOS, etc.) disposed on an image surface I (refer to FIG. 11). The image of the subject formed by the imaging element C is displayed on a liquid crystal display monitor M provided behind the digital still camera CAM. A photographer shoots, after deciding a composition of the image of the subject while looking at the liquid crystal display monitor M, the image of the subject by pressing a shutter release button B1, and this is recorded to an unillustrated memory.

In the camera CAM2, an auxiliary light emitting unit EF2, which emits auxiliary light when the subject is dark, and a function button B22, etc. used for various conditional settings, etc. of the digital still camera CAM2 are also disposed. Here, examplaring a compact-type camera in which the camera CAM2 is integrated with the zoom lens ZLII, however, as an optical apparatus, it is also applicable to a single-lens reflex camera in which a lens barrel having the zoom lens ZLII is detachable and attachable with a camera body.

According to the camera CAM2 set forth in the third embodiment equipped with the configurations above, by carrying the zoom lens ZLII as an imaging lens, although it is high zoom magnification, it is possible to realize a camera having good optical performance.

Figure 25:
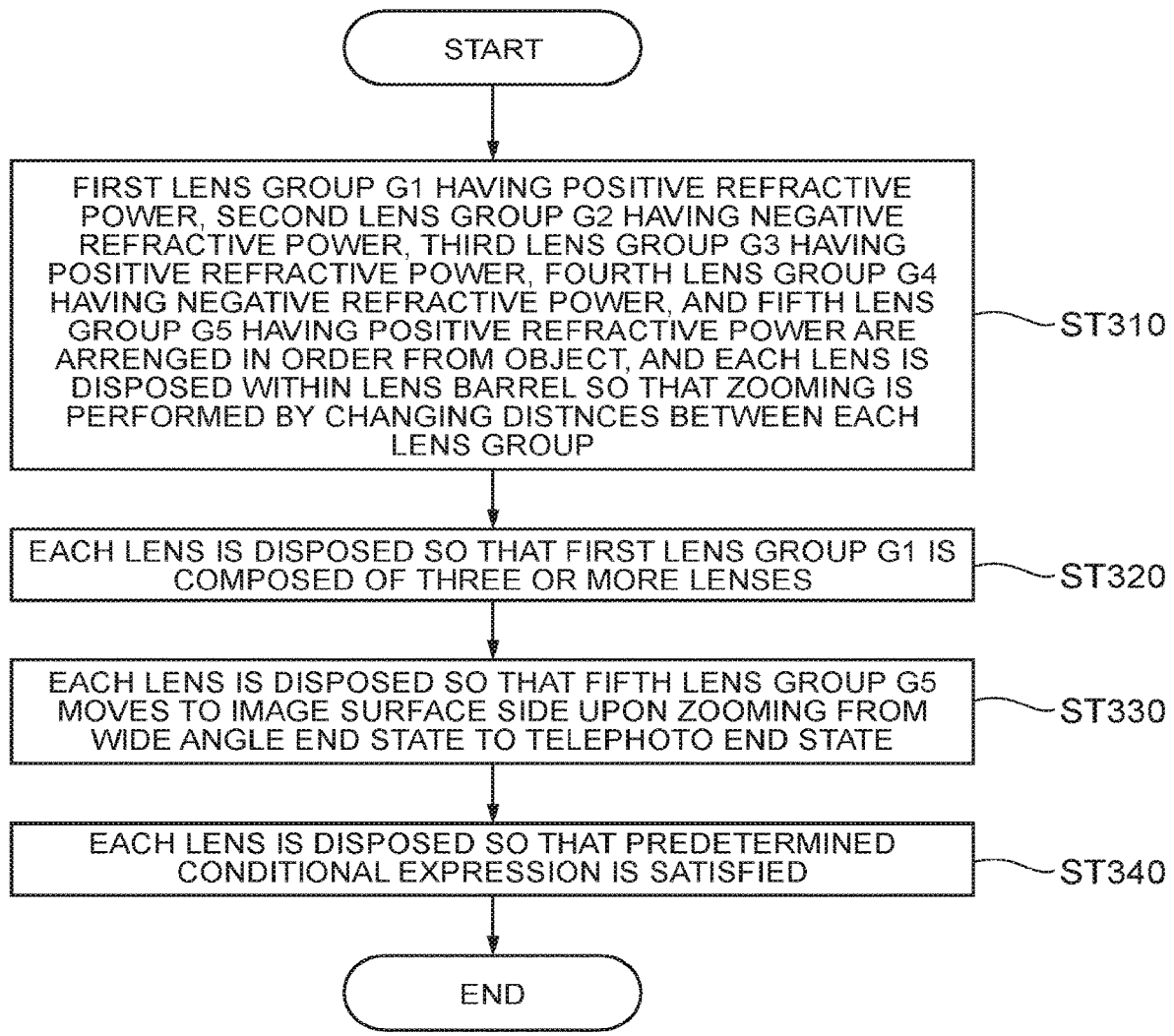
FIG. 25 illustrates a flowchart showing a method for manufacturing the zoom lens according to the third embodiment.

Subsequently, a method for manufacturing the zoom lens ZLII is explained with reference to FIG. 25. Firstly, a first lens group G1 having positive refractive power, a second lens group G2 having negative refractive power, a third lens group G3 having positive refractive power, a fourth lens group G4 having negative refractive power, and a fifth lens group G5 having positive refractive power are arranged in a lens barrel in order from the object, and each lens is disposed so that zooming is performed by changing distance between each lens group (Step ST310). At this point, each lens is disposed so that the first lens group G1 is composed of three or more lenses (Step ST320). Each lens is disposed so that the fifth lens group G5 moves to an image surface side upon zooming from a wide angle end state to a telephoto end state (Step ST330). Each lens is disposed so that the following conditional expression (10) is satisfied (Step ST340).

$$0.020<(-f2)/ft<0.031 \tag{10}$$

where, f2 denotes a focal length of the second lens group G2 in a telephoto end state, and ft denotes a focal length of the whole system in the telephoto end state.

Examplaring a lens arrangement according to the third embodiment, as shown in FIG. 11, in order from the object, the first lens group G1 is configured to dispose a cemented lens composed of a negative meniscus lens L11 having a convex surface facing the object and a biconvex positive lens L12, a positive meniscus lens L13 having a convex surface facing the object, and a positive meniscus lens L14 having a convex surface facing the object, the second lens group G2 is configured to dispose a negative meniscus lens L21 having a concave surface facing the image, a negative meniscus lens L22 having a concave surface facing the object, and a biconvex positive lens L23, a biconcave negative lens L24, the third lens group G3 is configured to dispose a biconvex positive lens L31, a negative meniscus lens L32 having a concave surface facing the image, a cemented lens composed of a negative meniscus lens L33 having a concave surface facing the image and a biconvex positive lens L34, the fourth lens group G4 is configured to dispose a cemented lens composed of a biconvex positive lens L41 and a biconcave negative lens L42, and the fifth lens group G5 is configured to dispose a cemented lens composed of a biconvex positive lens L51 and a negative meniscus lens L52 having a concave surface facing the object. Each lens group prepared in the procedures above is arranged, and the zoom lens ZLII is manufactured.

According to a method for manufacturing the zoom lens ZLII, although it is high zoom magnification, it is possible to manufacture the zoom lens having good optical performance.

Examples According to Third Embodiment

Each example according to the third embodiment is described based on the drawings. Tables 4 to 9 are illustrated below, these are tables according to Examples 4 to 9.

Each reference sign regarding FIG. 11 according to Example is used independently for every example, in order to avoid complicating explanations due to swelling of the digit number of reference signs. Therefore, even if attached with the same reference signs as those in the drawings according to other examples, this does not necessarily mean the same configurations as those in the other examples.

In each example, C-line (wave length of 656.3 nm), d-line (wave length of 587.6 nm), F-line (wave length of 486.1 nm), and g-line (wave length of 435.8 nm) are selected as subjects for calculating aberration characteristics.

In [Lens data] in tables, a surface number means an order of each optical surface from the object side along a direction in which light travels, R means a radius of curvature of each optical surface, D means a surface distance showing a distance on the optical axis from each optical surface to the next optical surface (or image surface), nd means a refractive index against d-line of a material of an optical member, and ν d means an Abbe number on the basis of d-line of a material of the light member. Object surface means an object surface, (Variable) means a variable distance between surfaces, "∞" of a radius of curvature means a plane or an aperture, (Stop S) means an aperture stop S, and an image surface means an image surface I. The refractive index "1.0000" of air is omitted. In a case the optical surface is an aspherical surface, a sign "*" is assigned to the surface number and a paraxial radius of curvature is shown in a column of a radius of curvature R.

In [Aspherical surface data] in tables, regarding the aspherical surfaces in [Lens data], the configuration is defined by the following expression (a). X(y) means a distance along the optical axis direction from a tangent plane in a vertex of the aspherical surface to a position on the aspherical surface at a height y, and R means a radius of curvature (paraxial radius of curvature) of a criterion spherical surface, κ means a conic constant, and, Ai means an i-th aspherical surface coefficient. "E-n" means "×10$^{-n}$." For example, it is 1.234E-05=1.234×10$^{-5}$. Note that the secondary aspherical surface coefficient A2 is 0, and its description is omitted.

$$X(y)=(y^2/R)/\{1+(1-\kappa\times y^2/R^2)^{1/2}\}+A4\times y^4+A6\times y^6+A8\times y^8+A10\times y^{10} \quad (a)$$

In [General data] in tables, f means a focal length of a whole lens system, and Fno means an f number, ω means an half angle of view (maximum incident angle, unit: °), Y means an image height, BF means a distance on the optical axis from the lens last surface to the paraxial image surface, TL means a total lens length (what is Bf is added with a distance on the optical axis from the lens forefront surface to the last image surface) However, Bf (air) and TL (air) show air equivalent values based on the filter FL.

In [Variable distance data] in tables, values Di of a variable distance in each state of a wide angle end state, an intermediate focal length state, and a telephoto end state are shown. Note that Di means a variable distance between an i-th surface and an (i+1)-th surface.

In [Lens group data] in tables, G means a group number, the first surface means a surface number closest to the object side of each group, the group focus length means a focal length od each group.

In [conditional expressions] in tables, values corresponding to the above conditional expressions (10) to (15) are shown.

Hereinafter, in all general data values, regarding the focal length f, a radius of curvature R, a surface distance D, and other lengths, etc. as shown, "mm" is generally used except a specific request, however an optical system is not limited to the above, since equivalent optical performance can be obtained even if the optical system is proportionally scaled. The unit is not limited to "mm," another appropriate unit is available, instead.

The explanations concerning the tables are common among all the examples, thus hereinafter the explanation is omitted.

Example 4

Example 4 is described using FIG. 1i, FIGS. 12A, 12B and 12C, and Table 4. The zoom lens ZLII according to the fourth example (ZL4) comprises, in order from an object as shown in FIG. 11, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a negative meniscus lens L22 having a concave surface facing the object, a biconvex positive lens L23, and a biconcave negative lens L24.

The third lens group G3 is composed of, in order from the object, a biconvex positive lens L31, a negative meniscus lens L32 having a concave surface facing the image, and a cemented lens composed of a negative meniscus lens L33 having a concave surface facing the image and a biconvex positive lens L34. Both side surfaces of the biconvex positive lens L31 are aspherical.

The fourth lens group G4 is composed of, in order from the object, a cemented lens composed of a biconvex positive lens L41 and a biconcave negative lens L42.

The fifth lens group G5 is composed of, in order from the object, a cemented lens composed of a biconvex positive lens L51 and a negative meniscus lens L52 having a concave surface facing the object. The object side surface of the biconvex positive lens L51 is aspherical.

An aperture stop S is provided on the object side of the third lens group G3 for the purpose of aiming at adjusting the light quantity.

The filter FL is provided on the image side of the fifth lens group G5. The filter FL is composed of low-pass filters, infrared cut filters, etc. for cutting spatial frequencies more than the marginal resolution of a solid-state image sensing device, such as CCD disposed on the image surface I.

In the zoom lens ZL4 according to the present example, upon zooming from a wide angle end state to a telephoto end state, all lens group from the first lens group G1 to the fifth lens group G5 are moved so that distances between each lens changes. Specifically, the first lens group G1 is moved to the object side. The second lens group G2 is moved once to the image surface side, and afterward moved to the object side. The third lens group G3 is moved to the object side. The fourth lens group G4 is moved once to the image surface side, and afterward moved to the object side. The fifth lens group G5 is moved to the image surface side. The aperture stop S is moved to the object side together with the third lens group G3.

The following Table 4 shows values of various data in Example 4. The surface numbers 1 to 33 in Table 4 correspond to each optical surface of m1 to m33 shown in FIG. 11.

TABLE 4

| [Lens Data] | | | | |
|---|---|---|---|---|
| Surface number | R | D | nd | νd |
| Object surface | ∞ | | | |
| 1 | 334.8603 | 2.3000 | 1.7859 | 44.17 |
| 2 | 83.1077 | 7.0000 | 1.4370 | 95.10 |
| 3 | −772.5727 | 0.1000 | | |
| 4 | 87.2537 | 5.8122 | 1.4978 | 82.57 |
| 5 | 1342.4159 | 0.1000 | | |
| 6 | 98.7260 | 4.5143 | 1.4978 | 82.57 |
| 7 | 342.9176 | D7(Variable) | | |
| 8 | 41.9147 | 1.0000 | 1.8830 | 40.66 |
| 9 | 11.9219 | 6.5000 | | |
| 10 | −20.7730 | 0.8000 | 1.8348 | 42.73 |
| 11 | −344.1828 | 0.1000 | | |
| 12 | 30.5891 | 2.6713 | 1.9459 | 17.98 |
| 13 | −83.2782 | 1.5000 | | |
| 14 | −19.1496 | 0.7000 | 1.6700 | 57.35 |
| 15 | 4309.2857 | D15(Variable) | | |
| 16 | ∞ | 0.1000 | (Stop S) | |
| *17 | 11.4711 | 2.7045 | 1.5533 | 71.68 |
| *18 | −91.6831 | 2.9489 | | |
| 19 | 25.5216 | 1.0000 | 1.9037 | 31.31 |
| 20 | 10.5793 | 1.8797 | | |
| 21 | 16.4639 | 0.5000 | 1.7859 | 44.17 |
| 22 | 15.0193 | 3.0297 | 1.4978 | 82.57 |
| 23 | −25.7395 | D23(Variable) | | |
| 24 | 115.7933 | 2.6797 | 1.5317 | 48.78 |
| 25 | −25.8235 | 0.5000 | 1.4978 | 82.57 |
| 26 | 15.9526 | D26(Variable) | | |
| *27 | 19.2159 | 2.2519 | 1.5891 | 61.15 |
| 28 | −20.0000 | 0.5000 | 1.7174 | 29.57 |
| 29 | −101.2812 | D29(Variable) | | |
| 30 | ∞ | 0.2100 | 1.5168 | 63.88 |
| 31 | ∞ | 0.8500 | | |
| 32 | ∞ | 0.5000 | 1.5168 | 63.88 |
| 33 | ∞ | Bf | | |
| Image surface | ∞ | | | |

| [Aspherical Data] | | | | | |
|---|---|---|---|---|---|
| Surface number | κ | A4 | A6 | A8 | A10 |
| 17 | 0.7787 | −4.4127E−05 | 2.5417E−07 | 6.1315E−09 | 0.0000E+00 |
| 18 | 1.0000 | 1.2195E−04 | −4.0857E−08 | 7.2014E−09 | −6.1745E−11 |
| 27 | −34.1326 | 1.0673E−04 | −3.2846E−06 | 5.1727E−08 | 0.0000E+00 |

| [General Data] | | | |
|---|---|---|---|
| Zooming rate 87.00 | | | |
| | Wide angle end | Intermediate focus | Telephoto end |
| f | 4.430 | 41.320 | 385.415 |
| Fno | 2.69789 | 4.62051 | 7.46514 |
| ω | 43.38857 | 5.48852 | 0.59127 |
| Bf | 0.400 | 0.400 | 0.400 |
| Bf(Air) | 6.253 | 1.750 | 0.942 |
| TL | 126.5640 | 167.9134 | 209.7638 |
| TL(Air) | 126.8060 | 168.1554 | 210.0058 |

| [Variable Distance Data] | | | |
|---|---|---|---|
| Variable distance | Wide angle end | Intermediate focus | Telephoto end |
| D7 | 0.75072 | 67.39058 | 102.85326 |
| D15 | 57.5468 | 15.77846 | 2.48969 |
| D23 | 3.10183 | 20.52426 | 15.49812 |

TABLE 4-continued

| | | | |
|---|---|---|---|
| D26 | 6.64433 | 10.19066 | 35.70666 |
| D29 | 5.61149 | 1.10796 | 0.30000 |

[Lens Group Data]

| Group number | Group starting surface | Group focal length |
|---|---|---|
| G1 | 1 | 129.99999 |
| G2 | 8 | −10.36057 |
| G3 | 17 | 19.81736 |
| G4 | 24 | −40.00000 |
| G5 | 27 | 31.99999 |

[Conditional Expression]

| | |
|---|---|
| Conditional Expression(10) | $(-f2)/ft = 0.027$ |
| Conditional Expression(11) | AVE1Grpvd = 76.10 |
| Conditional Expression(12) | G1vd = 44.17 |
| Conditional Expression(13) | D12t/D12w = 137.01 |
| Conditional Expression(14) | $\beta 2t/\beta 2w = 13.50$ |
| Conditional Expression(15) | $f3/ft = 0.051$ |

Based on Table 4, it is found that in the zoom lens ZL4 according to the present example the conditional expressions (10) to (15) are satisfied.

Figure 12B:
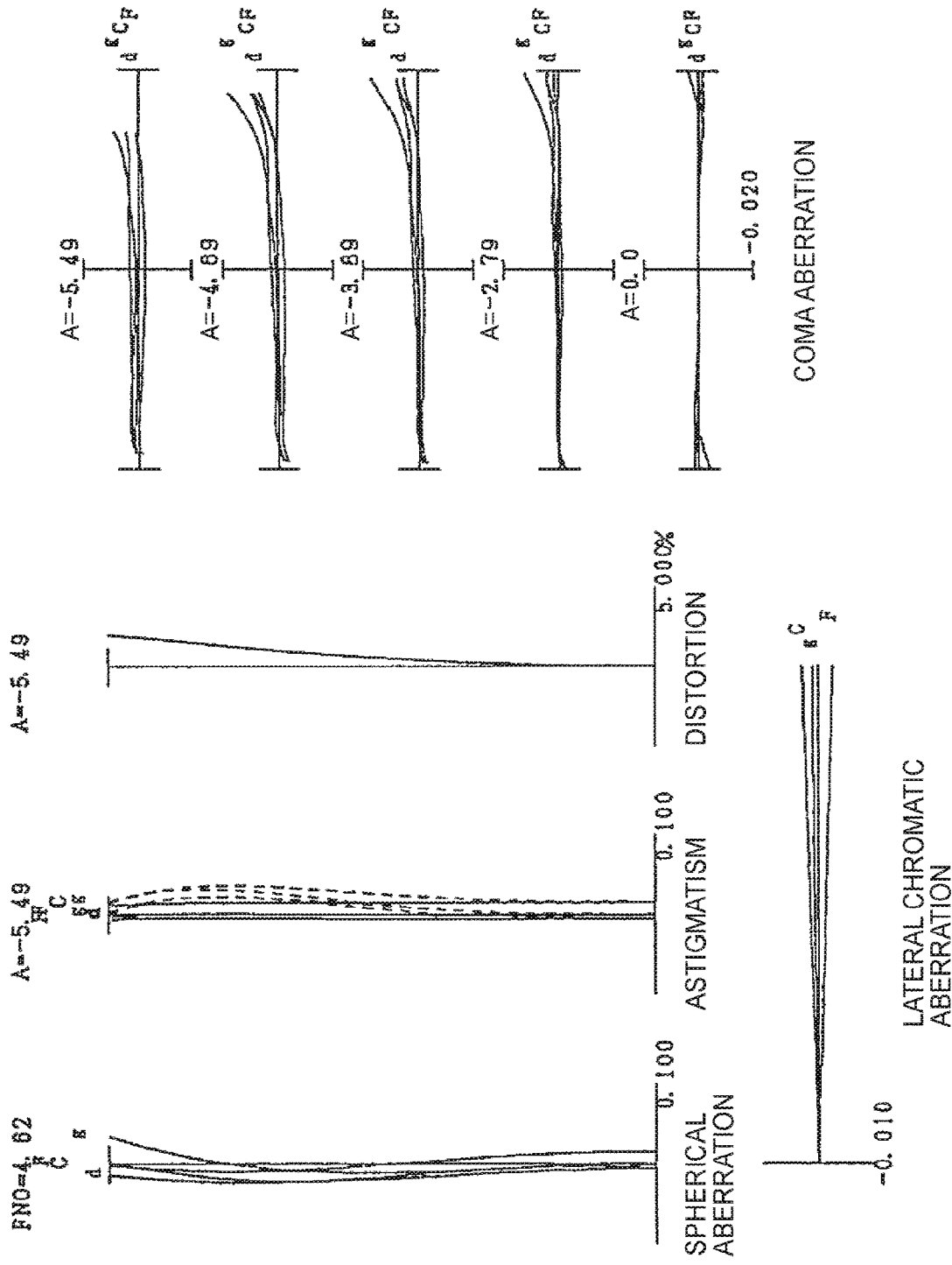
Figure 12C:
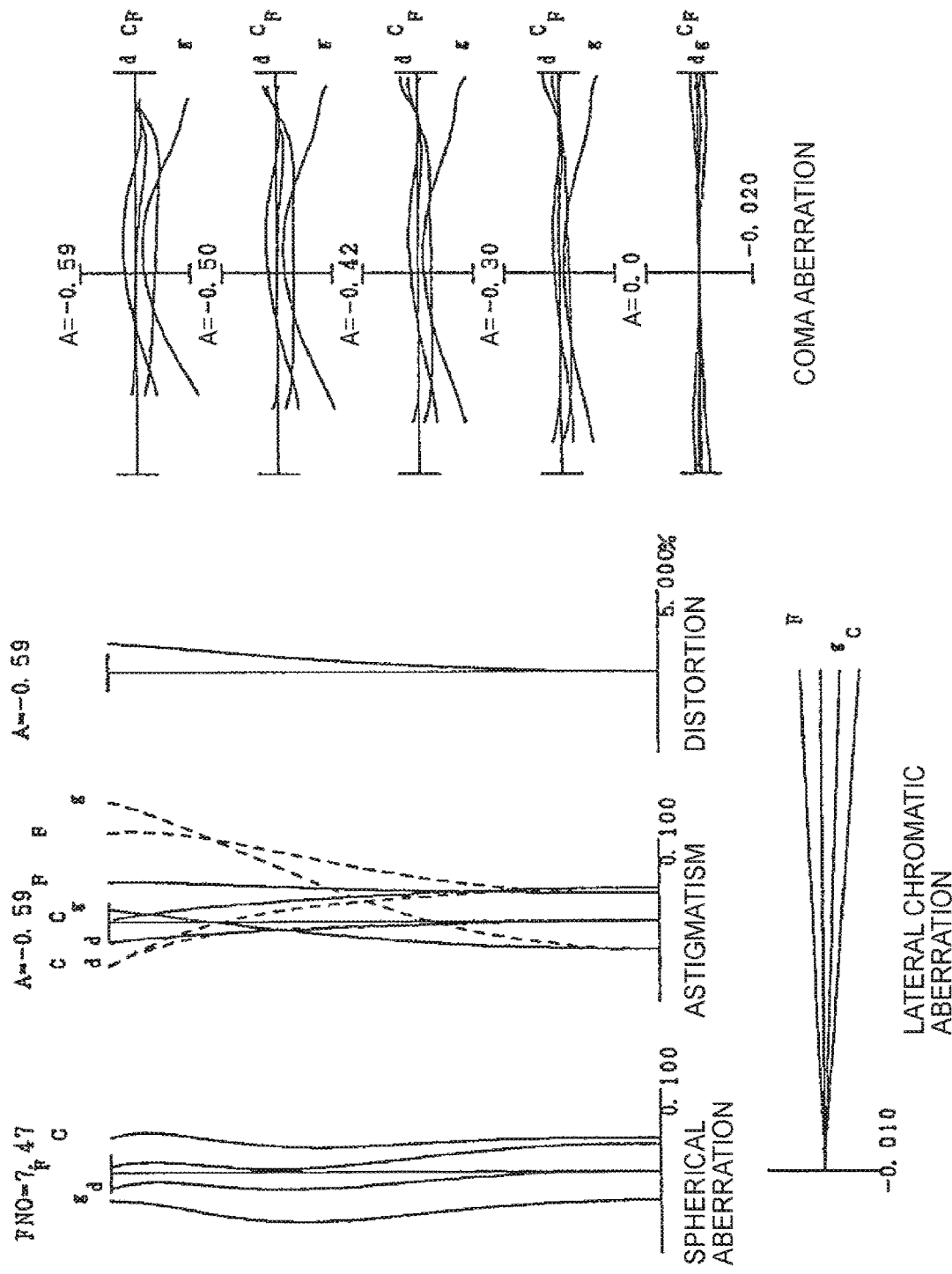

FIGS. 12A, 12B and 12C illustrate graphs showing various aberrations upon focusing on imaging distance infinity regarding the zoom lens ZL4 according to Example 4 (graphs showing spherical aberration, astigmatism, distortion, coma aberration and lateral chromatic aberration), where FIG. 12A depicts a wide angle end state, FIG. 12B depicts an intermediate focal length state, and FIG. 12C depicts a telephoto end state.

In each graph showing aberrations, FNO means an f number, and A means a half angle of view (unit: °) against each image height. d means d-line, g means g-line, C means c-line, and F means F-line. What is not described with these means an aberration according to d-line. In graphs showing astigmatism, a solid line indicates a sagittal image surface, and a dashed line indicates a meridional image surface. Note that also in graphs showing aberrations of each example described below, the same signs are used as those in the present example.

As it is obvious based on each graph showing aberrations in FIGS. 12A, 12B and 12C, It is found that in the zoom lens ZL4 according to Example 4, various aberrations are appropriately corrected, and outstanding imaging performance is obtained.

Example 5

Figure 13:
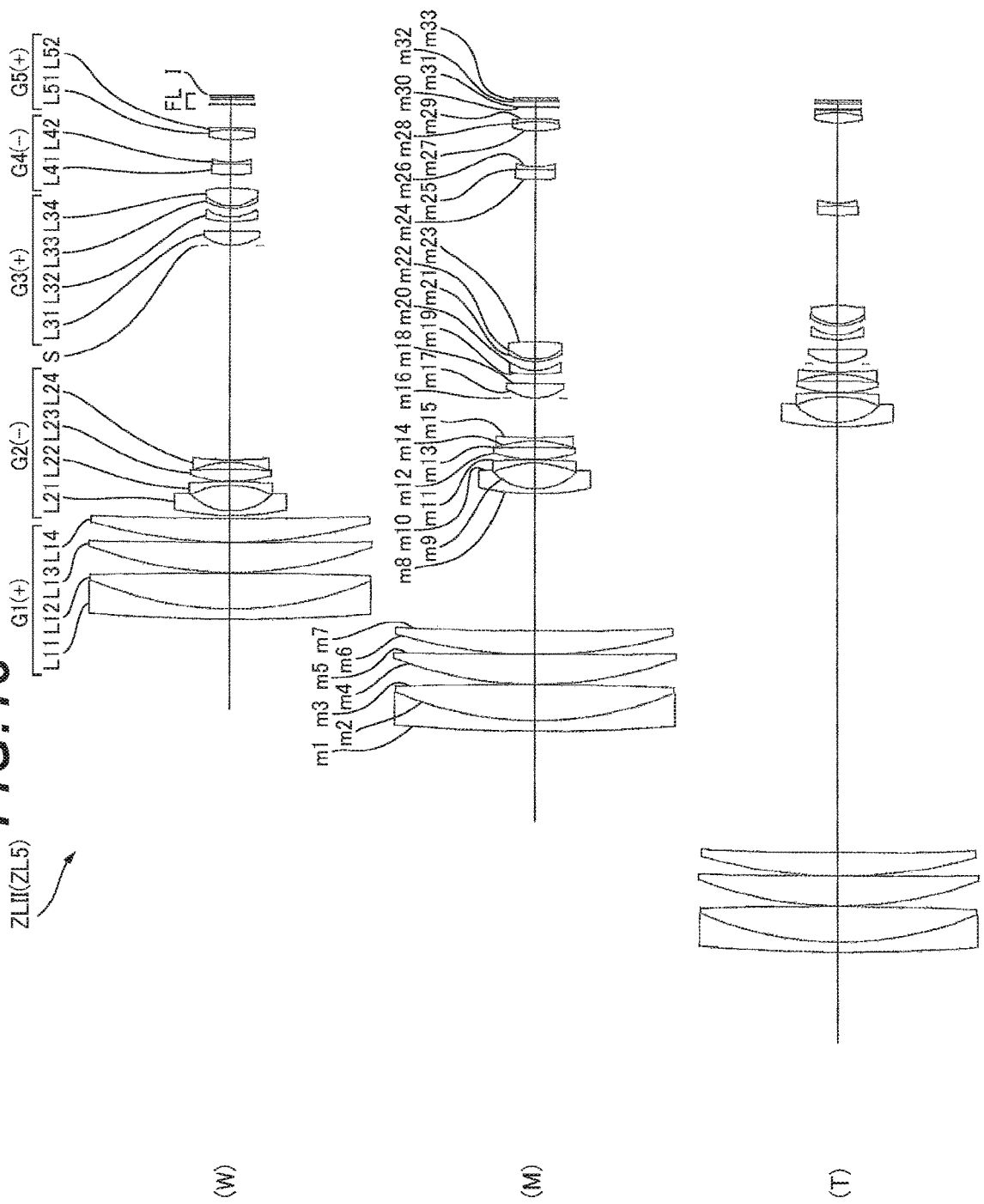
FIG. 13 illustrates a sectional view showing a configuration of a zoom lens according to Example 5, where (W) depicts a wide angle end state, (M) depicts an intermediate focal length end state, and (T) depicts a position of each lens in a telephoto end state.

Example 5 is described using FIG. 13, FIGS. 14A, 14B and 14C, and the Table 5. The zoom lens ZLII according to the fifth example (ZL5) comprises, in order from an object as shown in FIG. 13, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a negative meniscus lens L22 having a concave surface facing the object, a biconvex positive lens L23, and a biconcave negative lens L24.

The third lens group G3 is composed of, in order from the object, a biconvex positive lens L31, a negative meniscus lens L32 having a concave surface facing the image, and a cemented lens composed of a negative meniscus lens L33 having a concave surface facing the image and a biconvex positive lens L34. Both side surfaces of the biconvex positive lens L31 are aspherical.

The fourth lens group G4 is composed of, in order from the object, a cemented lens composed of a biconvex positive lens L41 and a biconcave negative lens L42.

The fifth lens group G5 is composed of, in order from the object, a cemented lens composed of a biconvex positive lens L51 and a negative meniscus lens L52 having a concave surface facing the object. The object side surface of the biconvex positive lens L51 is aspherical.

An aperture stop S is provided on the object side of the third lens group G3 for the purpose of aiming at adjusting a quantity of light.

The filter FL is provided on the image side of the fifth lens group G5. The filter FL is composed of low-pass filters, infrared cut filters, etc. for cutting spatial frequencies more than the marginal resolution of a solid-state image sensing device, such as CCD disposed on the image surface I.

In the zoom lens ZL5 according to the present example, upon zooming from a wide angle end state to a telephoto end state, all the lens groups from the first lens group G1 to the fifth lens group G5 are moved so that distances between each lens change. Specifically, the first lens group G1 is moved to the object side. The second lens group G2 is moved to the image surface side. The third lens group G3 is moved once to the object side, and afterward moved to the image surface side. The fourth lens group G4 is moved once to the image surface side, and afterward moved to the object side. The fifth lens group G5 is moved to the image surface side. An aperture stop S is moved to the object side together with the third lens group G3.

The following Table 5 shows values of each various data according to Example 5. The surface numbers 1 to 33 in Table 5 correspond to each optical surface of m1 to m33 shown in FIG. 13.

TABLE 5

[Lens Data]

| Surface number | R | D | nd | vd |
|---|---|---|---|---|
| Object surface | ∞ | | | |
| 1 | 332.6865 | 2.3000 | 1.7880 | 47.35 |
| 2 | 68.7077 | 7.9529 | 1.4370 | 95.10 |
| 3 | −792.4624 | 0.1000 | | |
| 4 | 75.9597 | 6.6000 | 1.4978 | 82.57 |
| 5 | 1080.6696 | 0.1000 | | |
| 6 | 95.1129 | 5.2000 | 1.4978 | 82.57 |
| 7 | 572.0061 | D7(Variable) | | |
| 8 | 52.5449 | 1.0000 | 1.8348 | 42.73 |
| 9 | 11.4702 | 5.7000 | | |
| 10 | −19.4639 | 0.8000 | 1.8160 | 46.59 |
| 11 | −138.4066 | 0.1000 | | |
| 12 | 25.9493 | 2.6314 | 1.9459 | 17.98 |
| 13 | −143.3398 | 1.5000 | | |
| 14 | −21.1331 | 0.7000 | 1.7130 | 53.94 |
| 15 | 85.8491 | D15(Variable) | | |
| 16 | ∞ | 0.1000 | (Stop S) | |
| *17 | 9.3923 | 3.0788 | 1.5533 | 71.68 |
| *18 | −154.0447 | 2.1252 | | |
| 19 | 20.7239 | 1.0000 | 1.9108 | 35.25 |
| 20 | 8.2675 | 2.0000 | | |
| 21 | 10.2754 | 0.5000 | 1.7859 | 44.17 |
| 22 | 7.9325 | 4.0000 | 1.4875 | 70.32 |
| 23 | −26.6811 | D23(Variable) | | |
| 24 | 44.3901 | 2.2259 | 1.5317 | 48.78 |
| 25 | −233.6852 | 0.5000 | 1.4978 | 82.57 |
| 26 | 12.9802 | D26(Variable) | | |
| *27 | 17.9809 | 2.2407 | 1.5891 | 61.15 |
| 28 | −20.0000 | 0.5000 | 1.7174 | 29.57 |
| 29 | −147.4991 | D29(Variable) | | |
| 30 | ∞ | 0.2100 | 1.5168 | 63.88 |
| 31 | ∞ | 0.8500 | | |
| 32 | ∞ | 0.5000 | 1.5168 | 63.88 |
| 33 | ∞ | Bf | | |
| Image surface | ∞ | | | |

[Aspherical Data]

| Surface number | κ | A4 | A6 | A8 | A10 |
|---|---|---|---|---|---|
| 17 | 0.8353 | −4.6313E−05 | −3.6242E−07 | 2.9634E−09 | 0.0000E+00 |
| 18 | 1.0000 | 6.7198E−05 | −4.0471E−07 | 1.0833E−08 | −6.1745E−11 |
| 27 | −0.5478 | 2.2570E−05 | −1.3489E−06 | 4.5185E−08 | 0.0000E+00 |

[General Data]
Zooming rate 70.00

| | Wide angle end | Intermediate focus | Telephoto end |
|---|---|---|---|
| f | 4.430 | 37.064 | 310.100 |
| Fno | 2.51999 | 5.81666 | 5.6272 |
| ω | 43.39058 | 6.11341 | 0.72895 |
| Bf | 0.400 | 0.400 | 0.400 |
| Bf(Air) | 5.899 | 3.357 | 0.942 |
| TL | 116.1281 | 140.7703 | 189.7467 |
| TL(Air) | 116.3701 | 141.0123 | 189.9887 |

TABLE 5-continued

[Variable Distance Data]

| Variable distance | Wide angle end | Intermediate focus | Telephoto end |
|---|---|---|---|
| D7 | 0.75000 | 30.71122 | 94.88378 |
| D15 | 47.52740 | 8.76826 | 1.87939 |
| D23 | 2.92278 | 35.90870 | 20.00918 |
| D26 | 5.00000 | 8.00000 | 18.01274 |
| D29 | 5.25664 | 2.71478 | 0.30000 |

[Lens Group Data]

| Group number | Group starting surface | Group focal length |
|---|---|---|
| G1 | 1 | 119.50699 |
| G2 | 8 | −9.30300 |
| G3 | 17 | 18.50000 |
| G4 | 24 | −39.35678 |
| G5 | 27 | 31.99996 |

[Conditional Expression]

| | |
|---|---|
| Conditional Expression(10) | (−f2)/ft = 0.030 |
| Conditional Expression(11) | AVE1Grpvd = 76.90 |
| Conditional Expression(12) | G1vd = 47.35 |
| Conditional Expression(13) | D12t/D12w = 126.51 |
| Conditional Expression(14) | β2t/β2w = 14.30 |
| Conditional Expression(15) | f3/ft = 0.060 |

Based on Table 5, it is found that in the zoom lens ZL5 according to the present example the conditional expressions (10) to (15) are satisfied.

FIGS. 14A, 14B and 14C illustrate graphs showing various aberrations upon focusing on imaging distance infinity regarding a zoom lens ZL5 according to Example 5 (graphs showing spherical aberration, astigmatism, distortion, coma aberration and lateral chromatic aberration), where FIG. 14A depicts a wide angle end state, FIG. 14B depicts an intermediate focal length status, and FIG. 14C depicts a telephoto end state.

As it is obvious based on each graph showing aberrations shown in FIGS. 14A, 14B and 14C, it is found that in the zoom lens ZL5 according to Example 5 various aberrations are appropriately corrected, and outstanding imaging performance is obtained.

Example 6

Example 6 is described using FIG. 15 and FIGS. 16A, 16B and 16C, and Table 6. The zoom lens ZLII according to Example 6 (ZL6) comprises, as shown in FIG. 15, in order from the object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a cemented lens composed of a biconcave negative lens L22 and a biconvex positive lens L23, and a negative meniscus lens L24 having a concave surface facing the object.

The third lens group G3 is composed of, in order from the object, a biconvex positive lens L31, a negative meniscus lens L32 having a concave surface facing the image, and a cemented lens composed of a positive meniscus lens L33 having a convex surface facing the object and a biconvex positive lens L34. Both sides of the biconvex positive lens L31 are aspherical.

The fourth lens group G4 is composed of, in order from the object, a cemented lens composed of a positive meniscus lens L41 having a convex surface facing the image and a biconcave negative lens L42.

The fifth lens group G5 is composed of, in order from the object, a cemented lens composed of a biconvex positive lens L51 and a negative meniscus lens L52 having a concave surface facing the object. The object side surface of the biconvex positive lens L51 is aspherical.

An aperture stop S is provided on the object side of the third lens group G3 for the purpose of aiming at adjusting the quantity of light.

The filter FL is provided in the image side of the fifth lens group G5. The filter FL is composed of low-pass filters, infrared cut filters, etc. for cutting spatial frequencies more than the marginal resolution of a solid-state image sensing device, such as CCD disposed on the image surface I.

The zoom lens ZL6 according to the present example, upon zooming from a wide angle end state to a telephoto end state, all lens groups from the first lens group G1 to the fifth lens group G5 are moved so that distances between each lens group change. Specifically, the first lens group G1 is moved to the object side. The second lens group G2 is moved once to the image surface side, and afterward moved to the object side. The third lens group G3 is moved to the object side. The fourth lens group G4 is moved once to the image surface side, and afterward moved to the object side. The fifth lens group G5 is moved to the image surface side. An aperture stop S is moved to the object side together with the third lens group G3.

The following Table 6 shows values of each various data according to Example 6. The surface numbers 1 to 32 in Table 6 correspond to each optical surface of m1 to m32 shown in FIG. 15.

TABLE 6

[Lens Data]

| Surface number | R | D | nd | νd |
|---|---|---|---|---|
| Object surface | ∞ | | | |
| 1 | 291.9703 | 2.3000 | 1.7859 | 44.17 |
| 2 | 72.3111 | 7.4243 | 1.4370 | 95.10 |
| 3 | −1201.3878 | 0.1000 | | |
| 4 | 78.8924 | 6.4219 | 1.4978 | 82.57 |
| 5 | 1542.7728 | 0.1000 | | |
| 6 | 82.9135 | 5.2000 | 1.4978 | 82.57 |
| 7 | 311.2487 | D7(Variable) | | |
| 8 | 60.7024 | 1.0000 | 1.8830 | 40.66 |
| 9 | 12.9654 | 5.9446 | | |
| 10 | −22.2075 | 0.8000 | 1.7440 | 44.80 |
| 11 | 16.9140 | 3.7500 | 1.9229 | 20.88 |
| 12 | −64.8769 | 1.7659 | | |
| 13 | −15.7953 | 0.7000 | 1.6968 | 55.52 |
| 14 | −45.5525 | D14(Variable) | | |
| 15 | ∞ | 0.1000 | (Stop S) | |
| 16 | 10.5140 | 2.9919 | 1.5533 | 71.68 |
| *17 | −58.4572 | 2.8910 | | |
| *18 | 30.8667 | 1.0000 | 1.9037 | 31.31 |
| 19 | 9.3737 | 1.7411 | | |
| 20 | 14.0809 | 1.0000 | 1.7859 | 44.17 |
| 21 | 17.6611 | 3.0000 | 1.4978 | 82.57 |
| 22 | −23.7336 | D22(Variable) | | |
| 23 | −558.9081 | 2.2109 | 1.5317 | 48.78 |
| 24 | −37.3536 | 0.5000 | 1.4978 | 82.57 |
| 25 | 22.4761 | D25(Variable) | | |
| 26 | 37.6571 | 2.0000 | 1.5891 | 61.15 |
| *27 | −20.0000 | 0.5000 | 1.7174 | 29.57 |
| 28 | −30.9522 | D28(Variable) | | |
| 29 | ∞ | 0.2100 | 1.5168 | 63.88 |
| 30 | ∞ | 0.8500 | | |
| 31 | ∞ | 0.5000 | 1.5168 | 63.88 |
| 32 | ∞ | Bf | | |
| Image surface | ∞ | | | |

[Aspherical Data]

| Surface number | κ | A4 | A6 | A8 | A10 |
|---|---|---|---|---|---|
| 17 | 0.2984 | 2.2126E−05 | −9.6783E−08 | 1.0853E−08 | 0.0000E+00 |
| 18 | 1.0000 | 7.4554E−05 | −4.8732E−07 | 1.4048E−08 | −6.1745E−11 |
| 27 | 15.0166 | −8.4847E−05 | 6.1404E−08 | −7.2871E−12 | 0.0000E+00 |

[General Data]
Zooming rate 78.22

| | Wide angle end | Intermediate focus | Telephoto end |
|---|---|---|---|
| f | 4.430 | 39.179 | 346.505 |
| Fno | 2.43455 | 4.13217 | 6.96915 |
| ω | 43.38805 | 5.81887 | 0.66236 |
| Bf | 0.400 | 0.400 | 0.400 |
| Bf(Air) | 8.065 | 4.492 | 2.081 |
| TL | 115.1645 | 157.4796 | 199.5146 |
| TL(Air) | 115.4065 | 157.7216 | 199.7566 |

[Variable Distance Data]

| Variable distance | Wide angle end | Intermediate focus | Telephoto end |
|---|---|---|---|
| D7 | 0.75000 | 59.34562 | 89.39655 |
| D14 | 45.32590 | 12.31287 | 1.98552 |

TABLE 6-continued

| | | | |
|---|---|---|---|
| D22 | 1.45649 | 18.75135 | 8.86102 |
| D25 | 5.04939 | 8.04422 | 42.66202 |
| D28 | 7.42269 | 3.84984 | 1.43902 |

[Lens Group Data]

| Group number | Group starting surface | Group focal length |
|---|---|---|
| G1 | 1 | 114.99999 |
| G2 | 8 | −9.35558 |
| G3 | 16 | 18.46138 |
| G4 | 23 | −45.00007 |
| G5 | 26 | 31.23415 |

[Conditional Expression]

| | |
|---|---|
| Conditional Expression(10) | $(-f2)/ft = 0.027$ |
| Conditional Expression(11) | $AVE1Grpvd = 76.10$ |
| Conditional Expression(12) | $G1vd = 44.17$ |
| Conditional Expression(13) | $D12t/D12w = 119.20$ |
| Conditional Expression(14) | $\beta 2t/\beta 2w = 13.15$ |
| Conditional Expression(15) | $f3/ft = 0.053$ |

Based on Table 6, it is found that in the zoom lens ZL6 according to the present example the conditional expressions (10) to (15) are satisfied.

FIGS. 16A, 16B and 16C illustrate graphs showing various aberrations upon focusing on imaging distance infinity regarding the zoom lens ZL6 according to Example 6 (graphs showing spherical aberration, astigmatism, distortion, coma aberration and lateral chromatic aberration), where FIG. 16A depicts a wide angle end state, FIG. 16B depicts an intermediate focal length state, and FIG. 16C depicts a telephoto end state.

As it is obvious based on each group showing aberrations shown in FIGS. 16A, 16B and 16C, it is found that in the zoom lens ZL6 according to Example 6, various aberrations are appropriately corrected, and outstanding imaging performance is obtained.

Example 7

Figure 17:
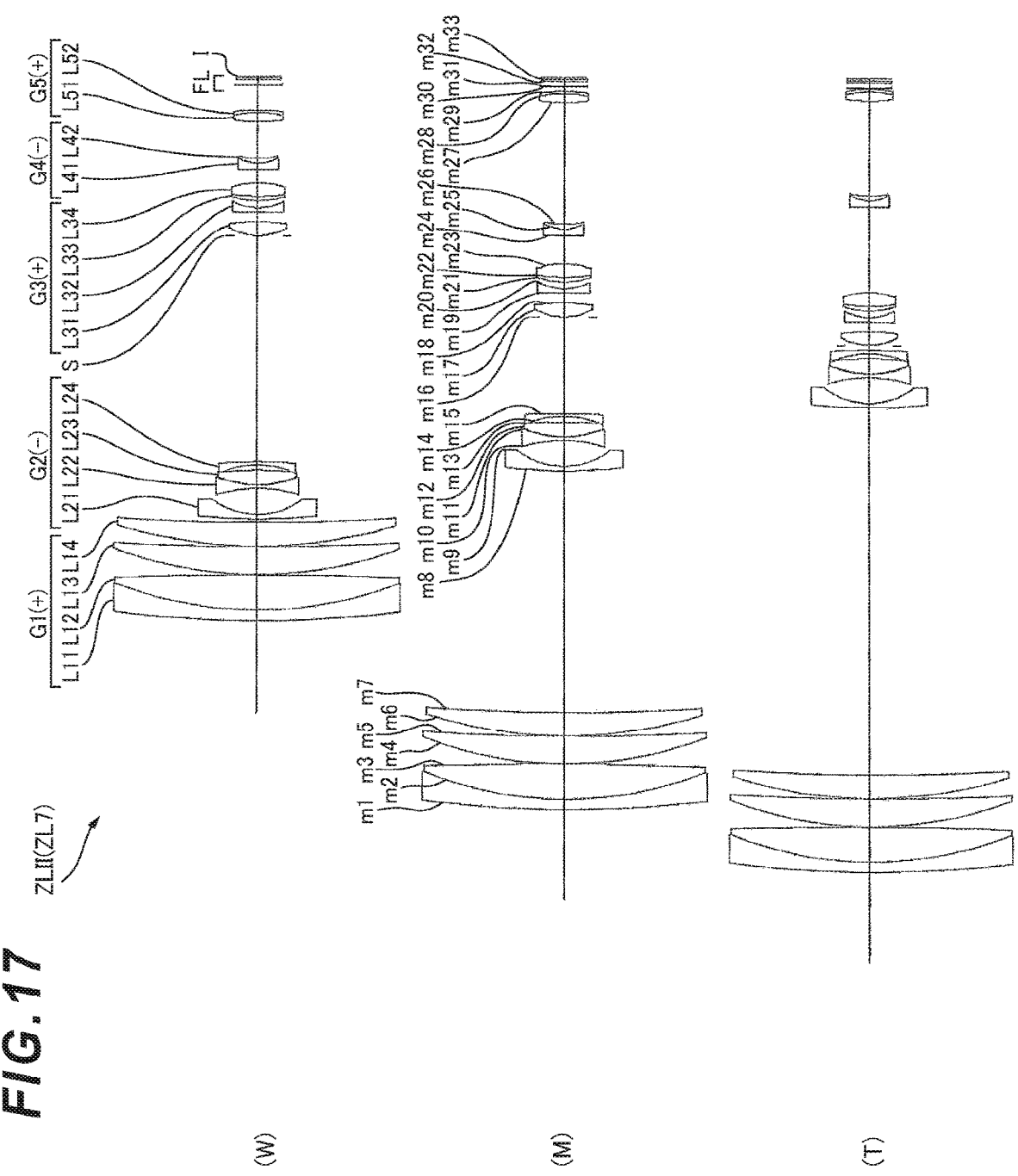
FIG. 17 illustrates a sectional view showing a configuration of a zoom lens according to Example 7, where (W) depicts a wide angle end state, (M) depicts an intermediate focal length state, and (T) depicts a position of each lens group in a telephoto end state.

Example 7 is described using FIG. 17, FIGS. 18A, 18B and 18C, and the Table 7. The zoom lens ZLII according to Example 7 (ZL7) comprises, in order from the object as shown in FIG. 17, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a biconcave negative lens L22, a biconvex positive lens L23, and a negative meniscus lens L24 having a concave surface facing the object.

The third lens group G3 is composed of, in order from the object, a biconvex positive lens L31, a biconcave negative lens L32, and a cemented lens composed of a positive meniscus lens L33 having a convex surface facing the object and a biconvex positive lens L34. Both sides of the biconvex positive lens L31 are aspherical.

The fourth lens group G4 is composed of, in order from the object, a cemented lens composed of a negative meniscus lens L41 having a concave surface facing the image and a positive meniscus lens L42 having a concave surface facing the object.

The fifth lens group G5 is composed of, in order from the object, a cemented lens composed of a biconvex positive lens L51 and a negative meniscus lens L52 having a concave surface facing the object. The object side surface of the biconvex positive lens L51 is aspherical.

An aperture stop S is provided on the object side of the third lens group G3 for the purpose of aiming at adjusting the quantity of light.

The filter FL is provided on the image side of the fifth lens group G5. The filter FL is composed of low-pass filters, infrared cut filters, etc. for cutting spatial frequencies more than the marginal resolution of a solid-state image sensing device, such as CCD disposed on the image surface I.

In the zoom lens ZL7 according to the present example, upon zooming from a wide angle end state to a telephoto end state, all lens groups from the first lens group G1 to the fifth lens group G5 are moved so that distances between each lens group change. Specifically, the first lens group G1 is moved to the object side. The second lens group G2 is moved to the image surface side. The third lens group G3 is moved to the object side. The fourth lens group G4 is moved once to the object side, and afterward moved to the image surface side. The fifth lens group G5 is moved to the image surface side. The aperture stop S is moved to the object side together with the third lens group G3.

The following Table 7 shows values of each various data in Example 7. The surface numbers 1 to 33 in Table 7 correspond to each optical surface of m1 to m33 shown in FIG. 17.

TABLE 7

[Lens Data]

| Surface number | R | D | nd | νd |
|---|---|---|---|---|
| Object surface | ∞ | | | |
| 1 | 208.3815 | 2.3000 | 1.8044 | 39.61 |
| 2 | 71.5047 | 7.7255 | 1.4370 | 95.10 |
| 3 | −765.8864 | 0.1000 | | |
| 4 | 74.8004 | 6.0964 | 1.4978 | 82.57 |
| 5 | 465.0253 | 0.1000 | | |
| 6 | 86.8705 | 5.2000 | 1.4978 | 82.57 |
| 7 | 390.6162 | D7(Variable) | | |
| 8 | 101.8391 | 1.0000 | 1.7880 | 47.35 |
| 9 | 13.9500 | 5.7000 | | |
| 10 | −26.1620 | 0.8000 | 1.8348 | 42.73 |
| 11 | 19.4555 | 0.1000 | | |
| 12 | 19.0787 | 3.2308 | 1.9229 | 20.88 |
| 13 | −66.5101 | 1.1878 | | |
| 14 | −17.6024 | 0.7000 | 1.6968 | 55.52 |
| 15 | −108.5090 | D15(Variable) | | |
| 16 | ∞ | 0.1000 | (Stop S) | |
| *17 | 10.4010 | 3.1500 | 1.5533 | 71.68 |
| *18 | −28.5808 | 2.0669 | | |
| 19 | −293.1983 | 1.0000 | 1.8830 | 40.66 |
| 20 | 10.3933 | 1.5000 | | |
| 21 | 16.1238 | 1.0000 | 1.7859 | 44.17 |
| 22 | 34.1322 | 3.0000 | 1.4978 | 82.57 |
| 23 | −14.4033 | D23(Variable) | | |
| 24 | 743.7882 | 1.5000 | 1.5317 | 48.78 |
| 25 | 8.1699 | 1.0000 | 1.4978 | 82.57 |
| 26 | 16.6750 | D26(Variable) | | |
| *27 | 28.4599 | 2.0005 | 1.5891 | 61.25 |
| 28 | −20.0000 | 0.5000 | 1.7174 | 29.57 |
| 29 | −31.8276 | D29(Variable) | | |
| 30 | ∞ | 0.2100 | 1.5168 | 63.88 |
| 31 | ∞ | 0.8500 | | |
| 32 | ∞ | 0.5000 | 1.5168 | 63.88 |
| 33 | ∞ | Bf | | |
| Image surface | ∞ | | | |

[Aspherical Data]

| Surface number | κ | A4 | A6 | A8 | A10 |
|---|---|---|---|---|---|
| 17 | 0.7787 | −4.4127E−05 | 2.5417E−07 | 6.1315E−09 | 0.0000E+00 |
| 18 | 1.0000 | 1.2195E−04 | −4.0857E−08 | 7.2014E−09 | −6.1745E−11 |
| 27 | −34.1326 | 1.0673E−04 | −3.2846E−06 | 5.1727E−08 | 0.0000E+00 |

[General Data]
Zooming rate 67.15

| | Wide angle end | Intermediate focus | Telephoto end |
|---|---|---|---|
| f | 4.430 | 35.716 | 297.466 |
| Fno | 2.60507 | 4.87201 | 5.85857 |
| ω | 43.06494 | 6.33115 | 0.76345 |
| Bf | 0.400 | 0.400 | 0.400 |
| Bf(Air) | 6.181 | 1.642 | 0.950 |
| TL | 119.7472 | 161.2022 | 174.7740 |
| TL(Air) | 119.9892 | 161.4442 | 175.0160 |

TABLE 7-continued

[Variable Distance Data]

| Variable distance | Wide angle end | Intermediate focus | Telephoto end |
|---|---|---|---|
| D7 | 0.75000 | 53.27134 | 81.00337 |
| D15 | 49.83252 | 21.16730 | 1.00000 |
| D23 | 2.84198 | 6.26878 | 18.82770 |
| D26 | 8.01801 | 26.71375 | 20.84323 |
| D29 | 5.53948 | 1.00000 | 0.30769 |

[Lens Group Data]

| Group number | Group starting surface | Group focal length |
|---|---|---|
| G1 | 1 | 107.05751 |
| G2 | 8 | −8.96757 |
| G3 | 17 | 17.52950 |
| G4 | 24 | −30.00001 |
| G5 | 27 | 27.53859 |

[Conditional Expression]

| | |
|---|---|
| Conditional Expression(10) | $(-f2)/ft = 0.030$ |
| Conditional Expression(11) | $AVE1Grpvd = 74.96$ |
| Conditional Expression(12) | $G1vd = 39.61$ |
| Conditional Expression(13) | $D12t/D12w = 108.00$ |
| Conditional Expression(14) | $\beta2t/\beta2w = 12.35$ |
| Conditional Expression(15) | $f3/ft = 0.059$ |

Based on Table 7, it is found that in the zoom lens ZL7 according to the present example the conditional expressions (10) to (15) are satisfied.

Figure 18A:
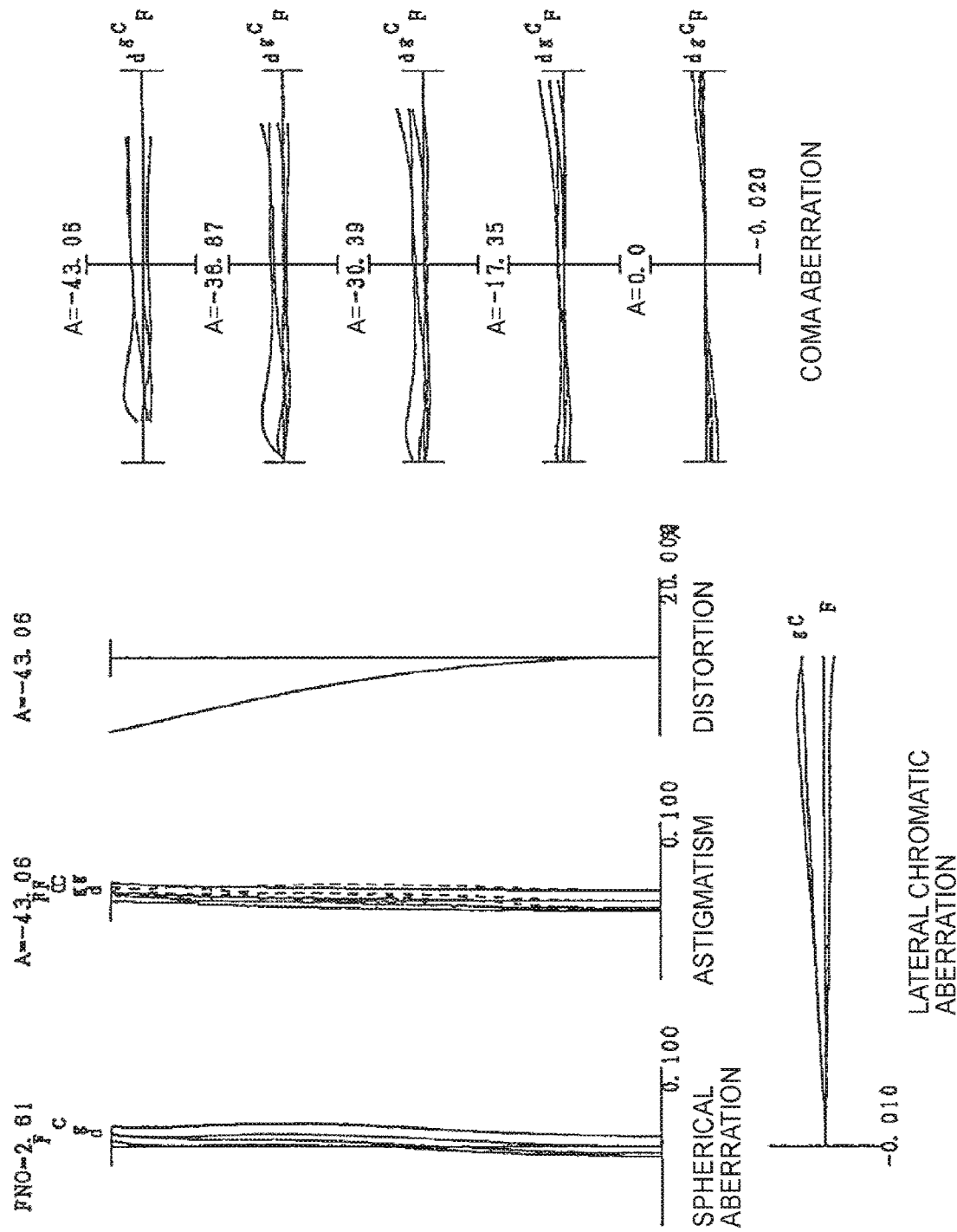
Figure 18B:
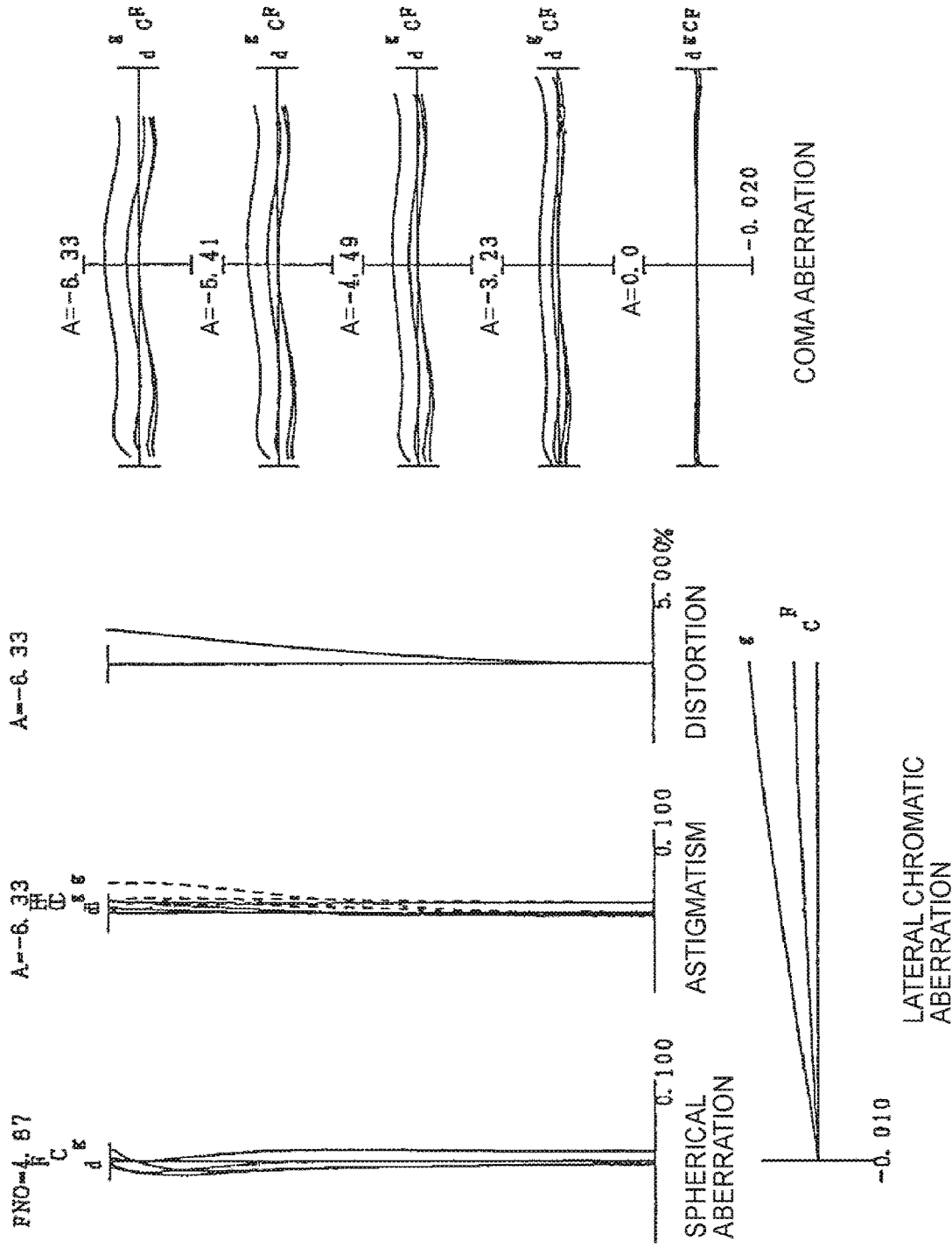

FIGS. 18A, 18B and 18C illustrate graphs showing various aberrations upon focusing on imaging distance infinity regarding a zoom lens ZL7 according to Example 7 (graphs showing spherical aberration, astigmatism, distortion, coma aberration and lateral chromatic aberration), where FIG. 18A depicts a wide angle end state, FIG. 18B depicts an intermediate focal length state, and FIG. 18C depicts a telephoto end state.

As it is obvious based on each group showing aberrations shown in FIGS. 18A, 18B and 18C, it is found that in the zoom lens ZL7 according to Example 7 various aberrations are appropriately corrected, and outstanding imaging performance is obtained.

Example 8

Figure 19:
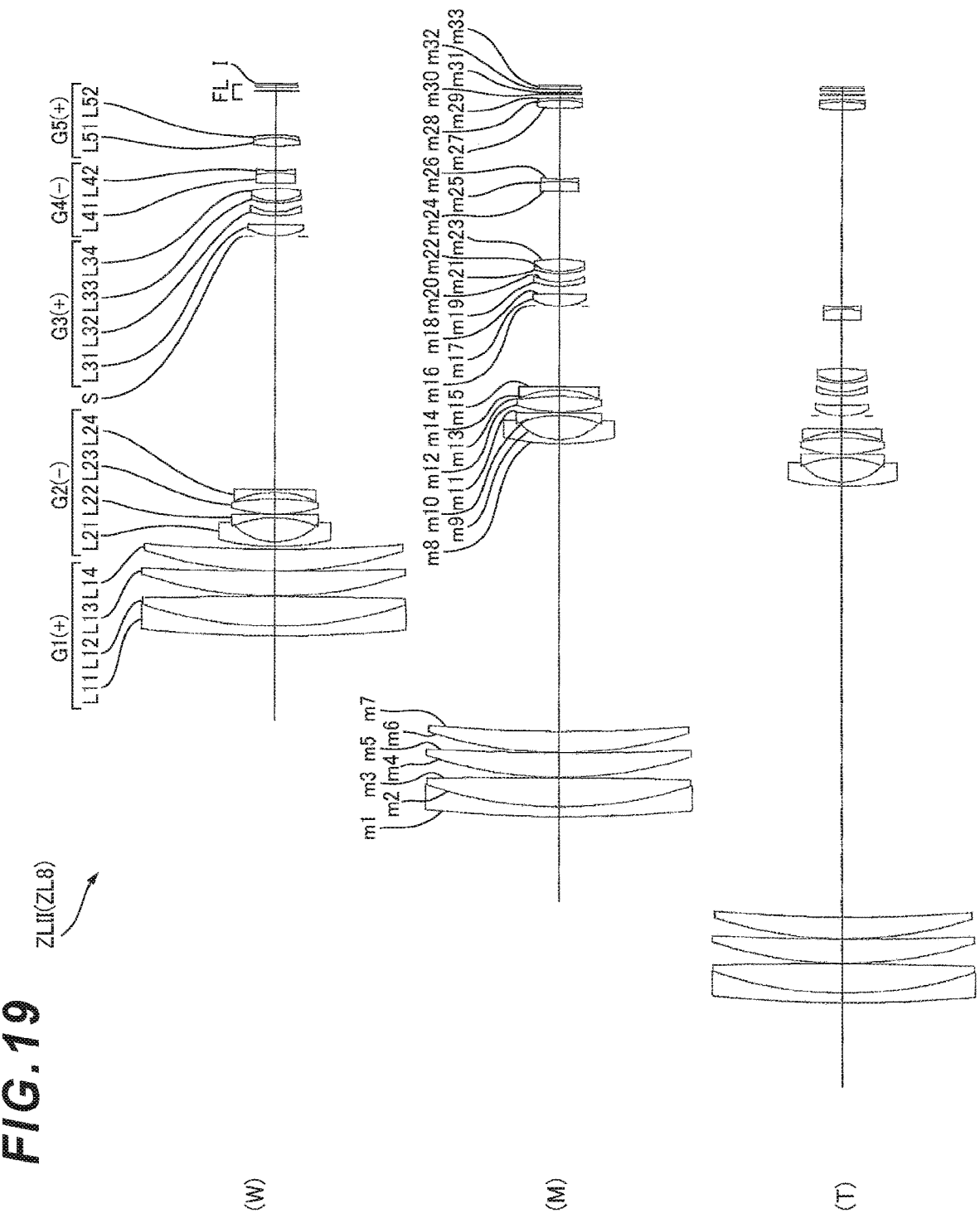
FIG. 19 illustrates a sectional view showing a configuration of a zoom lens according to Example 8, where (W) denotes a wide angle end state, (M) denotes an intermediate focal length state, and (T) denotes a telephoto end state.

Example 8 is described using FIG. 19, FIGS. 20A, 20B and 20C, and Table 8. The zoom lens ZLII according to Example 8 (ZL8) comprises, in order from the object as shown in FIG. 19, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a negative meniscus lens L22 having a concave surface facing the object, a biconvex positive lens L23, and a biconcave negative lens L24.

The third lens group G3 is composed of, in order from the object, a positive lens L31 having a convex surface facing the object, a negative meniscus lens L32 having a concave surface facing the image, and a cemented lens composed of a negative meniscus lens L33 having a concave surface facing the image and a biconvex positive lens L34. Both sides of the biconvex positive lens L31 are aspherical.

The fourth lens group G4 is composed of, in order from the object, a cemented lens composed of a positive meniscus lens L41 having a convex surface facing the image and a biconcave negative lens L42.

The fifth lens group G5 is composed of, in order from the object, a cemented lens composed of a biconvex positive lens L51 and a negative meniscus lens L52 having a concave surface facing the object. The object side surface of the biconvex positive lens L51 is aspherical.

An aperture stop S is provided on the object side of the third lens group G3 for the purpose of aiming at adjusting the quantity of light.

The filter FL is provided on the image side of the fifth lens group G5. The filter FL is composed of low-pass filters, infrared cut filters, etc. for cutting spatial frequencies more than the marginal resolution of a solid-state image sensing device, such as CCD disposed on the image surface I.

In the zoom lens ZL8 according to the present example, upon zooming from a wide angle end state to a telephoto end state, all lens groups from the first lens group G1 to the fifth lens group G5 are moved so that distances between each lens group change. Specifically, the first lens group G1 is moved to the object side. The second lens group G2 is moved once to the image surface side, and afterward moved to the object side. The third lens group G3 is moved to the object side. The fourth lens group G4 is moved to the object side. The fifth lens group G5 is moved to the image surface side. An aperture stop S is moved to the object side together with the third lens group G3.

The following Table 8 shows values of each various data in Example 8. The surface numbers 1 to 33 in Table 8 correspond to each optical surface of m1 to m33 shown in FIG. 19.

TABLE 8

| [Lens Data] | | | | |
|---|---|---|---|---|
| Surface number | R | D | nd | νd |
| Object surface | ∞ | | | |
| 1 | 263.0063 | 2.3000 | 1.7859 | 44.17 |
| 2 | 82.7549 | 7.0000 | 1.4370 | 95.10 |
| 3 | −1109.1351 | 0.1000 | | |
| 4 | 85.5748 | 5.8000 | 1.4370 | 95.10 |
| 5 | 520.4380 | 0.1000 | | |
| 6 | 84.6851 | 5.0982 | 1.4978 | 82.57 |
| 7 | 302.4541 | D7(Variable) | | |
| 8 | 49.5072 | 1.0000 | 1.8830 | 40.66 |
| 9 | 11.5546 | 5.7000 | | |
| 10 | −21.8668 | 0.8000 | 1.8348 | 42.73 |
| 11 | −21914.3660 | 0.1000 | | |
| 12 | 28.1612 | 3.7500 | 1.9229 | 20.88 |
| 13 | −46.2757 | 1.5083 | | |
| 14 | −19.3983 | 0.7000 | 1.6968 | 55.46 |
| 15 | 259.7592 | D15(Variable) | | |
| 16 | ∞ | 0.1000 | (Stop S) | |
| *17 | 11.6667 | 2.7000 | 1.5533 | 71.68 |
| *18 | 8376.3479 | 2.0436 | | |
| 19 | 18.0472 | 1.0000 | 1.9037 | 31.31 |
| 20 | 11.0864 | 2.0000 | | |
| 21 | 17.1967 | 0.5000 | 1.7995 | 42.09 |
| 22 | 10.6441 | 3.0000 | 1.4978 | 82.57 |
| 23 | −28.9001 | D23(Variable) | | |
| 24 | −105.3136 | 2.4205 | 1.5317 | 48.78 |
| 25 | −17.9207 | 0.5000 | 1.4978 | 82.57 |
| 26 | 22.9810 | D26(Variable) | | |
| *27 | 29.1256 | 2.0436 | 1.5891 | 61.25 |
| 28 | −20.0000 | 0.5000 | 1.7174 | 29.57 |
| 29 | −45.0948 | D29(Variable) | | |
| 30 | ∞ | 0.2100 | 1.5168 | 63.88 |
| 31 | ∞ | 0.8500 | | |
| 32 | ∞ | 0.5000 | 1.5168 | 63.88 |
| 33 | ∞ | Bf | | |
| Image surface | ∞ | | | |

| [Aspherical Data] | | | | | |
|---|---|---|---|---|---|
| Surface number | κ | A4 | A6 | A8 | A10 |
| 17 | 0.9914 | −2.7993E−05 | −4.2955E−07 | 1.1909E−08 | 0.0000E+00 |
| 18 | 1.0000 | 5.0164E−05 | −4.0760E−07 | 1.8325E−08 | −6.1745E−11 |
| 27 | −3.5175 | 1.1021E−05 | −2.3098E−07 | 1.6357E−08 | 0.0000E+00 |

[General Data]
Zooming rate 97.00

| | Wide angle end | Intermediate focus | Telephoto end |
|---|---|---|---|
| f | 4.430 | 43.630 | 429.712 |
| Fno | 2.70160 | 5.08497 | 8.28574 |
| ω | 43.39124 | 5.27441 | 0.53600 |
| Bf | 0.400 | 0.400 | 0.400 |
| Bf(Air) | 10.972 | 1.642 | 1.623 |
| TL | 130.7843 | 173.5863 | 217.4697 |
| TL(Air) | 131.0263 | 173.8283 | 217.7117 |

[Variable Distance Data]

| Variable distance | Wide angle end | Intermediate focus | Telephoto end |
|---|---|---|---|
| D7 | 0.75000 | 68.26231 | 102.51459 |
| D15 | 60.14750 | 19.05527 | 3.07934 |

TABLE 8-continued

| | | | |
|---|---|---|---|
| D23 | 1.33023 | 16.10976 | 11.63827 |
| D26 | 5.74536 | 16.66072 | 46.75849 |
| D29 | 10.3295 | 1.00000 | 0.98126 |

[Lens Group Data]

| Group number | Group starting surface | Group focal length |
|---|---|---|
| G1 | 1 | 129.99999 |
| G2 | 8 | −10.74275 |
| G3 | 17 | 20.08616 |
| G4 | 24 | −40.00002 |
| G5 | 27 | 34.00000 |

[Conditional Expression]

| | |
|---|---|
| Conditional Expression(10) | (−f2)/ft = 0.025 |
| Conditional Expression(11) | AVE1Grpvd = 79.24 |
| Conditional Expression(12) | G1vd = 44.17 |
| Conditional Expression(13) | D12t/D12w = 136.69 |
| Conditional Expression(14) | β2t/β2w = 14.30 |
| Conditional Expression(15) | f3/ft = 0.047 |

Based on Table 8, it is found that in the zoom lens ZL8 according to the present example the conditional expressions (10) to (15) are satisfied.

FIGS. 20A, 20B and 20C illustrate graphs showing various aberrations upon focusing on imaging distance infinity regarding a zoom lens ZL8 according to Example 8 (graphs showing spherical aberration, astigmatism, distortion, coma aberration and lateral chromatic aberration), where FIG. 20A depicts a wide angle end state, FIG. 20B depicts an intermediate focal length state, and FIG. 20C depicts a telephoto end state.

As it is obvious based on each graph showing aberrations shown in FIGS. 20A, 20B and 20C, it is found that in the excellent and zoom lens ZL8 according to Example 8 various aberrations are appropriately corrected, and outstanding imaging performance is obtained.

Example 9

Figure 21:
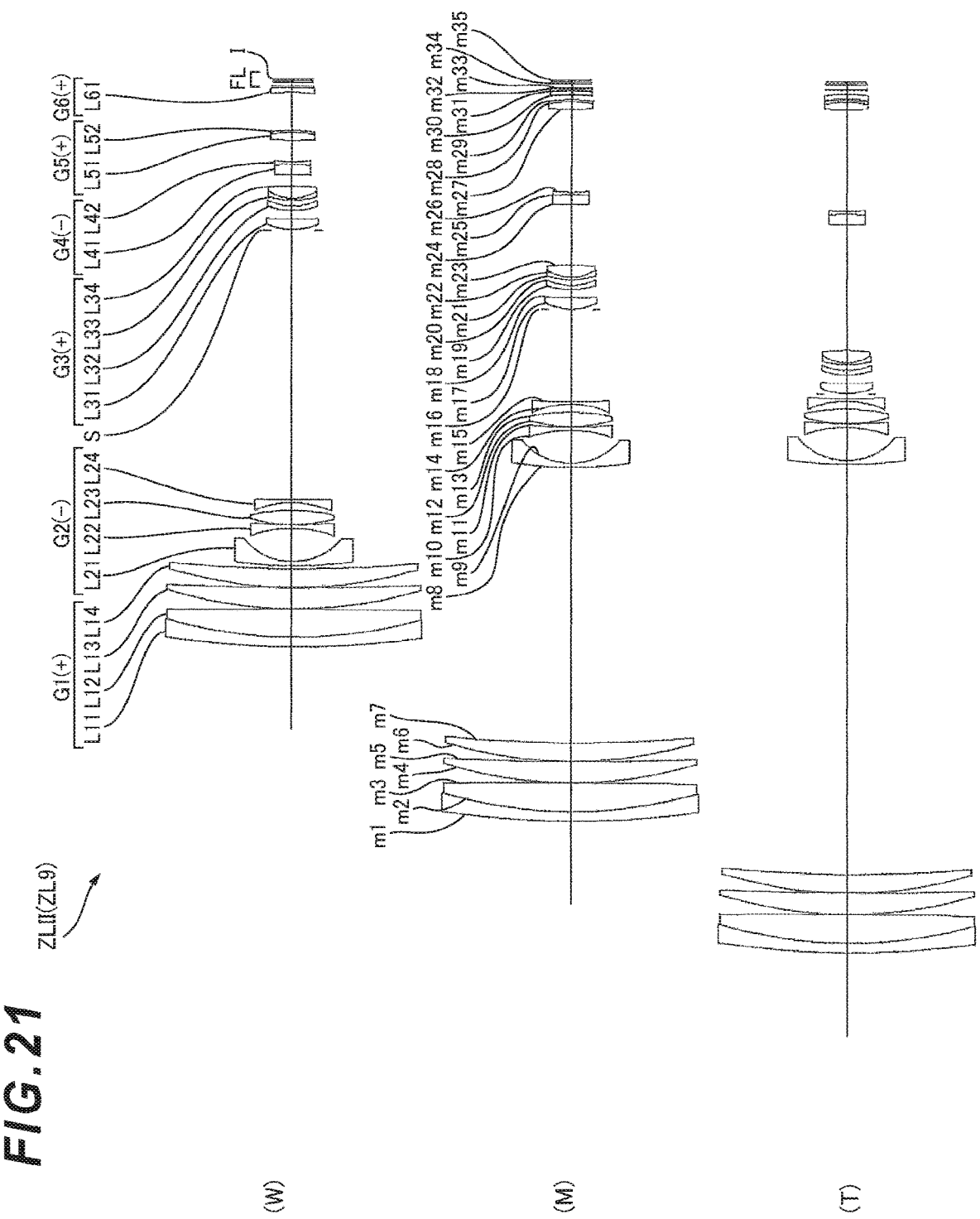
FIG. 21 illustrates a sectional view showing a configuration of a zoom lens according to Example 9, where (W) depicts a wide angle end state, (M) depicts an intermediate focal length state, and (T) depicts a position of each lens group in a telephoto end state.

Example 9 is described using FIG. 21, FIGS. 22A, 22B and 22C, and Table 9. The zoom lens ZLII according to Example 9 (ZL9) comprises, in order from an object as shown in FIG. 21, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having positive refractive power.

The first lens group G1 is composed of, in order from the object, a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object.

The second lens group G2 is composed of a negative meniscus lens L21 having a concave surface facing the image, a biconcave negative lens L22, a biconvex positive lens L23, and a biconcave negative lens L24.

The third lens group G3 is composed of, in order from the object, a positive meniscus lens L31 having a convex surface facing the object, a negative meniscus lens L32 having a concave surface facing the image, a cemented lens composed of a negative meniscus lens L33 having a concave surface facing the image and a biconvex positive lens L34. Both side surfaces of the biconvex positive lens L31 are aspherical.

The fourth lens group G4 is composed of, in order from the object, a cemented lens composed of a positive meniscus lens L41 having a convex surface facing the image and a biconcave negative lens L42.

The fifth lens group G5 is composed of, in order from the object, a cemented lens composed of a biconvex positive lens L51 and a negative meniscus lens L52 having a concave surface facing the object. The object side surface of the biconvex positive lens L51 is aspherical.

The sixth lens group G6 is composed of a positive meniscus lens L61 having a convex surface facing the image.

An aperture stop S is provided on the object side of the third lens group G3 for the purpose of aiming at adjusting the quantity of light.

An filter FL is provided on the image side of the sixth lens group G6. The filter FL is composed of low-pass filters, infrared cut filters, etc. for cutting spatial frequencies more than the marginal resolution of a solid-state image sensing device, such as CCD disposed on the image surface I.

In the zoom lens ZL9 according to the present example, upon zooming from a wide angle end state to a telephoto end state, all lens groups from the first lens group G1 to the sixth lens group G6 are moved so that distances between each lens group change. Specifically, the first lens group G1 is moved to the object side. The second lens group G2 is moved to the image surface side. The third lens group G3 is moved to the object side. The fourth lens group G4 is moved to the object side. The fifth lens group G5 is moved to the image surface side. The sixth lens group G6 is moved to the object side. The aperture stop S is moved to the object side together with the third lens group G3.

The following Table 9 shows values of each various data in Example 9. The surface numbers 1 to 35 in Table 9 correspond to each optical surface of m1 to m35 shown in FIG. 21.

TABLE 9

[Lens Data]

| Surface number | R | D | nd | νd |
|---|---|---|---|---|
| Object surface | ∞ | | | |
| 1 | 185.9259 | 2.3000 | 1.900433 | 37.37 |
| 2 | 93.7725 | 7.0058 | 1.437001 | 95.10 |
| 3 | −2966.2960 | 0.1000 | | |
| 4 | 90.7425 | 5.1630 | 1.437001 | 95.10 |
| 5 | 576.7002 | 0.1000 | | |
| 6 | 91.5818 | 4.5000 | 1.497820 | 82.57 |
| 7 | 271.0724 | D7(Variable) | | |
| 8 | 85.5699 | 1.0000 | 1.883000 | 40.66 |
| 9 | 13.7260 | 8.0241 | | |
| 10 | −25.3126 | 0.8000 | 1.834810 | 42.73 |
| 11 | 100.2702 | 0.1000 | | |
| 12 | 32.0359 | 3.4979 | 1.922860 | 20.88 |
| 13 | −40.2295 | 1.9112 | | |
| 14 | −20.0004 | 0.7000 | 1.696802 | 55.46 |
| 15 | 534.4663 | D15(Variable) | | |
| 16 | ∞ | 0.1000 | (Stop S) | |
| *17 | 11.8578 | 2.7000 | 1.553319 | 71.68 |
| *18 | 358.4613 | 2.0000 | | |
| 19 | 15.5677 | 1.0000 | 1.903658 | 31.31 |
| 20 | 11.2909 | 1.5000 | | |
| 21 | 18.2012 | 0.5000 | 1.799520 | 42.09 |
| 22 | 9.1742 | 3.0523 | 1.497820 | 82.57 |
| 23 | −39.5155 | D23(Variable) | | |
| 24 | −147.7108 | 2.5218 | 1.53172 | 48.78 |
| 25 | −28.3514 | 0.5000 | 1.49782 | 82.57 |
| 26 | 21.1401 | D26(Variable) | | |
| *27 | 38.0765 | 2.0000 | 1.58913 | 61.25 |
| 28 | −20.0000 | 0.5000 | 1.71736 | 29.57 |
| 29 | −34.6793 | D29(Variable) | | |
| 30 | −35.0000 | 1.1441 | 1.49782 | 82.57 |
| 31 | −30.0000 | D31(Variable) | | |
| 32 | ∞ | 0.2100 | 1.51680 | 63.88 |
| 33 | ∞ | 0.8500 | | |
| 34 | ∞ | 0.5000 | 1.51680 | 63.88 |
| 35 | ∞ | Bf | | |
| Image surface | ∞ | | | |

[Aspherical Data]

| Surface number | κ | A4 | A6 | A8 | A10 |
|---|---|---|---|---|---|
| 17 | 1.0048 | −2.5489E−05 | −3.9473E−07 | 9.6614E−09 | 0.0000E+00 |
| 18 | 1.0000 | 3.9703E−05 | −3.5578E−07 | 1.5790E−08 | −6.1745E−11 |
| 27 | 1.0000 | −2.7472E−05 | 6.8463E−07 | −1.6469E−08 | 0.0000E+00 |

[General Data]
Zooming rate 97.00

| | Wide angle end | Intermediate focus | Telephoto end |
|---|---|---|---|
| f | 4.430 | 43.631 | 429.720 |
| Fno | 2.92486 | 5.69847 | 8.77338 |
| ω | 43.21864 | 5.26157 | 0.53559 |
| Bf | 0.400 | 0.400 | 0.400 |
| Bf(Air) | 9.938 | 1.860 | 0.942 |
| TL | 138.4644 | 180.7524 | 212.5374 |
| TL(Air) | 138.7064 | 180.9944 | 212.7794 |

[Variable Distance Data]

| Variable distance | Wide angle end | Intermediate focus | Telephoto end |
|---|---|---|---|
| D7 | 0.75000 | 67.31512 | 100.20497 |
| D15 | 65.74525 | 22.59867 | 1.00000 |
| D23 | 2.75173 | 14.55177 | 30.65337 |
| D26 | 5.38192 | 20.23914 | 24.82268 |
| D29 | 9.29589 | 1.21841 | 0.30000 |
| D31 | 0.10000 | 0.37749 | 1.09589 |

TABLE 9-continued

[Lens Group Data]

| Group number | Group starting surface | Group focal length |
|---|---|---|
| G1 | 1 | 129.99999 |
| G2 | 8 | −10.65737 |
| G3 | 17 | 21.00000 |
| G4 | 24 | −38.30835 |
| G5 | 27 | 33.99853 |
| G6 | 30 | 392.02507 |

[Conditional Expression]

| | |
|---|---|
| Conditional Expression(10) | (−f2)/ft = 0.025 |
| Conditional Expression(11) | AVE1Grpvd = 77.54 |
| Conditional Expression(12) | G1vd = 37.37 |
| Conditional Expression(13) | D12t/D12w = 133.616 |
| Conditional Expression(14) | β2t/β2w = 12.35 |
| Conditional Expression(15) | f3/ft = 0.049 |

Based on Table 9, it is found that in the zoom lens ZL9 according to the present example the conditional expressions (10) to (15) are satisfied.

FIGS. 22A, 22B and 22C illustrate graphs showing various aberrations upon focusing on imaging distance infinity of the zoom lens ZL9 according to Example 9 (graphs showing spherical aberration, astigmatism, distortion, coma aberration and lateral chromatic aberration), where FIG. 22A depicts a wide angle end state, FIG. 22B depicts an intermediate focal length state, and FIG. 22C depicts a telephoto end state.

As it is obvious based on each graph showing aberrations shown in FIGS. 22A, 22B and 22C, it is found that in the zoom lens ZL9 according to Example 9, various aberrations are appropriately corrected, and outstanding imaging performance is obtained.

In order to make the present invention understandable, the descriptions were made with elements of the embodiments, however, needless to say, the present invention is not limited to the above.

For example, in the above example the five and six group configurations are exampled, however, other group configurations can be adopted. Specifically, this is applicable to a configuration in which a lens or a lens group is added closest to the object, or a configuration in which a lens or a lens group is added closest to the image. Note that a lens group means part which has at least one lens separated with an air distance which changes upon zooming.

It is appreciated that the zoom lens ZLII according to the third embodiment adopts a focusing lens group in which a single or a plurality of lens groups, or a partial lens group are moved to the optical axis, so that focusing from an infinity object to a short-distance object is performed. This focusing lens group is also applicable to autofocus, and is also suitable for motor drive for autofocus (using an ultrasonic motor, etc.). In particular, it is appreciated that the fourth lens group G4 is used as a focusing lens group. it is appreciated that the fifth lens group G5 is configured as a focusing lens group. Or, it is also possible to perform focusing by concurrently moving the fourth lens group G4 and the fifth lens group G5.

In the zoom lens ZLII according to the third embodiment, each whole lens group or a partial lens group may be configured as a vibration-proof lens group to correct image blur generated due to camera shake, etc. by moving it in a manner of having a component in the direction perpendicular to the optical axis, or rotating and moving (swinging) it in an inner surface direction including the optical axis. In particular, it is preferable that the third lens group G3 is used as a vibration-proof lens group.

In the zoom lens ZLII according to the third embodiment, a lens surface may be configured with a spherical surface or a plane, or configured with an aspherical surface. In a case that a lens surface has a spherical surface or a plane, it is possible to easily have lens processing and an assembly adjustment, and to prevent degradation of optical performance due to errors of the processing and the assembly adjustment, thus it is preferable. It is preferable because there is less degradation of depiction performance when an image surface is shifted. In a case that a lens surface has an aspherical surface, it is appreciated that the aspherical surface is formed as any one of an aspherical surface which is formed through grinding processing, a glass mold aspherical surface which glass is formed into an aspherical surface configuration using a mold, and a complexed aspherical surface which a resin is formed on a surface of glass and formed in an aspherical surface configuration. It is appreciated that a lens surface is formed as a diffractive surface, additionally a lens is formed as a graded-index lens (GRIN lens) or a plastic lens.

In the zoom lens ZLII according to the third embodiment, it is preferable that the aperture stop S is disposed in the third lens group G3, or in its vicinity, however, instead of providing a member as an aperture stop, the role may be substituted with a frame of the lens.

In the zoom lens ZLII according to the third embodiment, an antireflection film having high transmittivity in a large wavelength band may be applied to each lens surface in order to reduce flare and ghost and attain high optical performance with high contrast.

Description of the Embodiments (Fourth Embodiment)

Figure 26:
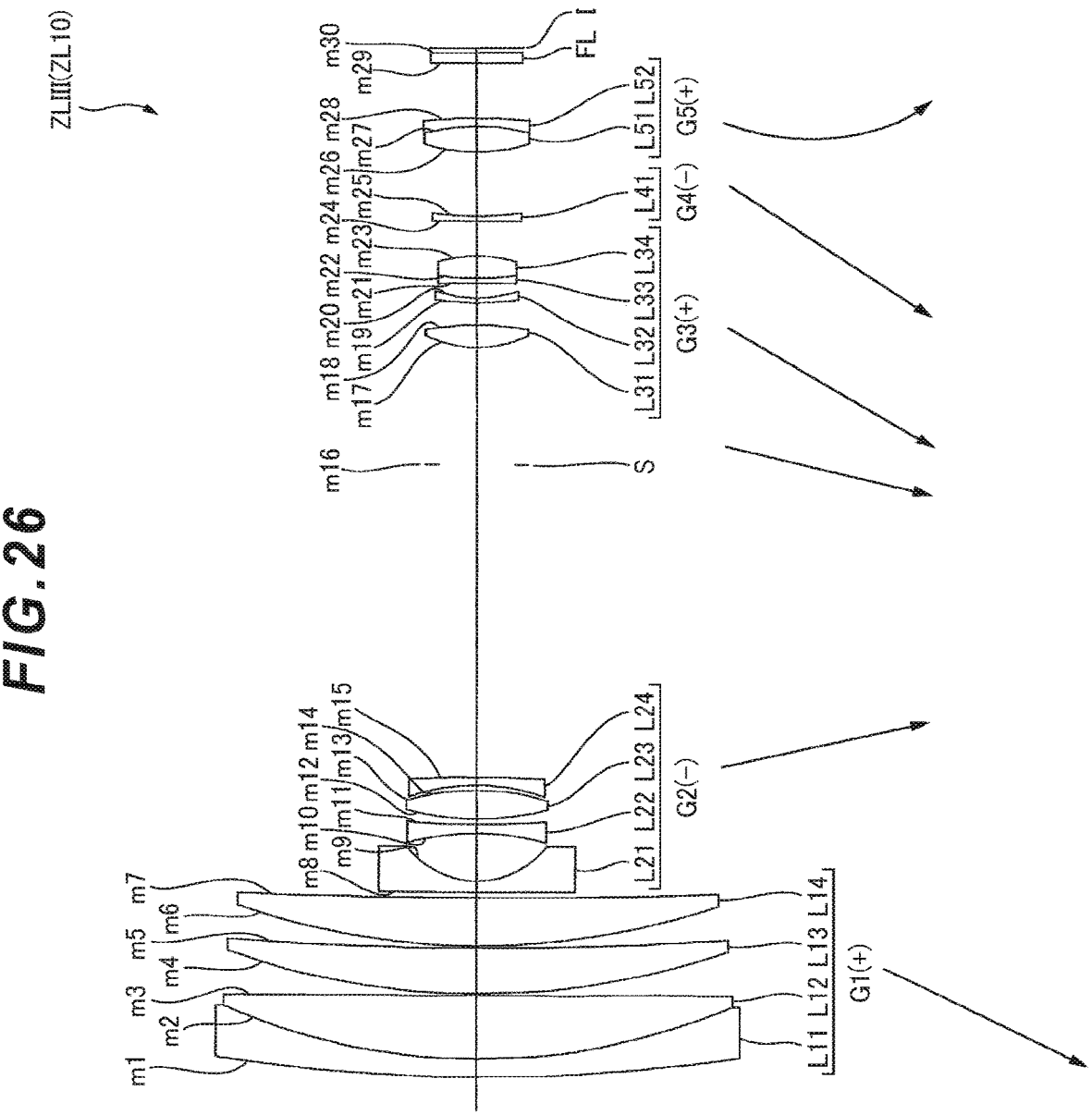
FIG. 26 illustrates a diagram showing a configuration of a zoom lens according to Example 10 and movement footages (indicated in arrows) of each group from a wide angle end state to a telephoto end state.

Hereinafter, an embodiment is described referring to the drawings. The zoom lens ZLIII according to the fourth embodiment comprises, in order from the object as shown in FIG. 26, a first lens group G1 having positive refractive power, a second lens group G2 having negative refractive power, a third lens group G3 having positive refractive power, a fourth lens group G4 having negative refractive power, and a fifth lens group G5 having positive refractive power.

With this arrangement, it is possible to achieve high zoom magnification.

Based on the configurations above, in the zoom lens ZLIII according to the fourth embodiment, the following conditional expressions (16) to (18) are satisfied.

$$33.00 < ft/(-f2) < 46.00 \tag{16}$$

$$1.60 < (Fnt \cdot f1)/ft < 2.30. \tag{17}$$

$$43.00 < \beta2t \cdot \beta3t/(\beta2w \cdot \beta3w) < 65.00 \tag{18}$$

where, ft denotes a focal length of the whole system in a telephoto end state, f2 denotes a focal length of the second lens group G2, Fnt denotes an F value in a telephoto end state, f1 denotes a focal length of the first lens group G1, β2t denotes magnification of the second lens group G2 in a telephoto end state, β3t denotes magnification of the third lens group G3 in the telephoto end state, β2w denotes magnification of the second lens group G2 in a wide angle end state, and β3w denotes magnification of the third lens group G3 in the wide angle end state.

The conditional expression (16) defines a ratio between a focal length of the whole system in a telephoto end state and a focal length of the second lens group G2.

When exceeding the upper limit of the conditional expression (16), various aberrations such as lateral chromatic aberration, coma aberration, and astigmatism will get worse, thus it is not preferable.

In order to ensure the advantageous effect of the fourth embodiment, it is preferable to set the upper limit of the conditional expression (16) to 45.00.

When deceeding the lower limit of the conditional expression (16), various aberrations such as lateral chromatic aberration, coma aberration, and astigmatism will get worse, thus it is not preferable.

In order to ensure the advantageous effect of the fourth embodiment, it is preferable to set the lower limit of the conditional expression (16) to 34.00.

The conditional expression (17) defines an F value of the first lens group G1 in a telephoto end state.

When exceeding the upper limit of the conditional expression (17), various aberrations such as coma aberration and lateral chromatic aberration, etc. in a telephoto end state get worse, thus it is not preferable.

In order to ensure the advantageous effect of the fourth embodiment, it is preferable to set the upper limit of the conditional expression (17) to 2.20.

When deceeding the lower limit of the conditional expression (17), various aberrations such as coma aberration and lateral chromatic aberration, etc. in a telephoto end state will get worse, thus it is not preferable.

In order to ensure the advantageous effect of the fourth embodiment, it is preferable to set the lower limit of the conditional expression (17) to 1.70.

The conditional expression (18) defines a zooming rate between the second lens group G2 and the third lens group G3.

When exceeding the upper limit of the conditional expression (18), various aberrations such as coma aberration and spherical aberration will get worse, thus it is not preferable.

In order to ensure the advantageous effect of the fourth embodiment, it is preferable to set the upper limit of the conditional expression (18) to 63.00.

When deceeding the lower limit of the conditional expression (18), various aberrations such as coma aberration and spherical aberration get worse, thus it is not preferable.

In order to ensure the advantageous effect of the fourth embodiment, it is preferable to set the lower limit of the conditional expression (18) to 45.00.

In the zoom lens ZLIII according to the fourth embodiment, it is preferable that distances between each mutually adjacent lens group change upon zooming from a wide angle end state to a telephoto end state.

With this arrangement, it is possible to achieve high zoom magnification.

In the zoom lens ZLIII according to the fourth embodiment, it is preferable that all lens groups move upon zooming from a wide angle end state to a telephoto end state.

With this arrangement, it is possible to achieve a further wide angle and high zoom magnification while maintaining the size of the whole lens, and astigmatism and chromatic aberration.

In the zoom lens ZLIII according to the fourth embodiment, it is preferable that the fifth lens group G5 is composed of one positive lens and one negative lens.

With this arrangement, it is possible to achieve a further wide angle and high zoom magnification while maintaining the size of the whole lens, and astigmatism and chromatic aberration.

In the zoom lens ZLIII according to the fourth embodiment, it is preferable that the following conditional expression (19) is satisfied.

$$15.00 < ft/f3 < 19.00 \tag{19}$$

where, f3 denotes a focal length of the third lens group G3.

The conditional expression (19) defines a ratio between a focal length of the whole system in a telephoto end state and a focal length of the third lens group G3.

When exceeding the upper limit of the conditional expression (19), various aberrations such as coma aberration, etc. will get worse, thus it is not preferable.

In order to ensure the advantageous effect of the fourth embodiment, it is preferable to set the upper limit of the conditional expression (19) to 18.50.

When deceeding the lower limit of the conditional expression (19), various aberrations such as coma aberrations will get worse, thus it is not preferable.

In order to ensure the advantageous effect of the fourth embodiment, it is preferable to set the lower limit of the conditional expression (19) to 15.50.

In the zoom lens ZLIII according to the fourth embodiment, it is preferable that the following conditional expression (20) is satisfied.

$$15.00 < \beta2t/\beta2w < 25.00 \tag{20}$$

where, β2w denotes magnification of the second lens group G2 in a wide angle end state, and β2t denotes magnification of the second lens group G2 in a telephoto end state.

The conditional expression (20) defines magnification of the second lens group G2 in the wide angle end state, and magnification of the second lens group G2 in the telephoto end state.

When exceeding the upper limit of the conditional expression (20), various aberrations such as coma aberration, etc. will get worse, thus it is not preferable.

In order to ensure the advantageous effect of the fourth embodiment, it is preferable to set the upper limit of the conditional expression (20) to 24.00.

When deceeding the lower limit of the conditional expression (20), various aberrations such as coma and astigmatism, etc. will get worse, thus it is not preferable.

In order to ensure the advantageous effect of the fourth embodiment, it is preferable to set the lower limit of the conditional expression (20) to 16.00.

In the zoom lens ZLIII according to the fourth embodiment, it is preferable that the following conditional expression (21) is satisfied.

$$2.00 < f3/(-f2) < 2.70 \tag{21}$$

where, f3 denotes a focal length of the third lens group G3.

The conditional expression (21) defines a ratio between a focal length of the second lens group G2 and a focal length of the third lens group G3.

When exceeding the upper limit of the conditional expression (21), various aberrations such as distortion, astigmatism, and coma aberration, etc. will get worse, thus it is not preferable.

In order to ensure the advantageous effect of the fourth embodiment, it is preferable to set the upper limit of the conditional expression (21) to 2.60.

When deceeding the lower limit of the conditional expression (21), various aberrations such as distortion, astigmatism, and coma aberration will get worse, thus it is not preferable.

In order to ensure the advantageous effect of the fourth embodiment, it is preferable to set the lower limit of the conditional expression (21) to 2.10.

In the zoom lens ZLIII according to the fourth embodiment, it is preferable that the following conditional expression (22) is satisfied.

$$15.00 < f1/fw < 40.00 \tag{22}$$

where, fw denotes a focal length of the whole system in a wide angle end state.

The conditional expression (22) defines a ratio between a focal length of the first lens group G1 and a focal length of the whole system in the wide angle end state.

When exceeding the upper limit of the conditional expression (22), various aberrations such as distortion, astigmatism, and coma aberration will get worse, thus it is not preferable.

In order to ensure the advantageous effect of the fourth embodiment, it is preferable to set the upper limit of the conditional expression (22) to 35.00.

When deceeding the lower limit of the conditional expression (22), various aberrations such as distortion, astigmatism, and coma aberration will get worse, thus it is not preferable.

In order to ensure the advantageous effect of the fourth embodiment, it is preferable to set the lower limit of the conditional expression (22) to 19.00.

In the zoom lens ZLIII according to the fourth embodiment, it is preferable that the following conditional expression (23) is satisfied.

$$10.00 < ft/x2 < 40.00 \tag{23}$$

where, x2 denotes a distance which the second lens group G2 moves in an image surface direction against an imaging position upon zooming from a wide angle end state to a telephoto end state.

The conditional expression (23) defines a ratio between a distance which the second lens group G2 moves upon zooming from the wide angle end state to the telephoto end state, and a focal length of the whole system in the telephoto end state.

When exceeding the upper limit of the conditional expression (23), various aberrations such as coma aberrations will get worse, thus it is not preferable.

In order to ensure the advantageous effect of the fourth embodiment, it is preferable to set the upper limit of the conditional expression (23) to 37.00.

When deceeding the lower limit of the conditional expression (23), various aberrations such as coma aberration will get worse, thus it is not preferable.

In order to ensure the advantageous effect of the fourth embodiment, it is preferable to set the lower limit of the conditional expression (23) to 15.00.

In the zoom lens ZLIII according to the fourth embodiment, it is preferable to have an aperture stop S between the second lens group G2 and the fourth lens group G4.

With this arrangement, it is possible to appropriately correct various aberrations such as spherical aberration, astigmatism, and distortion, etc.

In the zoom lens ZLIII according to the fourth embodiment, it is preferable to have aperture stop S between the second lens group G2 and the third lens group G3.

With this arrangement, it is possible to appropriately correct various aberrations such as spherical aberration, astigmatism, and distortion, etc.

In the zoom lens ZLIII according to the fourth embodiment, it is preferable to move the aperture stop S in the optical axis direction upon zooming.

With this arrangement, it is possible to appropriately correct various aberrations such as spherical aberration, astigmatism, and distortion, etc.

In the zoom lens ZLIII according to the fourth embodiment, it is preferable that the following conditional expression (24) is satisfied.

$$0.10° < \omega t < 5.00° \tag{24}$$

where, $\omega t$ denotes a half angle of view in a telephoto end state.

The conditional expressions (24) shows a condition defining an optimal value of the angle of view in a telephoto end state. By satisfying this conditional expression (24), it is possible to appropriately correct various aberrations such as coma aberration, distortion, and curvature of field, etc.

In order to ensure the advantageous effect of the fourth embodiment, it is preferable that the upper limit of the conditional expression (24) is 4.00°. In order to further ensure the advantageous effect of the fourth embodiment, it is preferable that the upper limit of the conditional expression (24) is 3.00°. In order to further ensure the advantageous effect of the fourth embodiment, it is preferable that the upper limit of the conditional expression (24) is 2.00°. In order to additionally ensure the advantageous effect of the fourth embodiment, it is preferable that the upper limit of the conditional expression (24) is 1.00°.

In order to ensure the advantageous effect of the fourth embodiment, it is preferable that the lower limit of the conditional expression (24) is 0.30°. In order to ensure the advantageous effect of the fourth embodiment, it is preferable that the lower limit of the conditional expression (24) is 0.50°.

In the zoom lens ZLIII according to the fourth embodiment, it is preferable that the following conditional expression (25) is satisfied.

$$25.00° < \omega w < 80.00° \tag{25}$$

where, $\omega w$ denotes a half angle of view in a wide angle end state.

The conditional expressions (25) shows a condition defining an optimal value of an angle of view in a wide angle end state. By satisfying this conditional expression (25), it is possible to appropriately correct various aberrations such as coma aberration, distortion, and curvature of field while having a wide angle of view.

In order to ensure the advantageous effect of the fourth embodiment, it is preferable that the upper limit of the conditional expression (25) is 70.00°. In order to further ensure the advantageous effect of the fourth embodiment, it is preferable that the upper limit of the conditional expression (25) is 60.00°. In order to further ensure the advantageous effect of the fourth embodiment, it is preferable that the upper limit of the conditional expression (25) is 50.00°.

In order to ensure the advantageous effect of the fourth embodiment, it is preferable that the lower limit of the conditional expression (25) is 30.00°. In order to further ensure the advantageous effect of the fourth embodiment, it is preferable that the lower limit of the conditional expression (25) is 35.00°. In order to additionally ensure the advantageous effect of the fourth embodiment, it is preferable that the lower limit of the conditional expression (25) is 40.00°.

According to the zoom lens ZLIII set forth in the fourth embodiment equipped with the above configurations, it is possible to realize a zoom lens enabling to achieve a further wide angle and high zoom magnification while maintaining the size of the whole lens, and good optical performance.

Figure 32:
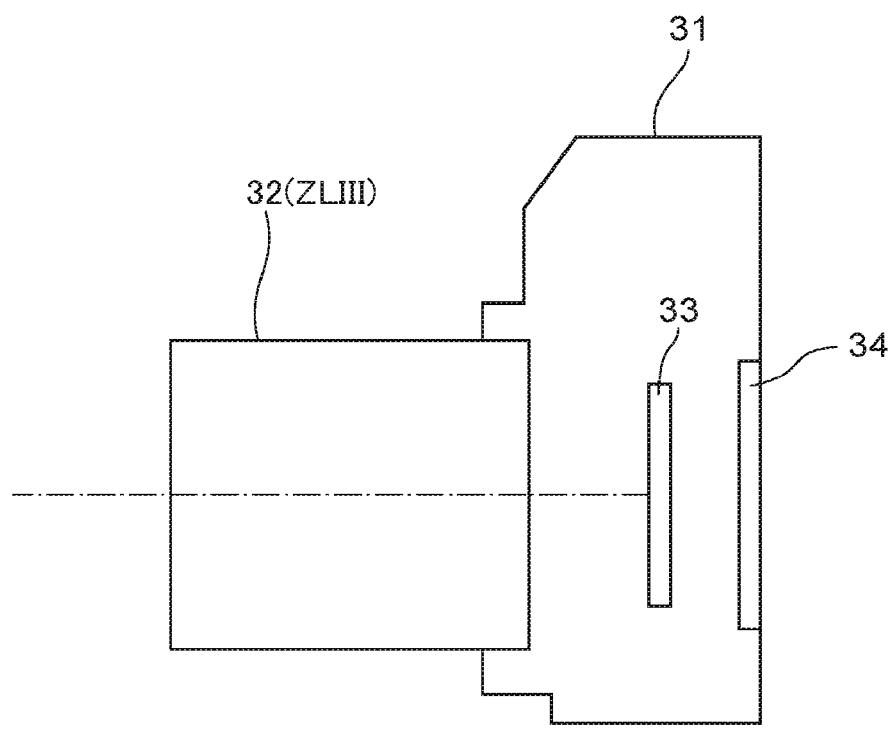
FIG. 32 illustrates a configuration of a camera equipped with the zoom lens according to the fourth embodiment.

Next, referring to FIG. 32, a camera (optical apparatus) equipped with the zoom lens ZLIII is explained. A camera 31 is, as shown in FIG. 32, a lens-interchangeable camera (so-called mirror-less camera) equipped with the above zoom lens ZLIII as an imaging lens 32. In this camera 31, light from an illustrated object (subject) is condensed by the imaging lens 32, and configures a subject image on an imaging surface of the imaging unit 33 via an unillustrated OLPF (Optical low pass filter). An image of the subject is created by photoelectrically converting the subject by a photoelectrtic conversion element provided in the imaging unit 33. This picture is displayed on a EVF (Electronic view finder) 34 provided in the camera 31. With this arrangement, it is possible to observe the subject via the EVF 34. When an unillustrated release button is pressed by a photographer, an image of the subject is memorized in an unillustrated memory. Accordingly, the photographer can shoot the subject with the camera 31.

In the zoom lens ZLIII according to the fourth embodiment equipped with in the camera 31 as the imaging lens 32 has, as found based on each example mentioned below, it is possible to achieve a further wide angle and high zoom magnification with characteristic lens configurations while maintaining the size of the whole lens and good optical performance. Therefore, according to the camera 31, it is possible to realize an optical apparatus which enables to achieve a further wide angle and high zoom magnification while maintaining the size of the whole lens and good optical performance.

Note that in the fourth embodiment, a mirror-less camera was explained, however it is not limited to this. Note that in case of installing the above zoom lens ZLIII on a single-lens reflex type camera having a quick return mirror and observing a subject with a finder optical system, the same advantageous effect as the above camera 31 can be obtained.

Figure 33:
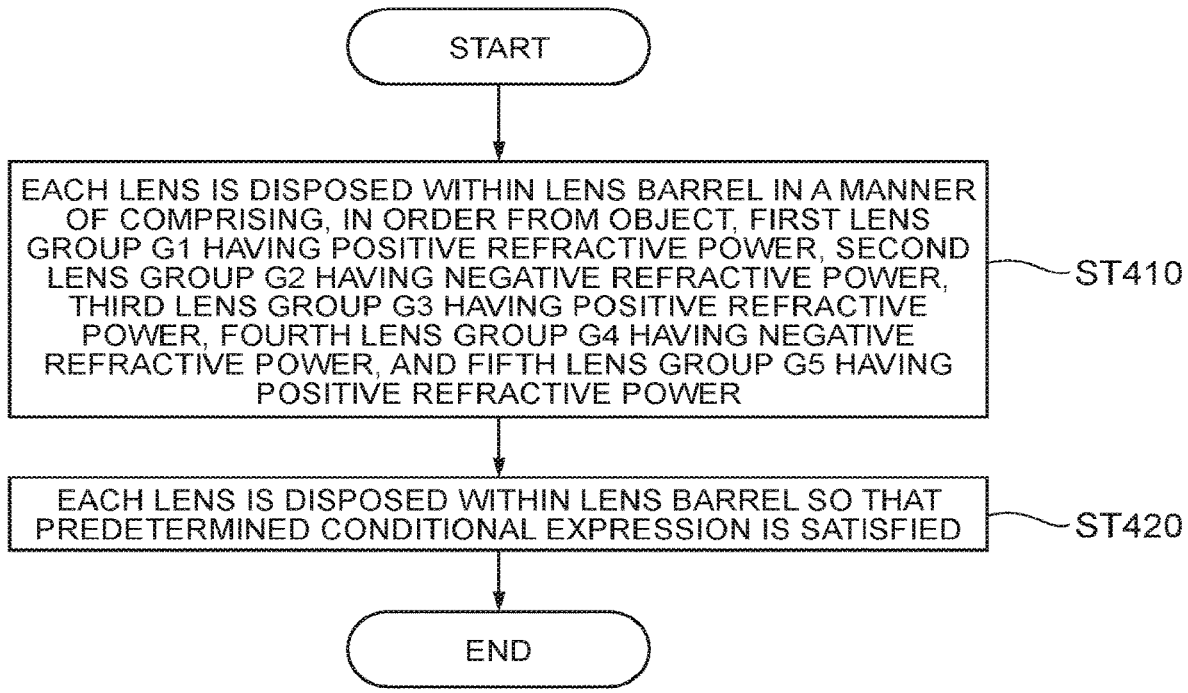
FIG. 33 illustrates a diagram showing an outline of a method for manufacturing the zoom lens according to the fourth embodiment.

Subsequently, a method for manufacturing the zoom lens ZLIII is outlined with reference to FIG. 33. Firstly, each lens is disposed within a lens barrel so that a first lens group G1 having positive refractive power, a second lens group G2 having negative refractive power, a third lens group G3 having positive refractive power, a fourth lens group G4 having negative refractive power, and a fifth lens group G5 having positive refractive power in order from an object (Step ST410). Each lens is disposed within the lens barrel so that the following conditional expressions (16) to (18) are satisfied (Step ST420).

$$33.00 < ft/(-f2) < 46.00 \tag{16}$$

$$1.60 < (Fnt \cdot f1)/ft < 2.30. \tag{17}$$

$$43.00 < \beta 2t \cdot \beta 3t/(\beta 2w \cdot \beta 3w) < 65.00 \tag{18}$$

where, ft denotes a focal length of the whole system in a telephoto end state,
f2 denotes a focal length of the second lens group G2,
Fnt denotes an F value in the telephoto end state,
f1 denotes a focal length of the first lens group G1,
$\beta 2t$ denotes magnification of the second lens group G2 in the telephoto end state,
$\beta 3t$ denotes magnification of the third lens group G3 in the telephoto end state,
$\beta 2w$ denotes magnification of the second lens group G2 in a wide angle end state, and
$\beta 3w$ denotes magnification of the third lens group G3 in the wide angle end state.

Exampling lens configurations according to the fourth embodiment, as shown in FIG. 26, in order from the object, the first lens group G1 is composed of a cemented lens composed of a negative meniscus lens L11 having a concave surface facing the image and a positive meniscus lens L12 having a convex surface facing the object, a positive meniscus lens L13 having a convex surface facing the object, and a positive meniscus lens L14 having a convex surface facing the object, the second lens group G2 is composed of a negative meniscus lens L21 having a concave surface facing the image, a biconcave negative lens L22, a biconvex positive lens L23, and a negative meniscus lens L24 having a concave surface facing the object, the third lens group G3 is composed of a biconvex positive lens L31, a negative meniscus lens L32 having a concave surface facing the image, and a cemented lens composed of a biconcave negative lens L33 and a biconvex positive lens L34, the fourth lens group G4 is composed of a biconcave negative lens L41, and the fifth lens group G5 is composed of a cemented lens composed of a biconvex positive lens L51 and a negative meniscus lens L52 having a concave surface facing the object. Each lens group prepared as above is arranged in the procedures above, then the zoom lens ZLIII is manufactured.

According to the manufacturing method set forth in the fourth embodiment, it is possible to manufacture the zoom lens ZLIII which enables to achieve a further wide angle and high zoom magnification while maintaining the size of the whole lens and good optical performance.

Examples According to Fourth Embodiment

Figure 28:
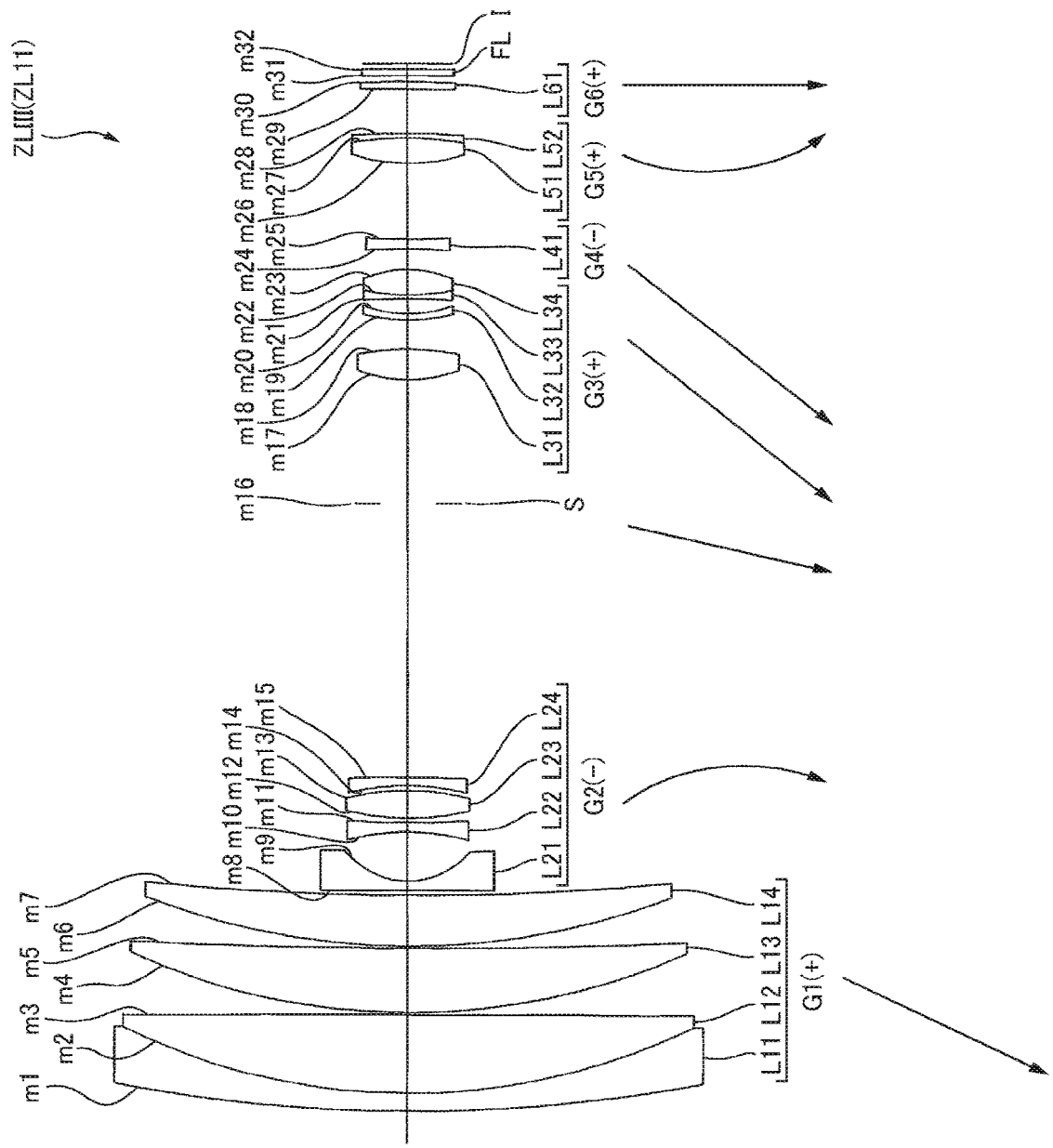
FIG. 28 illustrates a configuration of a zoom lens according to Example 11 and a diagram showing movement footages (indicated in arrows) of each group from wide angle end state to a telephoto end state.
Figure 30:
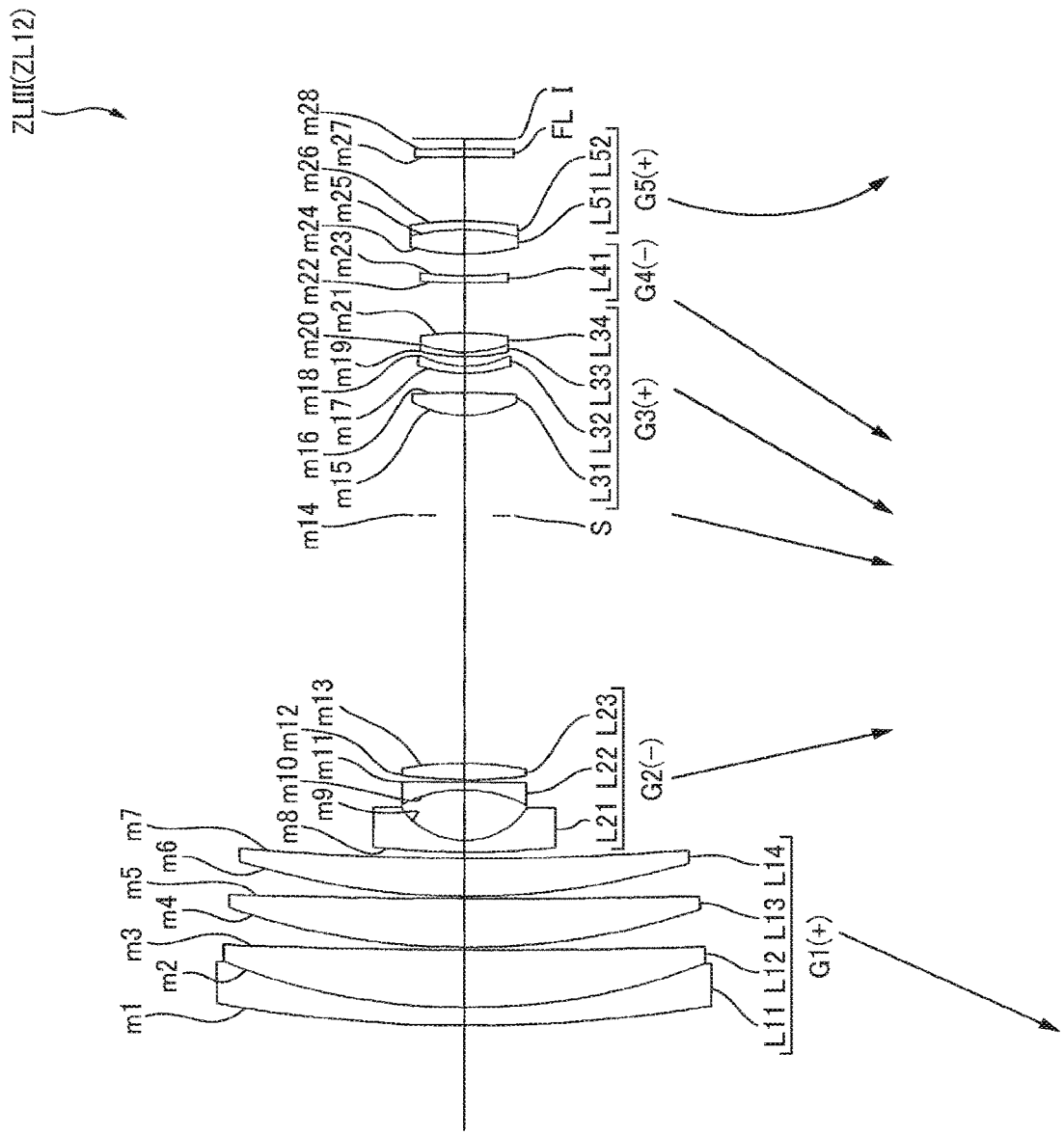
FIG. 30 illustrates a configuration of a zoom lens according to Example 12 and a diagram showing movement footages (indicated in arrows) of each group from a wide angle end state to a telephoto end state.

Next, each example according to the fourth embodiment is described based on the drawings. FIGS. 26, 28 and 30 illustrate sectional views showing configurations and refractive power distribution of the zoom lens ZLIII (ZL10 to ZL12) according to each example. An arrow indicates a movement direction of each lens group upon zooming from a wide angle end state to a telephoto end state in the button of the sectional views of the zoom lenses ZL10 to ZL12.

Each reference sign regarding FIG. 26 according to Example 10 is used independently for every example, in order to avoid complicating explanations due to swelling of the digit number of reference signs. Therefore, even if attached with the same reference signs as those in drawings according to other examples, this does not necessarily mean the same configurations as those in the other examples.

Tables 10 to 12 are shown below, and these are tables showing each various data in Examples 10 to 12.

In each example, d-line (wave length of 587.6 nm) and g-line (wave length of 435.8 nm) are selected as subjects for calculating aberration characteristics.

In [Lens data] in tables, a surface number means an order of each optical surface from the object side along a direction light travels, R means a radius of curvature of each optical surface, D means a surface distance on the optical axis from each optical surface to the next optical surface (or image surface), nd means a refractive index against d-line of a material of a optical member, and ν d means an Abbe number on the basis of d-line of a material of the light member. Object surface means an object surface, Di means a surface distance (surface distance between the i-th surface and the (i+1)-th surface), "∞" of a radius of curvature means a plane or an aperture, (Apeture stop) means an aperture stop S, and an image surface means an image surface I. The refractive index "1.0000" of air is omitted. In a case the optical surface is an aspherical surface, a sign "*" is assigned to the surface number and a paraxial radius of curvature is shown in a column of a radius of curvature R.

In [General data] in tables, φ means a diameter of an aperture stop, Fno means an f number, 2ω means an angle of view (unit: °), BF means a distance on the optical axis from the lens last surface to the paraxial image surface, BF(air) means what a distance from the lens last surface to the paraxial image surface is described in air-equivalent length, TL means a distance on the optical axis from the lens forefront surface to the paraxial image surface, and TL(air) means what is BF(air) is added to a distance on the optical axis from the lens forefront surface to the lens last surface).

In [Aspherical surface data] in tables, regarding the aspherical surfaces in [Lens data], the configuration is defined by the following expression (a). X(y) means a distance along the optical axis direction from a tangent plane in a vertex of the aspherical surface to a position on the aspherical surface at a height y, and R means a radius of curvature (paraxial radius of curvature) of a criterion spherical surface, κ means a conic constant, and, Ai means an i-th aspherical surface coefficient. "E–n" means "×10$^{-n}$." For example, it is 1.234E-05=1.234×10$^{-5}$. Note that the secondary aspherical surface coefficient A2 is 0, and its description is omitted.

$$X(y)=(y^2/R)/\{1+(1-\kappa\times y^2/R^2)^{1/2}\}+A4\times y^4+A6\times y^6+A8\times y^8+A10\times y^{10} \quad (a)$$

In [Variable distance data] in tables, values Di of a variable distance in each state of a wide angle end state, an intermediate focal length state, and a telephoto end state are shown. Note that Di means a variable distance between an i-th surface and an (i+1)-th surface.

In [Lens group data] in tables, G means a group number, a group starting surface means a surface number arranged closest to the object side of each group, a group focal length means a focal length of each group, and a lens configuration length means a distance on the optical axis from a lens surface arranged closest to the object side of each group to a lens surface arranged closest to the image.

Values corresponding to the conditional expressions (16) to (25) are shown in [Conditional expressions] in tables.

Hereinafter, in all general data values, regarding the focal length f, a radius of curvature R, a surface distance D, and other lengths, etc. as shown, "mm" is generally used except a specific request, however an optical system is not limited to the above, since equivalent optical performance can be obtained even if the optical system is proportionally scaled. The unit is not limited to "mm," another appropriate unit is available, instead.

The explanations concerning the tables are common among all the examples, thus hereinafter the explanation is omitted.

Example 10

Example 10 is described using FIG. 26, FIGS. 27A, 27B and 27C, and Table 10. The zoom lens ZLIII according to Example 10 (ZL10) comprises, as shown in FIG. 26, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a cemented lens composed of a negative meniscus lens L11 having a concave surface facing the image and a positive meniscus lens L12 having a convex surface facing the object, a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a biconcave negative lens L22, a biconvex positive lens L23, and a negative meniscus lens L24 having a concave surface facing the object. Both side surfaces of the negative meniscus lens L21 are aspherical.

The third lens group G3 is composed of, in order from the object, a biconvex positive lens L31, a negative meniscus lens L32 having a concave surface facing the image, and a cemented lens composed of a biconcave negative lens L33 and a biconvex positive lens L34. Both side surfaces of the biconvex positive lens L31 are aspherical.

The fourth lens group G4 is composed of a biconcave negative lenses L41.

The fifth lens group G5 is composed of, in order from the object, a cemented lens composed of a biconvex positive lens L51 and a negative meniscus lens L52 having a concave surface facing the object.

An aperture stop S is disposed between the second lens group G2 and the third lens group G3 for the purpose of aiming at adjusting the quantity of light.

The filter group FL is disposed between the fifth lens group G5 and the image surface I. The filter FL is composed of low-pass filters, infrared cut filters, etc. for cutting spatial frequencies more than the marginal resolution of a solid-state image sensing device, such as CCD disposed on the image surface I.

In the zoom lens ZL10 according to the present example, zooming is performed by moving all lens groups G1 to G5 and the aperture stop S in the optical axis direction so that distances between each lens group change. Specifically, upon zooming from a wide angle end state to a telephoto end state, the first lens group G1 is moved to the object side, the second lens group G2 is moved to the image side, the third lens group G3 is moved to the object side, the fourth lens group G4 is moved to the object side, and the fifth lens group G5 is moved once to the object side, and afterward moved to the image side. The aperture stop S is moved to the object side separately from each lens group upon zooming from a wide angle end state to a telephoto end state.

The following Table 10 shows values of each various data in Example 10. The surface numbers 1 to 30 in Table 10 correspond to each optical surface of m1 to m30 shown in FIG. 26.

TABLE 10

[Lens data]

| Surface number | R | D | nd | νd |
|---|---|---|---|---|
| Object surface | ∞ | | | |
| 1 | 299.113 | 3.74 | 1.8348 | 42.7 |
| 2 | 112.365 | 12.9 | 1.4370 | 95.0 |
| 3 | 7582.022 | 0.42 | | |
| 4 | 132.075 | 9.36 | 1.4978 | 82.6 |
| 5 | 631.671 | 0.42 | | |
| 6 | 129.950 | 9.78 | 1.4978 | 82.6 |
| 7 | 1116.862 | (D7) | | |
| *8 | 1147.820 | 2.29 | 1.8820 | 37.2 |
| *9 | 14.801 | 9.78 | | |
| 10 | −46.021 | 1.87 | 1.8348 | 42.7 |
| 11 | 169.618 | 1.04 | | |
| 12 | 49.381 | 5.82 | 1.9229 | 20.9 |
| 13 | −43.941 | 1.04 | | |
| 14 | −36.266 | 1.66 | 1.9108 | 35.3 |
| 15 | −220.373 | (D15) | | |
| 16 | ∞ | (D16) | (Aperture Stop) | |
| *17 | 19.853 | 4.59 | 1.5533 | 71.7 |
| *18 | −43.626 | 4.59 | | |
| 19 | 52.966 | 0.92 | 1.9108 | 35.3 |
| 20 | 22.035 | 3.09 | | |
| 21 | −144.583 | 0.92 | 1.8340 | 37.2 |
| 22 | 55.310 | 4.59 | 1.4978 | 82.6 |
| 23 | −23.136 | (D23) | | |
| 24 | −6040.775 | 1.04 | 1.4875 | 70.3 |
| 25 | 52.947 | (D25) | | |
| 26 | 31.075 | 5.20 | 1.4875 | 70.3 |
| 27 | −37.574 | 1.66 | 1.9108 | 35.3 |
| 28 | −84.589 | (D28) | | |
| 29 | ∞ | 2.02 | 1.5168 | 63.9 |
| 30 | ∞ | (BF) | | |
| Image surface | ∞ | | | |

[General Data]
Zooming rate 75.5

| | Wide angle end | Intermediate focus | Telephoto end |
|---|---|---|---|
| f | 7.70 | 67.58 | 581.59 |
| φ | 14.48 | 14.48 | 16.22 |
| Fno | 2.75 | 5.02 | 6.44 |
| 2ω | 92.58 | 13.446 | 1.5466 |
| BF | 1.00 | 1.00 | 1.00 |
| BF(Air) | 13.63 | 40.77 | 10.22 |
| TL | 210.44 | 273.47 | 321.86 |
| TL(Air) | 209.75 | 272.78 | 321.18 |

[Aspherical Data]

| Surface number | κ | A4 | A6 | A8 | A10 |
|---|---|---|---|---|---|
| 8 | 1.0000 | 5.34E−06 | −5.13E−08 | 1.59E−10 | −1.68E−13 |
| 9 | 0.7435 | 4.24E−06 | −8.79E−08 | −1.70E−11 | 6.06E−13 |
| 17 | 1.0559 | −1.84E−05 | 0.00E+00 | 0.00E+00 | 0.00E+00 |
| 18 | 1.0000 | 1.92E−05 | 0.00E+00 | 0.00E+00 | 0.00E+00 |

[Variable Distance Data]

| Variable distance | Wide angle end | Intermediate focus | Telephoto end |
|---|---|---|---|
| f | 7.70 | 67.58 | 581.59 |
| D7 | 1.144 | 93.67035 | 144.51292 |

TABLE 10-continued

| | | | |
|---|---|---|---|
| D15 | 63.81464 | 15.28327 | 0.57177 |
| D16 | 24.06722 | 2.38004 | 0.23337 |
| D23 | 7.13476 | 21.29766 | 14.87916 |
| D25 | 13.25685 | 12.67442 | 64.04793 |
| D28 | 11.29590 | 38.43652 | 7.88868 |

[Lens Group Data]

| Group number | Group starting surface | Group focal length | Lens configuration length |
|---|---|---|---|
| G1 | 1 | 180.1 | 36.61 |
| G2 | 8 | −15.9 | 23.50 |
| G3 | 17 | 35.9 | 18.69 |
| G4 | 24 | −107.7 | 1.04 |
| G5 | 26 | 65.9 | 6.86 |

[Conditional Expression]

| | |
|---|---|
| Conditional Expression(16) | ft/(−f2) = 36.49 |
| Conditional Expression(17) | (Fnt · f1)/ft = 1.99 |
| Conditional Expression(18) | β2t · β3t/(β2w · β3w) = 53.90 |
| Conditional Expression(19) | ft/f3 = 16.18 |
| Conditional Expression(20) | β2t/β2w = 19.22 |
| Conditional Expression(21) | f3/(−f2) = 2.26 |
| Conditional Expression(22) | f1/fw = 23.38 |
| Conditional Expression(23) | ft/x2 = 18.20 |
| Conditional Expression(24) | ωt = 0.7733° |
| Conditional Expression(25) | ωw = 46.29° |

Based on Table 10, it is found that in the zoom lens ZL10 according to the present example the conditional expressions (16) to (25) are satisfied.

Figure 27C:
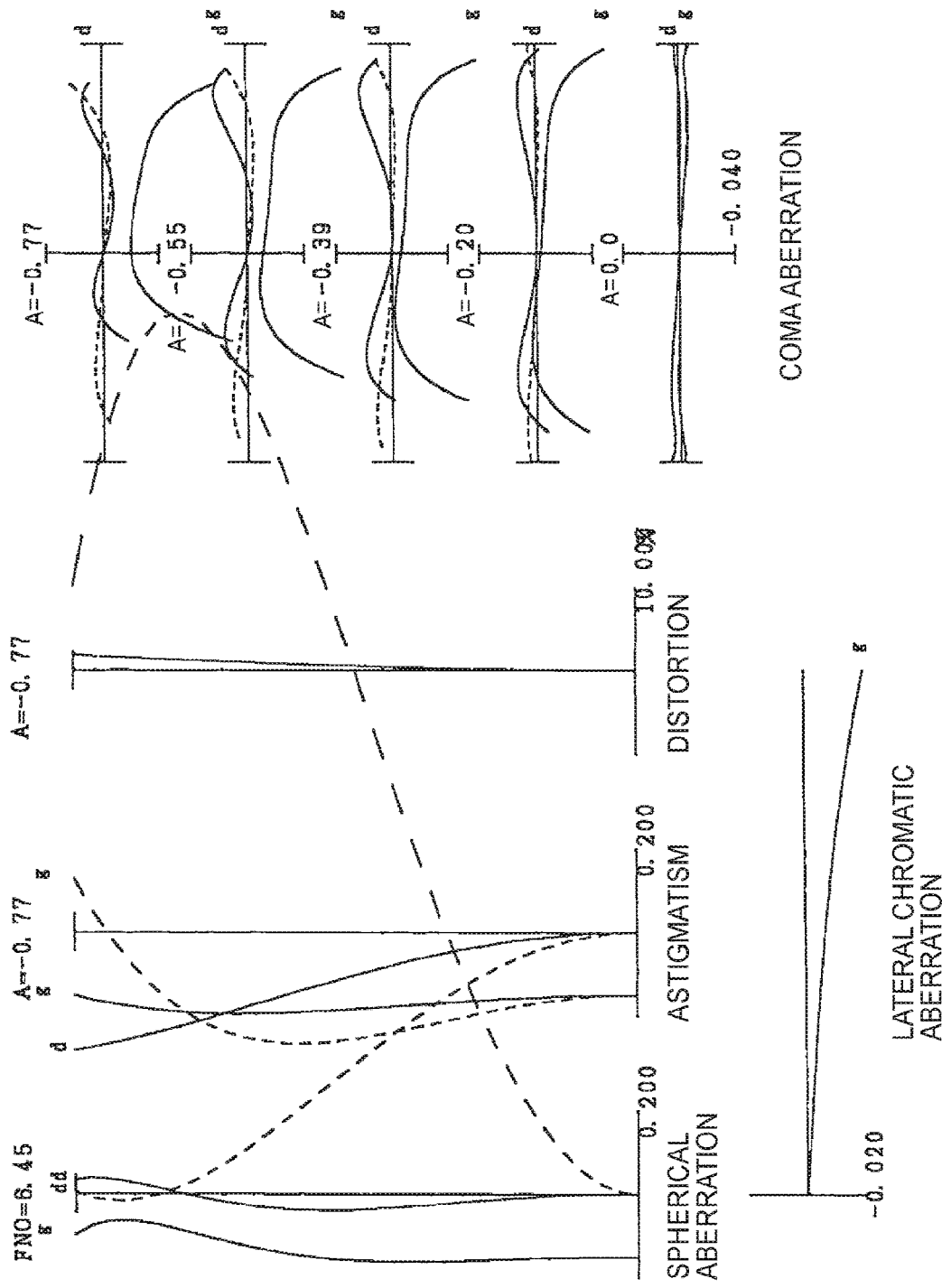

FIGS. 27A, 27B and 27C illustrate graphs showing various aberrations upon focusing on imaging distance infinity regarding the zoom lens ZL10 according to Example 10 (graphs showing spherical aberration, astigmatism, distortion, coma aberration and lateral chromatic aberration), where FIG. 27A depicts a wide angle end state, FIG. 27B depicts an intermediate focal length state, and FIG. 27C depicts a telephoto end state.

In each graph showing aberrations, FNO means an f number, and A means an half angle of view (unit: °). d means d-line, and g means g-line. What is not described means an aberration according to d-line. In graphs showing spherical aberration, a solid line indicates spherical aberration. In graphs showing astigmatism, a solid line indicates a sagittal image surface and a dashed-line shows a meridional image surface. In graphs showing coma aberration, a solid line indicates meridional coma aberration against g-lone and d-line of each incident angle or object height, a dashed line on the right side from the origin indicates sagittal coma aberration generated in a meridional direction with respect to d line, and a broken line on the left side from the origin indicates sagittal coma aberration generated in the sagittal direction with respect to d-line. Note that also in graphs showing aberrations of each example described below, the same signs are used as those in the present example.

As it is obvious based on each graph showing aberrations shown in FIGS. 27A, 27B and 27C, it is found that in the zoom lens ZL10 according to Example 10 in each focal length state from a wide angle end state to a telephoto end state, various aberrations are appropriately corrected, and outstanding optical performance is obtained. Concerning distortion, any optical correction is not needed because it is possible to sufficiently correct it by image processing after imaging.

Example 11

Example 11 is described using FIG. 28, FIGS. 29A, 29B and 29C, and Table 11. The zoom lens ZLIII according to Example 11 (ZL11) comprises, in order from the object as shown in FIG. 28, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having positive refractive power.

The first lens group G1 is composed of, in order from the object, a cemented lens composed of a negative meniscus lens L11 having a concave surface facing the image and a biconvex positive lens L12, a positive meniscus lens L13 having a convex surface facing the object, and a positive meniscus lens L14 having a convex surface facing the object.

The second lens group G2 is composed of, in order from the object, a biconcave negative lens L21, a biconcave negative lens L22, a biconvex positive lens L23, and a negative meniscus lens L24 having a concave surface facing the object. The image side surface of the negative meniscus lens L21 is aspherical.

The third lens group G3 is composed of, in order from the object, a biconvex positive lens L31, a negative meniscus lens L32 having a concave surface facing the image, and a cemented lens composed of a biconcave negative lens L33 and a biconvex positive lens L34. Both side surfaces of the biconvex positive lens L31 are aspherical.

The fourth lens group G4 is composed of a biconcave negative lenses L41.

The fifth lens group G5 is composed of, in order from the object, a cemented lens composed of a biconvex positive lens L51 and a negative meniscus lens L52 having a concave surface the object.

The sixth lens group G6 is composed of a biconvex positive lenses L61.

An aperture stop S is disposed between the second lens group G2 and the third lens group G3 for the purpose of aiming at adjusting the quantity of light.

The filter group FL is arranged between the sixth lens group G6 and the image surface I. The filter FL is composed of low-pass filters, infrared cut filters, etc. for cutting spatial frequencies more than the marginal resolution of a solid-state image sensing device, such as CCD disposed on the image surface I.

In the zoom lens ZL11 according to the present example, zooming is performed by moving the first to fifth lens groups G1 to G5 and the aperture stop S in the optical axis direction, and fixing the sixth lens group G6 in position so that distances between each lens group change. Specifically, upon zooming from a wide angle end state to a telephoto end state, the first lens group G1 is moved to the object side, the second lens group G2 is moved once to the image side and afterward moved to the object side, the third lens group G3 is moved to the object side, the fourth lens group G4 is moved to the object side, the fifth lens group G5 is moved once to the object side and afterward moved to the image side, and the sixth lens group G6 is fixed in position to the image surface I. The aperture stop S is moved to the object side, separately from each lens group, upon zooming from a wide angle end state to a telephoto end state.

The following Table 11 shows values of each various data according to Example 11. The surface numbers 1 to 32 in Table 11 correspond to each optical surface of m1 to m32 shown in FIG. 28.

TABLE 11

[Lens data]

| Surface number | R | D | nd | νd |
|---|---|---|---|---|
| Object surface | ∞ | | | |
| 1 | 275.935 | 3.738 | 1.8348 | 42.7 |
| 2 | 115.550 | 16.405 | 1.4370 | 95.0 |
| 3 | 13143.500 | 0.415 | | |
| 4 | 122.063 | 13.290 | 1.4370 | 95.0 |
| 5 | 1070.443 | 0.415 | | |
| 6 | 130.766 | 10.591 | 1.4970 | 81.6 |
| 7 | 494.258 | (D7) | | |
| 8 | −1739.519 | 1.869 | 1.8820 | 37.2 |
| *9 | 13.578 | 10.277 | | |
| 10 | −40.755 | 1.869 | 1.8348 | 42.7 |
| 11 | 158.411 | 1.038 | | |
| 12 | 49.075 | 5.607 | 1.9229 | 20.9 |
| 13 | −45.763 | 1.038 | | |
| 14 | −45.322 | 1.661 | 1.9108 | 35.3 |
| 15 | −317.902 | (D15) | | |
| 16 | ∞ | (D16) | (Aperture Stop) | |
| *17 | 24.225 | 6.230 | 1.5533 | 71.7 |
| *18 | −44.084 | 6.230 | | |
| 19 | 31.149 | 1.246 | 1.9108 | 35.3 |
| 20 | 21.553 | 3.115 | | |
| 21 | −122.750 | 0.831 | 1.9538 | 32.3 |
| 22 | 38.038 | 5.191 | 1.4875 | 70.3 |
| 23 | −20.976 | (D23) | | |
| 24 | −142.256 | 2.077 | 1.4875 | 70.3 |
| 25 | 103.345 | (D25) | | |
| 26 | 32.393 | 5.191 | 1.4875 | 70.3 |
| 27 | −74.819 | 1.038 | 1.8503 | 32.4 |
| 28 | −183.548 | (D28) | | |
| 29 | 415.316 | 1.661 | 1.5311 | 55.9 |
| 30 | −193.972 | 1.167 | | |
| 31 | ∞ | 1.424 | 1.5168 | 63.9 |
| 32 | ∞ | (BF) | | |
| Image surface | ∞ | | | |

TABLE 11-continued

[General Data]
Zooming rate 85.1

| | Wide angle end | Intermediate focus | Telephoto end |
|---|---|---|---|
| f | 7.7 | 66.1 | 655.5 |
| φ | 10.86 | 13.68 | 17.24 |
| Fno | 3.63 | 4.97 | 6.34 |
| 2ω | 91.98 | 13.87 | 1.38 |
| BF | 1.20 | 1.20 | 1.20 |
| BF(Air) | 3.30 | 3.30 | 3.30 |
| TL | 217.69 | 288.91 | 338.08 |
| TL(Air) | 217.20 | 288.42 | 337.59 |

[Aspherical Data]

| Surface number | κ | A4 | A6 | A8 | A10 |
|---|---|---|---|---|---|
| 9 | 0.7082 | −8.35E−07 | −5.83E−08 | 4.69E−10 | −1.82E−12 |
| 17 | 1.1650 | −1.10E−05 | 0.00E+00 | 0.00E+00 | 0.00E+00 |
| 18 | 1.0000 | 1.72E−05 | 0.00E+00 | 0.00E+00 | 0.00E+00 |

[Variable Distance Data]

| Variable distance | Wide angle end | Intermediate focus | Telephoto end |
|---|---|---|---|
| f | 7.7 | 66.1 | 655.5 |
| D7 | 1.034 | 96.141 | 143.280 |
| D15 | 57.059 | 13.662 | 0.963 |
| D16 | 25.639 | 3.987 | 1.844 |
| D23 | 4.317 | 15.343 | 5.882 |
| D25 | 15.695 | 16.571 | 81.057 |
| D28 | 9.130 | 38.393 | 0.239 |

[Lens Group Data]

| Group number | Group starting surface | Group focal length | Lens configuration length |
|---|---|---|---|
| G1 | 1 | 179.62 | 44.85 |
| G2 | 8 | −14.74 | 23.36 |
| G3 | 17 | 36.76 | 22.84 |
| G4 | 24 | −122.45 | 2.08 |
| G5 | 26 | 67.49 | 6.23 |
| G6 | 29 | 249.19 | 1.66 |

[Conditional Expression]

| Conditional Expression(16) | ft/(−f2) = 44.46 |
| Conditional Expression(17) | (Fnt · f1)/ft = 1.74 |
| Conditional Expression(18) | β2t · β3t/(β2w · β3w) = 54.86 |
| Conditional Expression(19) | ft/f3 = 17.84 |
| Conditional Expression(20) | β2t/β2w = 22.41 |
| Conditional Expression(21) | f3/(−f2) = 2.49 |
| Conditional Expression(22) | f1/fw = 23.33 |
| Conditional Expression(23) | ft/x2 = 30.00 |
| Conditional Expression(24) | ωt = 0.69° |
| Conditional Expression(25) | ωw = 45.99° |

Based on Table 11, it is found that in the zoom lens ZL11 according to the present example the conditional expressions (16) to (25) are satisfied.

FIGS. 29A, 29B and 29C illustrate graphs showing various aberrations upon focusing on imaging distance infinity regarding the zoom lens ZL11 according to Example 11 (graphs showing spherical aberration, astigmatism, distortion, coma aberration and lateral chromatic aberration), where FIG. 29A depicts a wide angle end state, FIG. 29B depicts an intermediate focal length state, and FIG. 29C depicts a telephoto end state.

As it is obvious based on each graph showing aberrations shown in FIGS. 29A, 29B and 29C, in the zoom lens ZL11 according to Example 11, in each focal length status from a wide angle end state to a telephoto end state, various aberrations are appropriately corrected, and outstanding optical performance is obtained. Concerning distortion, any optical correction is not needed because it is possible to sufficiently correct it by imaging processing after imaging.

Example 12

Example 12 is described using FIG. 30, FIGS. 31A, 31B and 31C, and Table 12. The zoom lens ZLIII according to Example 12 (ZL12) comprises, in order from the object as shown in FIG. 30, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a cemented lens composed of a negative meniscus lens L11 having a concave surface facing the image and a positive meniscus lens L12 having a convex surface facing the object, a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a negative meniscus lens L22 having a concave surface facing the object, and a biconvex positive lens L23. The image side surface of the negative meniscus lens L21 is aspherical.

The third lens group G3 is composed of, in order from the object, a biconvex positive lens L31, a negative meniscus lens L32 having a concave surface facing the image, and a cemented lens composed of a negative meniscus lens L33 having a concave surface facing the image and a biconvex positive lens L34. Both side surfaces of the biconvex positive lens L31 are aspherical.

The fourth lens group G4 is composed of a negative meniscus lenses L41 having a concave surface facing the image.

The fifth lens group G5 is composed of, in order from the object, a cemented lens composed of a biconvex positive lens L51 and a negative meniscus lens L52 having a concave surface facing the object.

An aperture stop S is disposed between the second lens group G2 and the third lens group G3 for the purpose of aiming at adjusting the quantity of light.

The filter group FL is disposed between the fifth lens group G5 and the image surface I. The filter FL is composed of low-pass filters, infrared cut filters, etc. for cutting spatial frequencies more than the marginal resolution of a solid-state image sensing device, such as CCD disposed on the image surface I.

In the zoom lens ZL12 according to the present example, all lens groups G1 to G5 and the aperture stop S moved in the optical axis direction so that distances between each lens group change. Specifically, upon zooming from a wide angle end state to a telephoto end state, the first lens group G1 is moved to the object side, the second lens group G2 is moved to the image side, the third lens group G3 is moved to the object side, the fourth lens group G4 is moved to the object side, and the fifth lens group G5 is moved once to the object side and afterward moved to the image side. The aperture stop S is moved to the object side separately from each lens group upon zooming from a wide angle end state to a telephoto end state.

The following Table 12 shows values of each various data according to Example 12. The surface numbers 1 to 28 in Table 12 correspond to each optical surface of m1 to m28 shown in FIG. 30.

TABLE 12

[Lens data]

| Surface number | R | D | nd | vd |
|---|---|---|---|---|
| Object surface | ∞ | | | |
| 1 | 244.999 | 3.323 | 1.8348 | 42.7 |
| 2 | 108.306 | 11.258 | 1.4370 | 95.0 |
| 3 | 1072.209 | 0.449 | | |
| 4 | 121.893 | 9.371 | 1.4370 | 95.0 |
| 5 | 1373.087 | 0.449 | | |
| 6 | 122.768 | 7.437 | 1.4970 | 81.6 |
| 7 | 471.470 | (D7) | | |
| 8 | 140.014 | 2.284 | 1.8514 | 40.1 |
| *9 | 12.843 | 9.760 | | |
| 10 | −22.876 | 1.502 | 1.8830 | 40.7 |
| 11 | −813.948 | 0.441 | | |
| 12 | 78.912 | 3.141 | 1.9460 | 18.0 |
| 13 | −58.918 | (D13) | | |
| 14 | ∞ | (D14) | (Aperture Stop) | |
| *15 | 17.399 | 4.436 | 1.5533 | 71.7 |
| *16 | −136.593 | 3.766 | | |
| 17 | 26.925 | 1.280 | 1.9538 | 32.3 |
| 18 | 15.999 | 1.897 | | |
| 19 | 33.038 | 0.864 | 1.9538 | 32.3 |
| 20 | 22.735 | 3.659 | 1.4970 | 81.7 |
| 21 | −52.794 | (D21) | | |
| 22 | 332.698 | 1.272 | 1.4875 | 70.3 |
| 23 | 50.549 | (D23) | | |
| 24 | 40.201 | 4.600 | 1.4875 | 70.3 |
| 25 | −38.619 | 1.687 | 2.0010 | 29.1 |
| 26 | −59.486 | (D26) | | |
| 27 | ∞ | 1.512 | 1.5168 | 63.9 |
| 28 | ∞ | (BF) | | |
| Image surface | ∞ | | | |

[General Data]
Zooming rate 64.3

| | Wide angle end | Intermediate focus | Telephoto end |
|---|---|---|---|
| f | 7.7 | 66.1 | 494.9 |
| φ | 10.59 | 11.88 | 13.33 |
| Fno | 3.22 | 5.08 | 6.28 |
| 2ω | 92.93 | 13.76 | 1.83 |
| BF | 2.03 | 2.03 | 2.03 |
| BF(Air) | 15.39 | 45.35 | 9.30 |
| TL | 171.18 | 251.62 | 300.42 |
| TL(Air) | 170.66 | 251.11 | 299.90 |

[Aspherical Data]

| Surface number | κ | A4 | A6 | A8 | A10 |
|---|---|---|---|---|---|
| 9 | 1.1197 | −1.82E−05 | −3.63E−07 | 4.88E−09 | −3.46E−11 |
| 15 | 0.5972 | −8.98E−06 | 0.00E+00 | 0.00E+00 | 0.00E+00 |
| 16 | 1.0000 | 6.74E−06 | 0.00E+00 | 0.00E+00 | 0.00E+00 |

TABLE 12-continued

[Variable Distance Data]

| Variable distance | Wide angle end | Intermediate focus | Telephoto end |
|---|---|---|---|
| f | 7.7 | 66.1 | 494.9 |
| D7 | 1.142 | 93.043 | 145.113 |
| D13 | 47.825 | 8.383 | 0.839 |
| D14 | 19.286 | 5.941 | 3.798 |
| D21 | 9.849 | 13.311 | 7.613 |
| D23 | 4.297 | 12.205 | 60.368 |
| D26 | 12.363 | 42.320 | 6.270 |

[Lens Group Data]

| Group number | Group starting surface | Group focal length | Lens configuration length |
|---|---|---|---|
| G1 | 1 | 179.62 | 32.29 |
| G2 | 8 | −14.74 | 17.13 |
| G3 | 15 | 31.77 | 15.90 |
| G4 | 22 | −122.45 | 1.27 |
| G5 | 24 | 64.37 | 6.29 |

[Conditional Expression]

| | |
|---|---|
| Conditional Expression(16) | ft/(−f2) = 33.57 |
| Conditional Expression(17) | (Fnt · f1)/ft = 2.28 |
| Conditional Expression(18) | β2t · β3t/(β2w · β3w) = 43.74 |
| Conditional Expression(19) | ft/f3 = 15.58 |
| Conditional Expression(20) | β2t/β2w = 18.92 |
| Conditional Expression(21) | f3/(−f2) = 2.15 |
| Conditional Expression(22) | f1/fw = 23.33 |
| Conditional Expression(23) | ft/x2 = 33.59 |
| Conditional Expression(24) | ωt = 0.915° |
| Conditional Expression(25) | ωw = 46.465° |

Based on Table 12, it is found that in the zoom lens ZL12 according to the present example the conditional expressions (16) to (25) are satisfied.

Figure 31A:
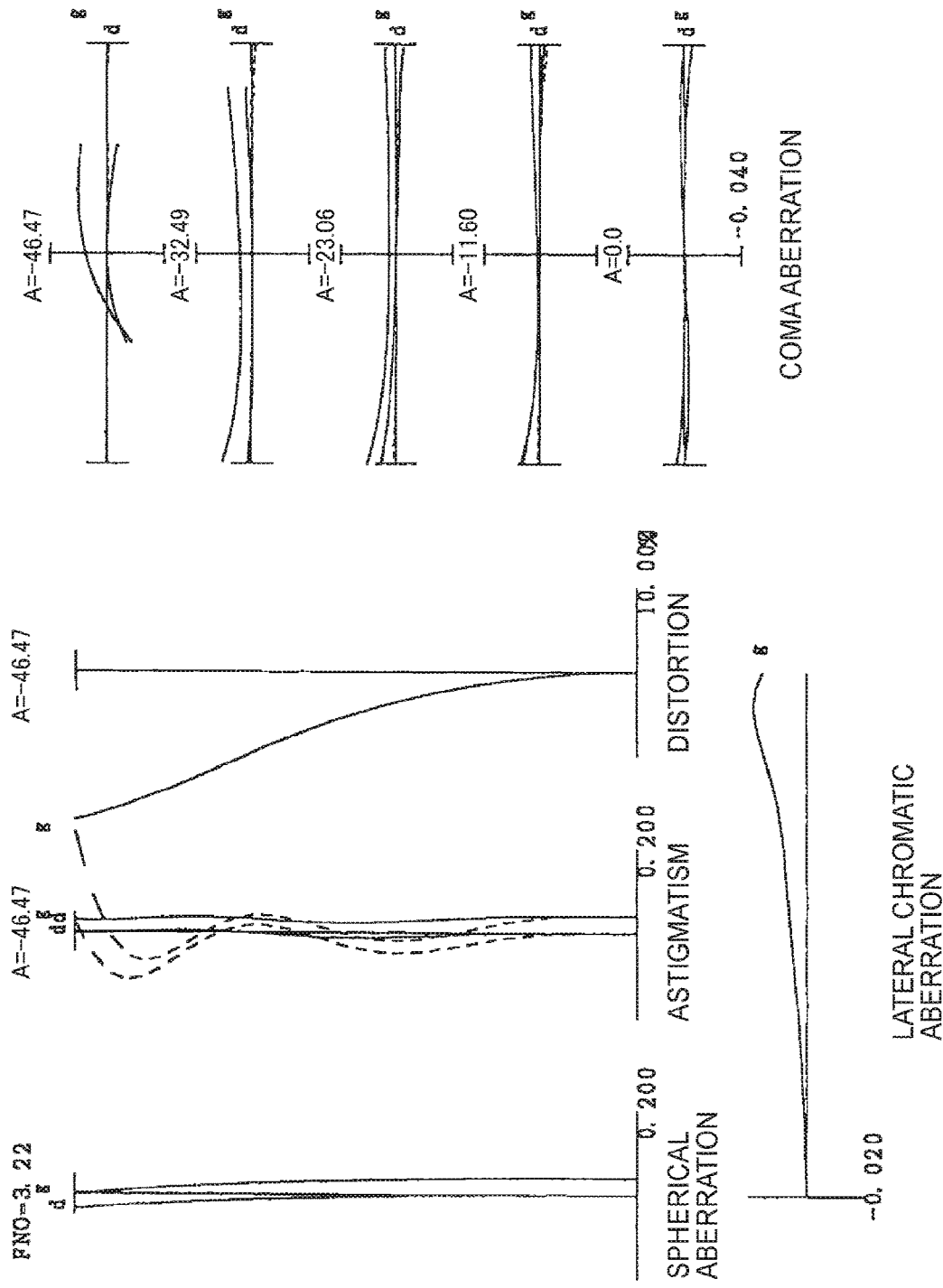

FIGS. 31A, 31B and 31C illustrate graphs showing various aberrations upon focusing on imaging distance infinity regarding a zoom lens ZL12 according to Example 12 (graphs showing spherical aberration, astigmatism, distortion, coma aberration and lateral chromatic aberration), where FIG. 31A depicts a wide angle end state, FIG. 31b depicts an intermediate focal length state, and FIG. 31C depicts a telephoto end state.

As it is obvious based on a graph showing aberrations shown in FIGS. 31A, 31B and 31C, it is found that in the zoom lens ZL12 according to Example 12, in each focal length status from a wide angle end state to a telephoto end state, aberrations are appropriately corrected, and outstanding optical performance is obtained. Concerning distortion, an optical correction is not needed because it is possible to sufficiently correct it with image processing after imaging.

According to each example, it is possible to realize a zoom lens which enables to achieve a further wide angle and high zoom magnification while maintaining the size of the whole lens and good optical performance.

In order to make the present invention understandable, the descriptions were made with elements of the embodiments, however, needless to say, the present invention is not limited to the above. The following contents can be suitably adopted within a range which does not spoil the optical performance of the zoom lens of the present application.

Although five and six group configurations are exampled as examples of values of the zoom lens ZLIII according to the fourth embodiment, however they are not limited to these configurations, therefore another group configuration (for instance, seven groups, etc.) can be adopted. Specifically, this is applicable to a configuration in which a lens or a lens group is added closest to the object, or a configuration in which a lens or a lens group is added closest to the image. Note that a lens group means part which has at least one lens separated with an air distance which changes upon zooming.

In the zoom lens ZLIII according to the fourth embodiment, in order to perform focusing from an infinity object to a short-distance object, it is appreciated that part of lens group, a whole one lens group, or a plurality of lens groups is configured to move in the optical axis direction as a focusing lens group. This focusing lens group is also applicable to autofocus, and is also suitable for motor drive for autofocus (using an ultrasonic motor, etc.). In particular, it is preferable that the fourth lens group G4 or the fifth lens group G5 is configured as a focusing lens group.

In the zoom lens ZLIII according to the fourth embodiment, each whole lens group or a partial lens group may be configured as a vibration-proof lens group to correct image blur generated due to camera shake, etc. by moving it in a manner of having a component in the direction perpendicular to the optical axis, or rotating and moving (swinging) it in an inner surface direction including the optical axis. In particular, it is preferable that the third lens group G3 is configured as a vibration-proof lens group.

In the zoom lens ZLIII according to the first and a second embodiments, a lens surface may be configured with a spherical surface or a plane, or configured with an aspherical surface. In a case that a lens surface has a spherical surface or a plane, it is possible to easily have lens processing and an assembly adjustment, and to prevent degradation of optical performance due to errors of the processing and the assembly adjustment, thus it is preferable. It is preferable because there is less degradation of the depiction performance when an image surface is shifted. In a case that a lens surface has an aspherical surface, it is appreciated that the aspherical surface is formed as any one of an aspherical surface which is formed through grinding processing, a glass mold aspherical surface which glass is formed into an aspherical surface configuration using a mold, and a complexed aspherical surface which a resin is formed on a surface of glass and formed in an aspherical surface configuration. It is appreciated that a lens surface is formed as a diffractive surface, additionally a lens is formed as a graded-index lens (GRIN lens) or a plastic lens.

In the zoom lens ZLIII according to the fourth embodiment, it is preferable that the aperture stop S is disposed between the second lens group G2 to the fourth lens group G4, however, instead of providing a member as an aperture stop, the role may be substituted with a frame of the lens.

In the zoom lens ZLIII according to the fourth embodiment, an antireflection film having high transmittivity in a large wavelength band may be applied to each lens surface in order to reduce flare and ghost and attain high optical performance with high contrast.

In the zoom lens ZLIII according to the fourth embodiment, the zooming rate is approximately 20 to 150 times.

EXPLANATION OF NUMERALS AND CHARACTERS

ZLI (ZL1-ZL3) Zoom lens according to the first and second embodiment
ZLII (ZL4-ZL9) Zoom lens according to the third embodiment
ZLIII (ZL10-ZL12) Zoom lens according to the fourth embodiment
G1 First lens group G2 Second lens group
G3 Third lens group
G4 Fourth lens group
G5 Fifth lens group
G6 Sixth lens group
S Aperture stop
FL Filter (filter group)
I image surface
CAM1 Digital still camera (optical apparatus according to the first and second embodiment)
CAM2 Digital still camera (optical apparatus according to the third embodiment)
31 Camera (optical apparatus according to the fourth embodiment)

The invention claimed is:

1. A zoom lens comprising, in order from an object, a first lens group having positive refractive power, a second lens group having negative refractive power, a third lens group having positive refractive power, a fourth lens group having negative refractive power, and a fifth lens group having positive refractive power,
respective distances between all adjacent lens groups among the first to fifth lens groups being changed upon zooming,
the first lens group being composed of three or more lenses,
the second lens group consisting of a negative meniscus lens having a concave surface facing an image, a negative lens, a positive biconvex lens, and a negative lens, arranged in order from the object,
the third lens group comprising two negative meniscus lenses both having a concave surface facing the image,
the fourth lens group being composed of two or less lenses,
the fifth lens group being composed of two or less lenses and moving upon zooming from a wide angle end state to a telephoto end state,
the fifth lens group consisting of a positive lens and a negative lens, and
the following conditional expressions being satisfied:

$$0.01 < D1/ft < 0.15$$

$$0.03 < Mv2/ft$$

where
D1 denotes a distance on an optical axis from an object side surface of the first lens group to an image side surface of the first lens group,
ft denotes a focal length of the zoom lens in the telephoto end state, and
Mv2 denotes amount of movement of the second lens group upon zooming from the wide angle end state to the telephoto end state.

2. A zoom lens according to claim 1, wherein the following conditional expression is satisfied:

$$5.80 < Dt12/(-f2)$$

where
Dt12 denotes a distance on an optical axis from the image side surface of the first lens group to the object side surface of the second lens group in the telephoto end state, and
f2 denotes a focal length of the second lens group.

3. A zoom lens according to claim 1, wherein the following conditional expression is satisfied:

$$8.40 < f1/(-f2)$$

where
f1 denotes a focal length of the first lens group, and
f2 denotes a focal length of the second lens group.

4. A zoom lens according to claim 1, wherein the following conditional expression is satisfied:

$$2.70 < \beta t3/\beta w3$$

where
$\beta t3$ denotes magnification of the third lens group in the telephoto end state, and
$\beta w3$ denotes magnification of the third lens group in the wide angle end state.

5. A zoom lens according to claim 1, wherein the following conditional expression is satisfied:

$$0.70 < Zidwt/Fnwt < 1.10$$

where
Zidwt and Fnwt are defined as follows:

$$Zidwt = \{(1-\beta t4^2) * \beta t5^2\} / \{(1-\beta w4^2) * \beta w5^2\}$$

$$Fnwt = Fnt/Fnw$$

where
$\beta t4$ denotes magnification of the fourth lens group in the telephoto end state,
$\beta t5$ denotes magnification of the fifth lens group in the telephoto end state,
$\beta w4$ denotes magnification of the fourth lens group in the wide angle end state,
$\beta w5$ denotes magnification of the fifth lens group in the wide angle end state,
Fnt denotes an f number in the telephoto end state, and
Fnw denotes an f number in the wide angle end state.

6. A zoom lens according to claim 1, wherein focusing is performed by moving the fourth lens group along an optical axis.

7. A zoom lens according to claim 1, wherein an aperture stop is provided between the second lens group and the third lens group.

8. A zoom lens according to claim 7, wherein the aperture stop is moved along an optical axis upon zooming.

9. A zoom lens according to claim 1, wherein the following conditional expression is satisfied:

$$0.10° < \omega t < 5.00°$$

where
$\omega t$ denotes a half angle of view in the telephoto end state.

10. A zoom lens according to claim 1, wherein the following conditional expression is satisfied:

$$25.00° < \omega w < 80.00°$$

where
$\omega w$ denotes a half angle of view in the wide angle end state.

11. A zoom lens according to claim 1, wherein all of the lens groups move upon zooming from the wide angle end state to the telephoto end state.

12. A zoom lens according to claim 1, wherein the first lens group comprises a cemented lens of, in order from an object, a negative meniscus lens having a concave surface facing an image and a bi-convex positive lens, the negative meniscus lens being placed closest to an object in the first lens group.

13. A zoom lens according to claim 1, wherein the first lens group comprises a positive meniscus lens having a convex surface facing an object, which is placed closest to an image in the first lens group.

14. A zoom lens according to claim 1, wherein all the lenses of the second lens group are placed apart with each other by air.

15. A zoom lens according to claim 1, wherein the third lens group comprises a bi-convex positive lens which is placed closest to an image in the third lens group.

16. A zoom lens according to claim 1, wherein the fourth lens group comprises a bi-concave negative lens.

17. An optical apparatus equipped with the zoom lens according to claim 1.

18. A zoom lens comprising, in order from an object, a first lens group having positive refractive power, a second lens group having negative refractive power, a third lens group having positive refractive power, a fourth lens group having negative refractive power, and a fifth lens group having positive refractive power,
respective distances between all adjacent lens groups being changed upon zooming from the wide-angle end state to the telephoto end state, and
the following conditional expressions being satisfied:

$$33.00 < ft/(-f2) < 46.00$$

$$43.00 < \beta 2t \cdot \beta 3t/(\beta 2w \cdot \beta 3w) < 65.00$$

where
ft denotes a focal length of the zoom lens in a telephoto end state,
f2 denotes a focal length of the second lens group,
$\beta 2t$ denotes magnification of the second lens group in the telephoto end state,
$\beta 3t$ denotes magnification of the third lens group in the telephoto end state,
$\beta 2w$ denotes magnification of the second lens group in a wide angle end state, and
$\beta 3w$ denotes magnification of the third lens group in the wide angle end state.

19. A zoom lens according to claim 18, wherein the following conditional expression being satisfied:

$$1.60 < (Fnt \cdot f1)/ft < 2.30$$

where
Fnt denotes an f number in the telephoto end state, and
f1 denotes a focal length of the first lens group.

20. A zoom lens according to claim 18, wherein the following conditional expression is satisfied:

$$15.00 < ft/f3 < 19.00$$

where
f3 denotes a focal length of the third lens group.

21. A zoom lens according to claim 18, wherein the following conditional expression is satisfied:

$$15.00 < \beta 2t/\beta 2w < 25.00.$$

22. A zoom lens according to claim 18, wherein the following conditional expression is satisfied:

$$2.00 < f3/(-f2) < 2.70$$

where
f3 denotes a focal length of the third lens group.

23. A zoom lens according to claim 18, wherein the following conditional expression is satisfied:

$$15.00 < f1/fw < 40.00$$

where
f1 denotes a focal length of the first lens group, and
fw denotes a focal length of the zoom lens in the wide angle end state.

24. A zoom lens according to claim 18, wherein the following conditional expression is satisfied:

$$10.00 < ft/x2 < 40.00$$

where
x2 denotes a distance the second lens group moves relative to an imaging position in an image surface direction upon zooming from the wide angle end state to the telephoto end state.

25. An optical apparatus equipped with the zoom lens according to claim 18.

26. A method for manufacturing a zoom lens, comprising:
arranging, in a lens barrel and in order from an object, a first lens group having positive refractive power, a second lens group having negative refractive power, a third lens group having positive refractive power, a fourth lens group having negative refractive power, and a fifth lens group having positive refractive power,
the first to fifth lens groups being arranged such that respective distances between all adjacent lens groups among the first to fifth lens groups are changed upon zooming,
further comprising one of the following features A or, wherein
the feature A comprising:
the first lens group being composed of three or more lenses, the second lens group consisting of a negative meniscus lens having a concave surface facing an image, a negative lens, a positive biconvex lens, and a negative lens, arranged in order from the object, the third lens group comprising two negative meniscus lenses both having a concave surface facing the image, the fourth lens group being composed of two or less lenses, the fifth lens group being composed of two or less lenses and moving upon zooming from a wide angle end state to a telephoto end state, the fifth lens group consisting of a positive lens and a negative lens, and
the following conditional expressions being satisfied:

$$0.01 < D1/ft < 0.15$$

$$0.03 < Mv2/ft$$

where
D1 denotes a distance on an optical axis from an object side surface of the first lens group to an image side surface of the first lens group,
ft denotes a focal length of the zoom lens in the telephoto end state, and
Mv2 denotes amount of movement of the second lens group upon zooming from the wide-angle end state to the telephoto end state, and
the feature B comprising:
the following conditional expressions being satisfied:

$$33.00 < ft/(-f2) < 46.00$$

$$43.00 < \beta 2t \cdot \beta 3t/(\beta 2w \cdot \beta 3w) < 65.00$$

where
ft denotes a focal length of the zoom lens in a telephoto end state,
f2 denotes a focal length of the second lens group,
$\beta 2t$ denotes magnification of the second lens group in the telephoto end state, β3t denotes magnification of the third lens group in the telephoto end state,
β2w denotes magnification of the second lens group in a wide angle end state, and
β3w denotes magnification of the third lens group in the wide angle end state.

\* \* \* \* \*